(12) United States Patent
Tanaka et al.

(10) Patent No.: US 11,440,800 B2
(45) Date of Patent: Sep. 13, 2022

(54) METHOD FOR SEPARATING AND RECOVERING CARBON NANOTUBES

(71) Applicant: NATIONAL INSTITUTE OF ADVANCED INDUSTRIAL SCIENCE AND TECHNOLOGY, Tokyo (JP)

(72) Inventors: Takeshi Tanaka, Tsukuba (JP); Yohei Yomogida, Tsukuba (JP); Hiromichi Kataura, Tsukuba (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 0 days.

(21) Appl. No.: 17/254,689

(22) PCT Filed: Jul. 25, 2019

(86) PCT No.: PCT/JP2019/029149
§ 371 (c)(1),
(2) Date: Dec. 21, 2020

(87) PCT Pub. No.: WO2020/022414
PCT Pub. Date: Jan. 30, 2020

(65) Prior Publication Data
US 2021/0269312 A1 Sep. 2, 2021

(30) Foreign Application Priority Data
Jul. 27, 2018 (JP) .............................. JP2018-141827

(51) Int. Cl.
C01B 32/172 (2017.01)
B82Y 30/00 (2011.01)
B82Y 40/00 (2011.01)

(52) U.S. Cl.
CPC .............. *C01B 32/172* (2017.08); *B82Y 30/00* (2013.01); *B82Y 40/00* (2013.01);
(Continued)

(58) Field of Classification Search
CPC .............. C01B 32/172; C01B 2202/02; C01B 2202/20; C01B 2202/22; C01B 2202/26;
(Continued)

(56) References Cited

U.S. PATENT DOCUMENTS

2007/0258880 A1  11/2007  Murakoshi
2008/0217588 A1   9/2008  Arnold et al.
(Continued)

FOREIGN PATENT DOCUMENTS

JP    2010-502548 A    1/2010
JP    2011-184225 A    9/2011
(Continued)

OTHER PUBLICATIONS

He, et al., Lag-burst kinetics of surfactant displacement from the liquid crystal/aqueous interface by bile acids, Colloids and Surfaces A: Physicochem. Eng. Aspects 2015; 471: 148-152 (Year: 2015).*
(Continued)

*Primary Examiner* — Daniel C. McCracken
(74) *Attorney, Agent, or Firm* — Manabu Kanesaka

(57) ABSTRACT

The invention has for its object to provide an aqueous solution for structural separation capable of acting on carbon nanotubes (CNTs) having a specific structure thereby separating them with high accuracy, a separation and recovery method capable of allowing the aqueous solution to act on CNTs having a specific structure thereby separating and recovering them, and CNTs obtained by the separation and recovery method. According to the invention, it is possible to separate CNTs having a specific structure with high accuracy by solubilizing lithocholic acid or a lithocolic acid (Continued)

isomer that has high hydrophobicity and is insoluble in water by itself, and a carbon nanotube obtained by using an aqueous solution containing lithocholic acid or a lithocholic acid isomer, each solubilized, as an aqueous solution for structural separation of CNTs.

10 Claims, 35 Drawing Sheets

(52) U.S. Cl.
CPC ...... *C01B 2202/02* (2013.01); *C01B 2202/20* (2013.01); *C01B 2202/22* (2013.01); *C01B 2202/26* (2013.01); *C01B 2202/36* (2013.01); *C01P 2002/84* (2013.01)

(58) Field of Classification Search
CPC ..... C01B 2202/36; B82Y 30/00; B82Y 40/00; C01P 2002/84
See application file for complete search history.

(56) References Cited

U.S. PATENT DOCUMENTS

| | | |
|---|---|---|
| 2010/0072458 A1 | 3/2010 | Green et al. |
| 2013/0052120 A1 | 2/2013 | Liu et al. |
| 2017/0029278 A1 | 2/2017 | Fasel et al. |

FOREIGN PATENT DOCUMENTS

| | | |
|---|---|---|
| JP | 2012-144426 A | 8/2012 |
| JP | 2017-518945 A | 7/2017 |
| WO | 2005/077827 A1 | 8/2005 |
| WO | 2011/108666 A1 | 9/2011 |

OTHER PUBLICATIONS

PCT/ISA/210, "International Search Report for International Application No. PCT/JP2019/029149," dated Aug. 27, 2019.
"Foundation and Application of Carbon Nanotubes", Baifukan, p. 8-22.
Tu, X. et al., "DNA sequence motifs for structure-specific recognition and separation of carbon nanotubes," Nature, Jul. 9, 2009, p. 250-253, vol. 460, Macmillan Publishers Limited, particularly, fig. 1, p. 251, left col. 1l. 5-24.
Ao, G. et al., "DNA-Controlled Partition of Carbon Nanotubes in Polymer Aqueous Two-Phase Systems," Journal of the American Chemical Society, 2014, p. 10383-10392, vol. 136, ACS Publications.
Gerstel, P. et al., "Selective dispersion of single-walled carbon nanotubes via easily accessible conjugated click polymers," Polymer Chemistry, 2012, p. 1966-1970, vol. 3, The Royal Society of Chemistry.
Zheng, M., "Sorting Carbon Nanotubes," Topics in Current Chemistry, 2017, p. 1-36, vol. 375, Springer.
Niyogi, S. et al., "Electrolyte Tuning of Surfactant Interfacial Behavior for Enhanced Density-Based Separations of Single-Walled Carbon Nanotubes," Journal of American Chemical Society, 2009, p. 1144-1153, vol. 131, No. 3.
Arnold, M. S. et al., "Sorting carbon nanotubes by electronic structure using density differentiation," Nature Nanotechnology, 2006, p. 60-65, vol. 1, Nature Publishing Group.
Fagan, J. A. et al., "Isolation of Specific Small-Diameter Single-Wall Carbon Nanotube Species via Aqueous Two-Phase Extraction," Advanced Materials, Jan. 21, 2014, p. 2800-2804, vol. 26, particularly, fig. 5, p. 2802, left col. 1. 18 to right col. 1. 43.
Yomogida, Y. et al., "Industrial-scale separation of high-purity single-chirality single-wall carbon nanotubes for biological imaging," Nature Communications 12056, 2016, p. 1-8, vol. 7.
Yomogida, Y. et al., "Role of cholate for chirality selection of SWCNTs," The 48th Fullerenes-Nanotube-Graphene General Symposium, 2015, p. 14, vol. 1-4.
Hofmann, A. F. et al., "Physicochemical properties of bile acids and their relationship to biological properties: an overview of the problem," Journal of Lipid Research, 1984, p. 1447-1489, vol. 25.
Wenseleers, W. et al., "Efficient Isolation and Solubilization of Pristine Single-Walled Nanotubes in Bile Salt Micelles," Advanced Functional Materials, 2004, p. 1105-1112, vol. 14, No. 11.
Song, W. et al., "Synthesis of Bandgap-Controlled Semiconducting Single-Walled Carbon Nanotubes," ACS Nano, Jan. 27, 2010, p. 1012-1018, vol. 4, No. 2, American Chemical Society, particularly, fig. 5, 6, p. 1014, right col. 11. 3-7, p. 1015, left col. 1. 45 to p. 1016, right col. 1. 22.
Yomogida, Y. et al., "Automatic Sorting of Single-Chirality Single-Wall Carbon Nanotubes Using Hydrophobic Cholates: Implications for Multicolor Near-Infrared Optical Technologies," Journal of American Chemical Society, 2020, p. A-I, ACS Publications, Downloaded via Natl Inst Advncd Ind Sci & Techlgy on Nov. 9, 2020.

\* cited by examiner

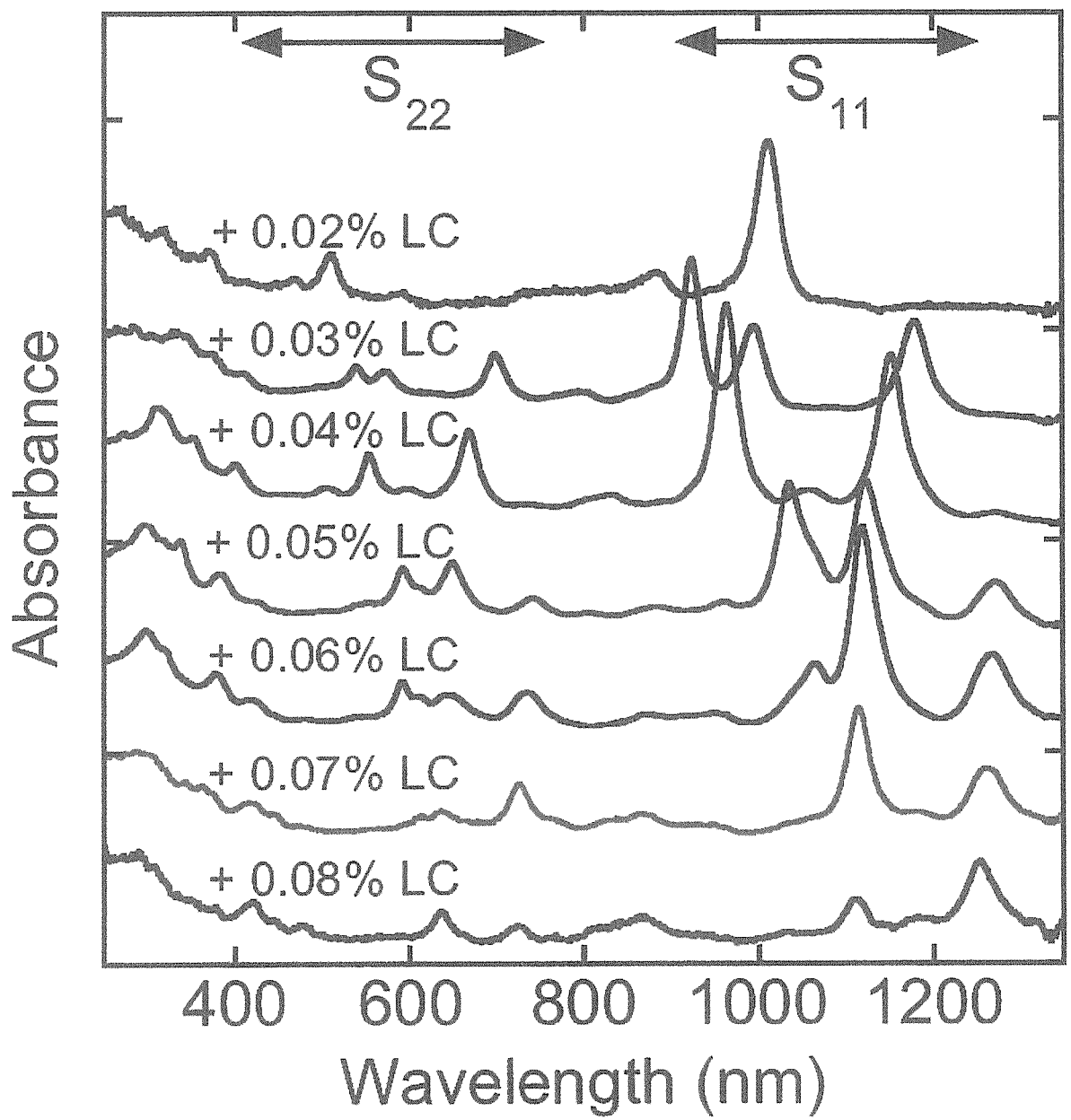

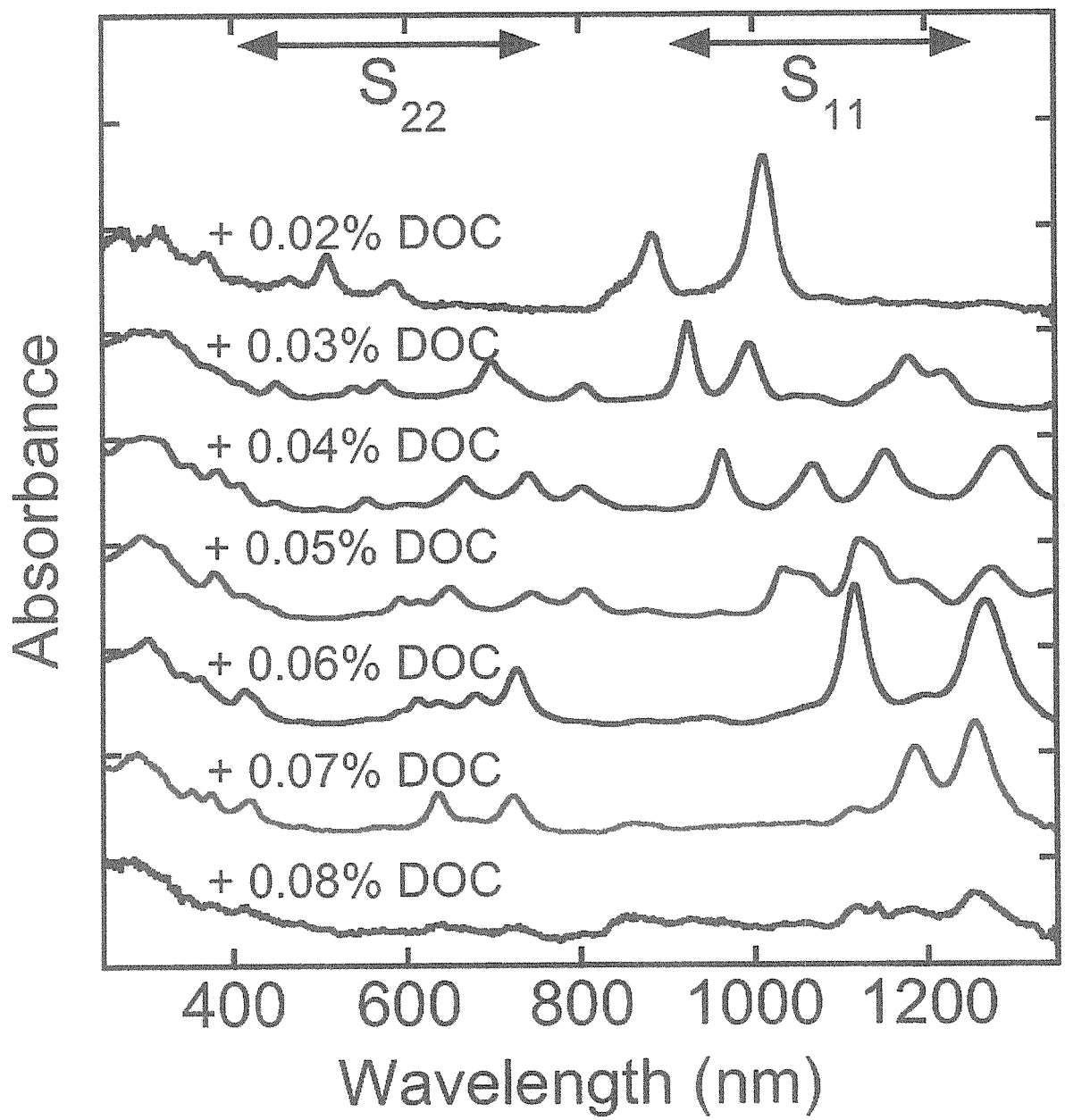

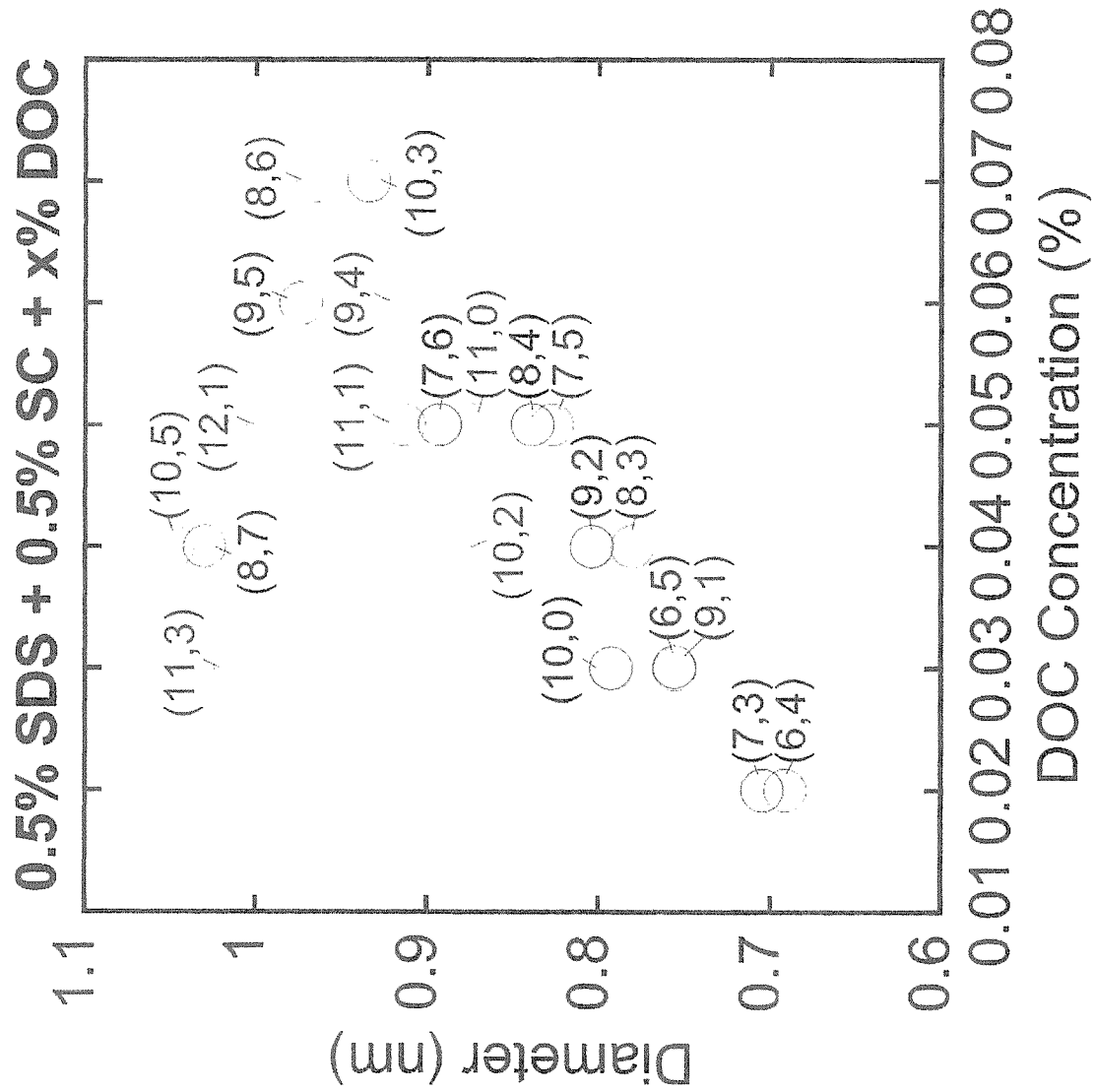

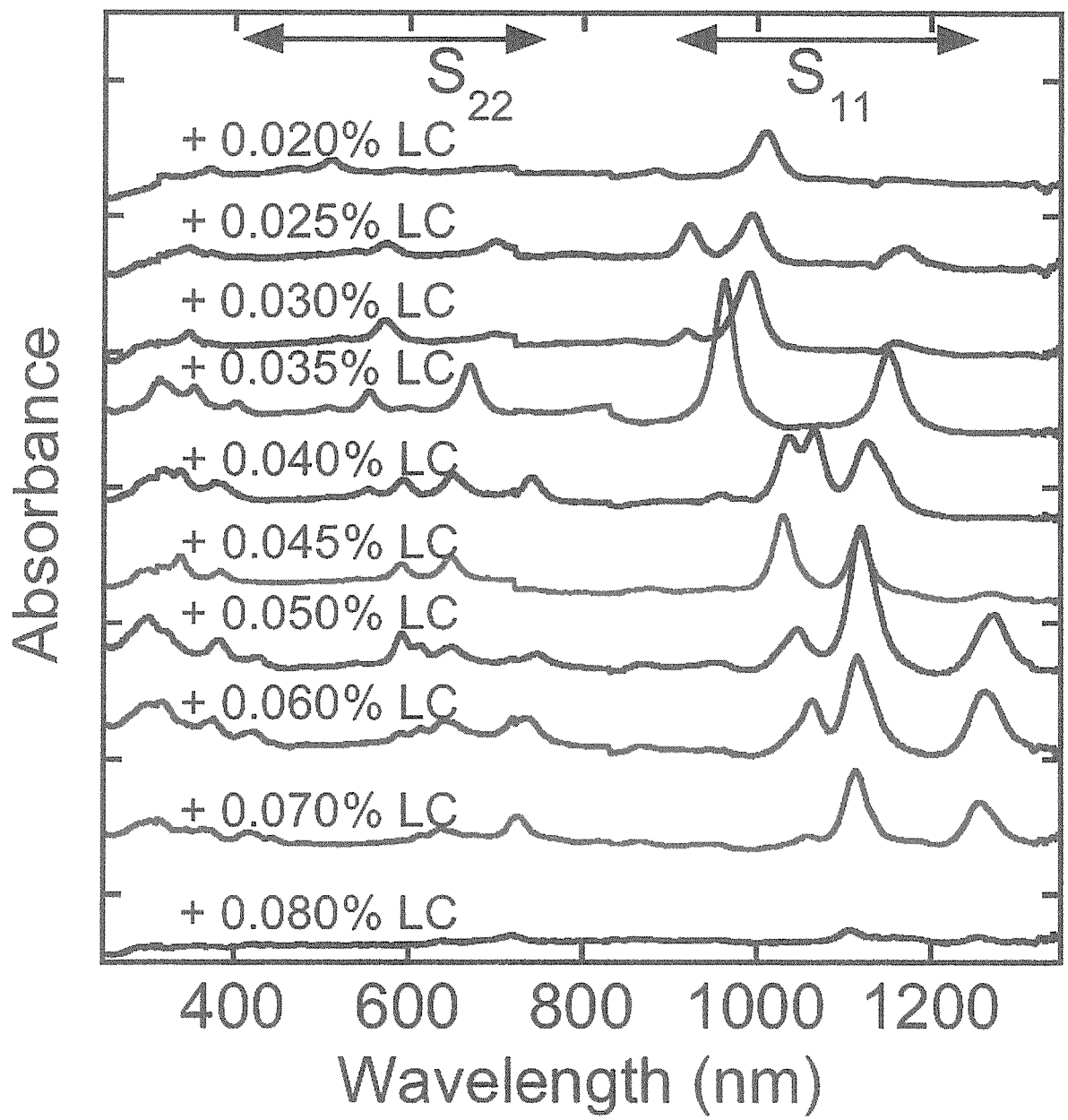

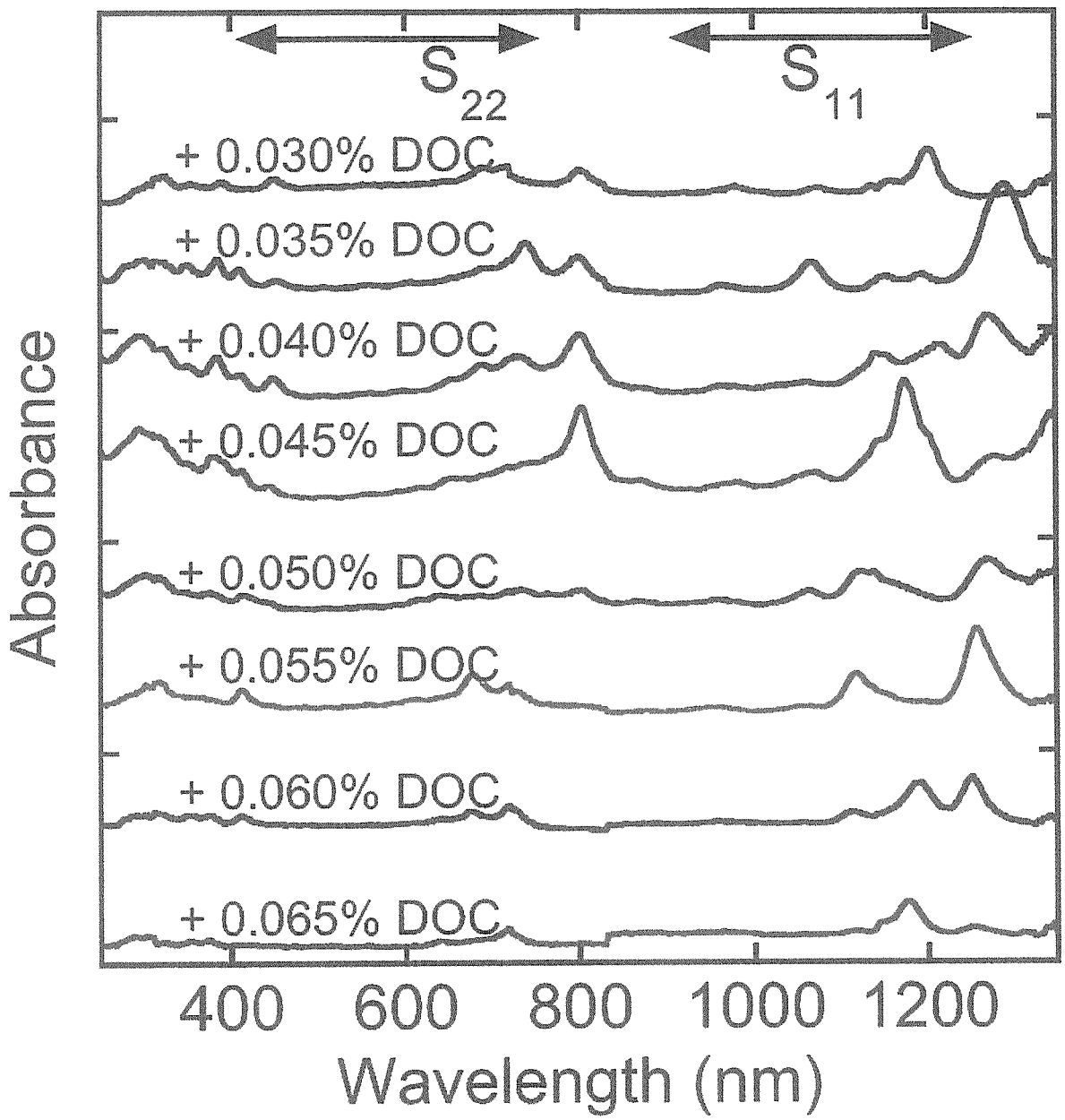

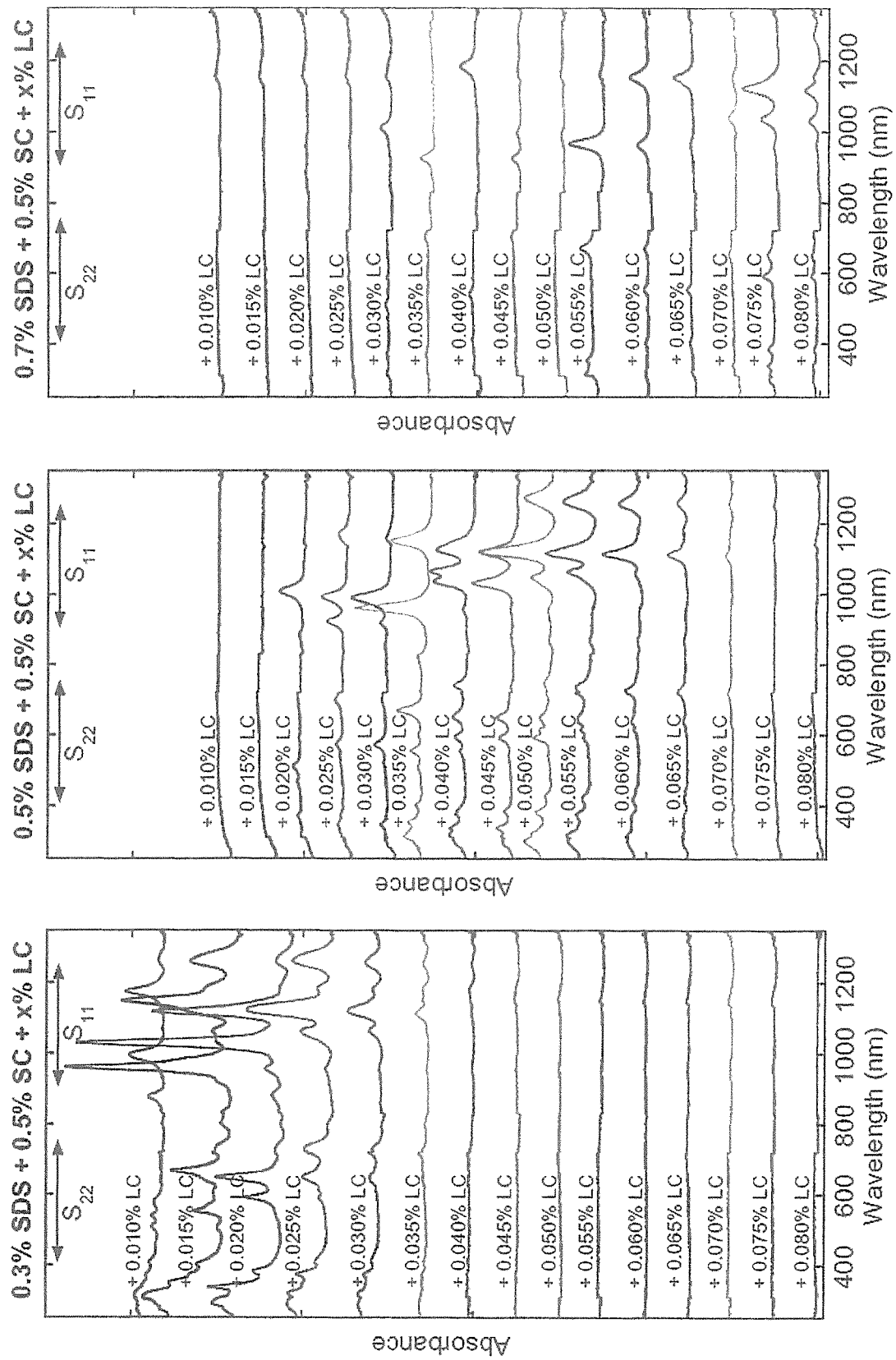

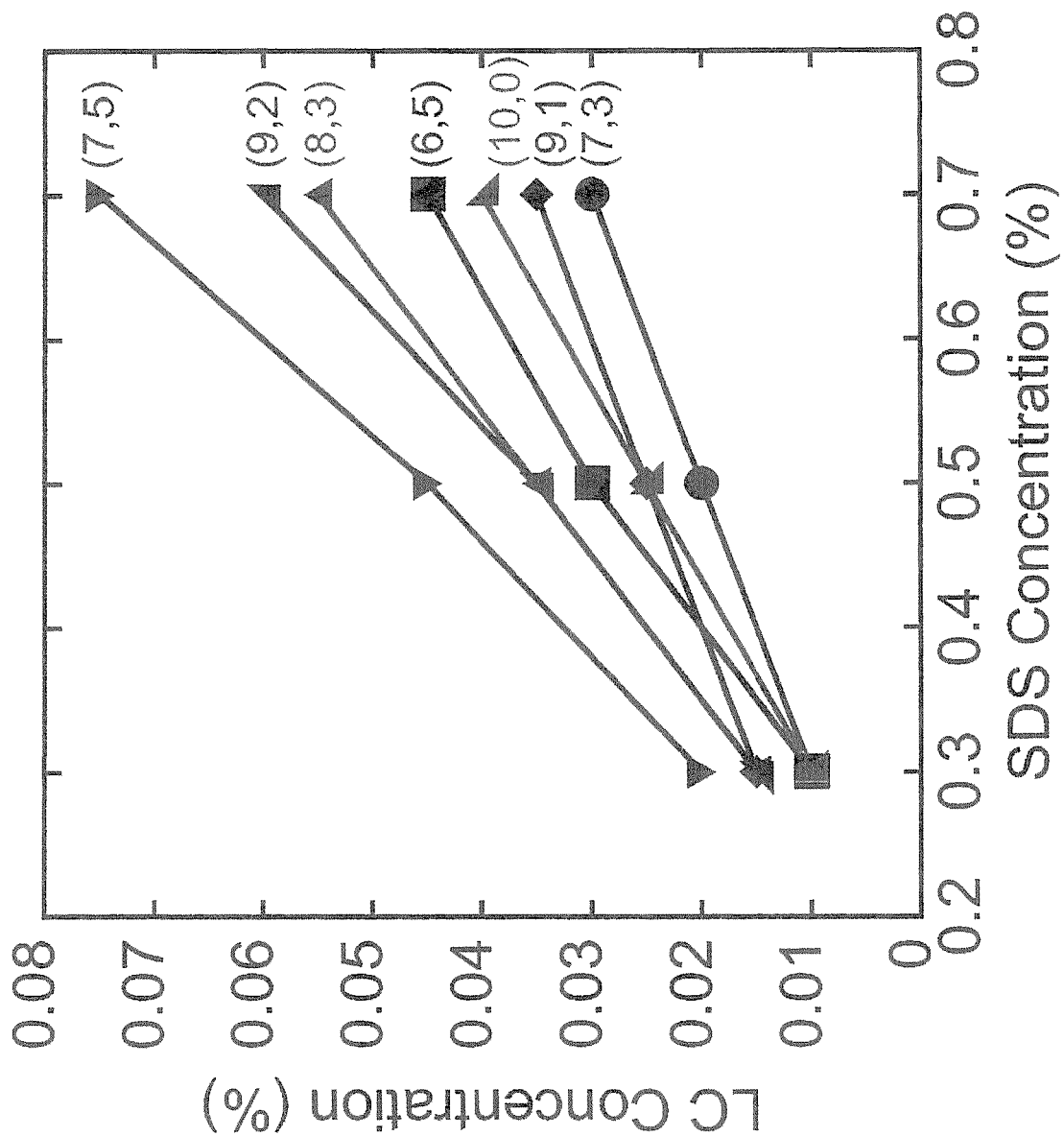

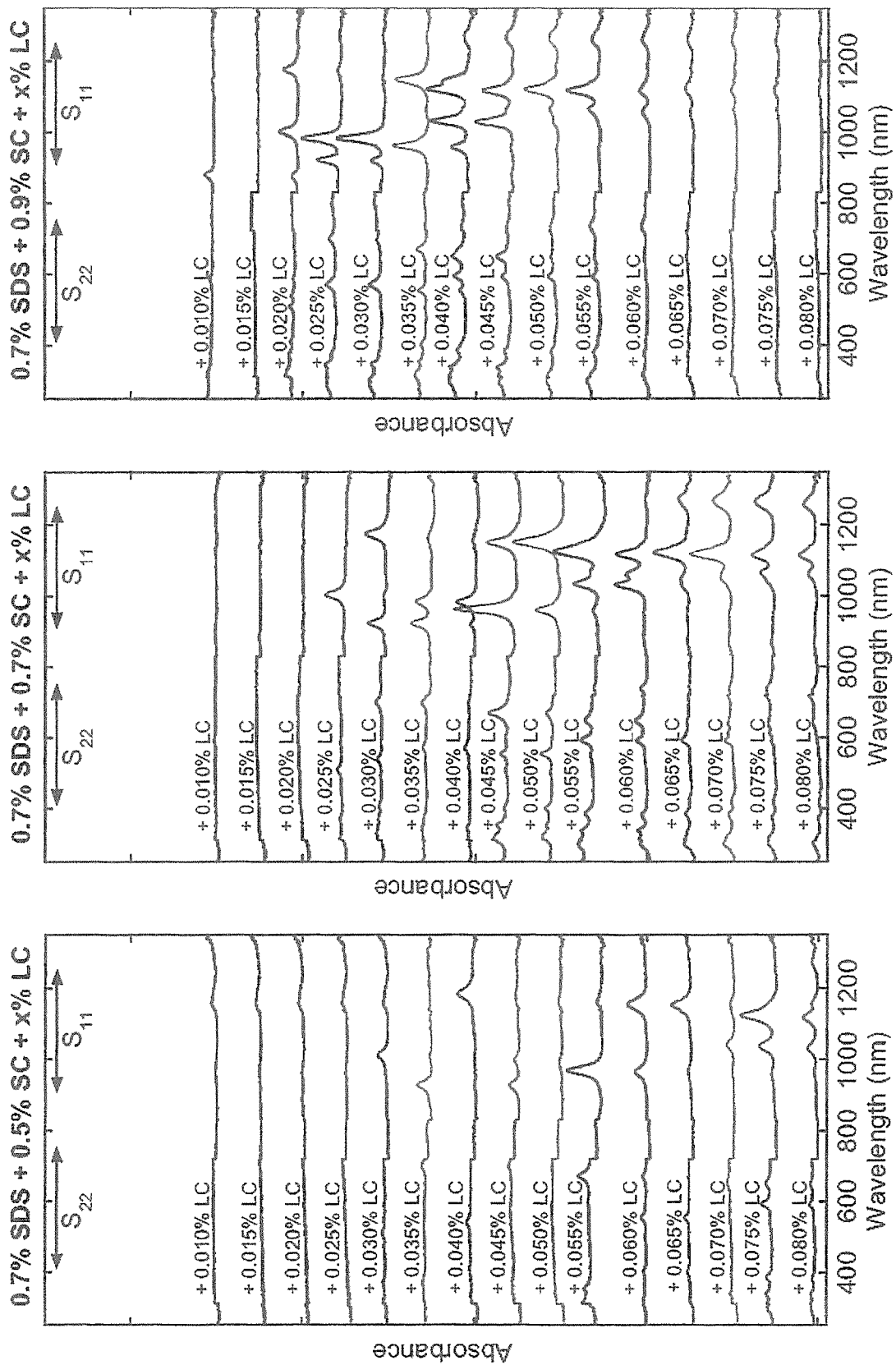

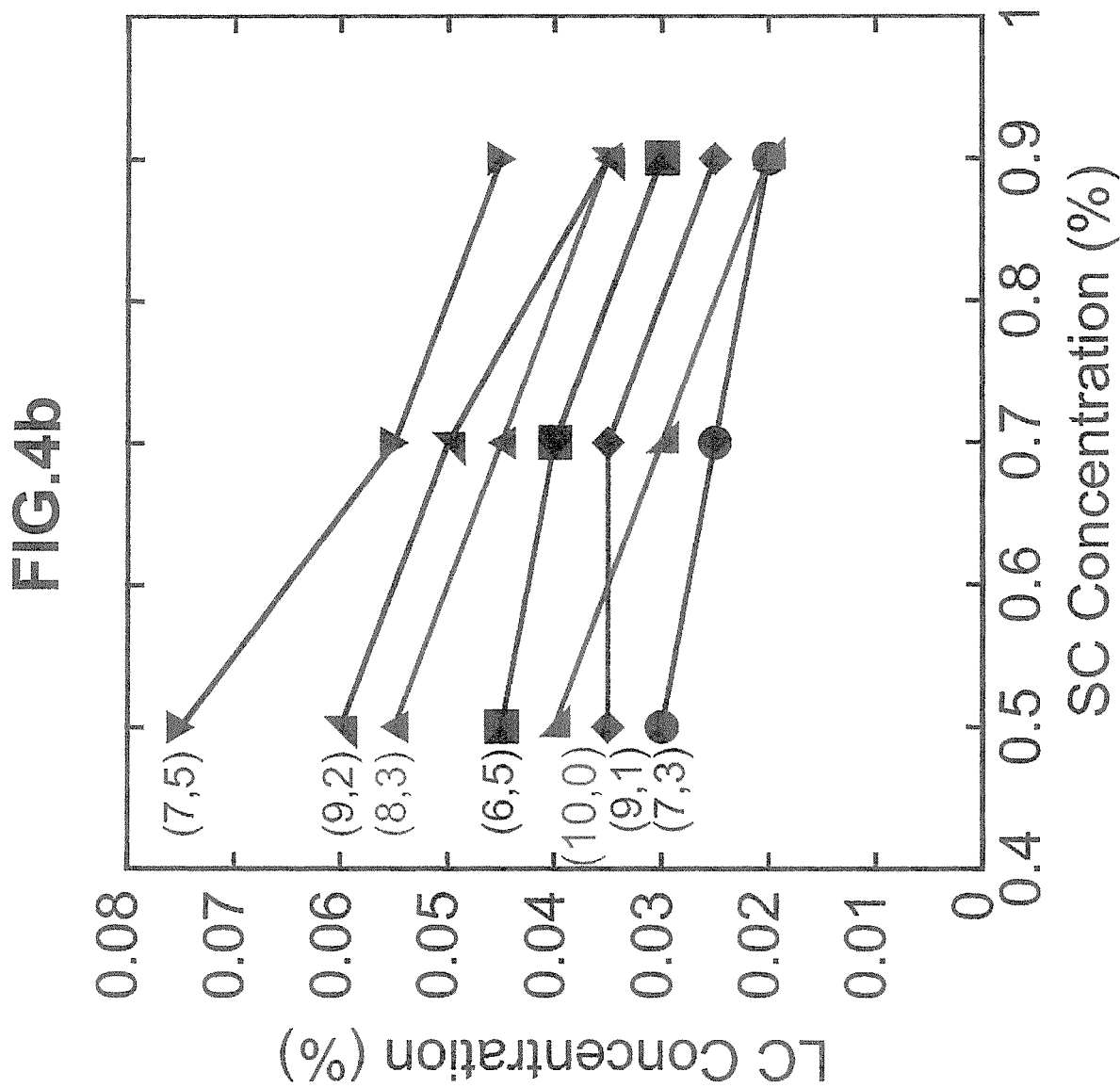

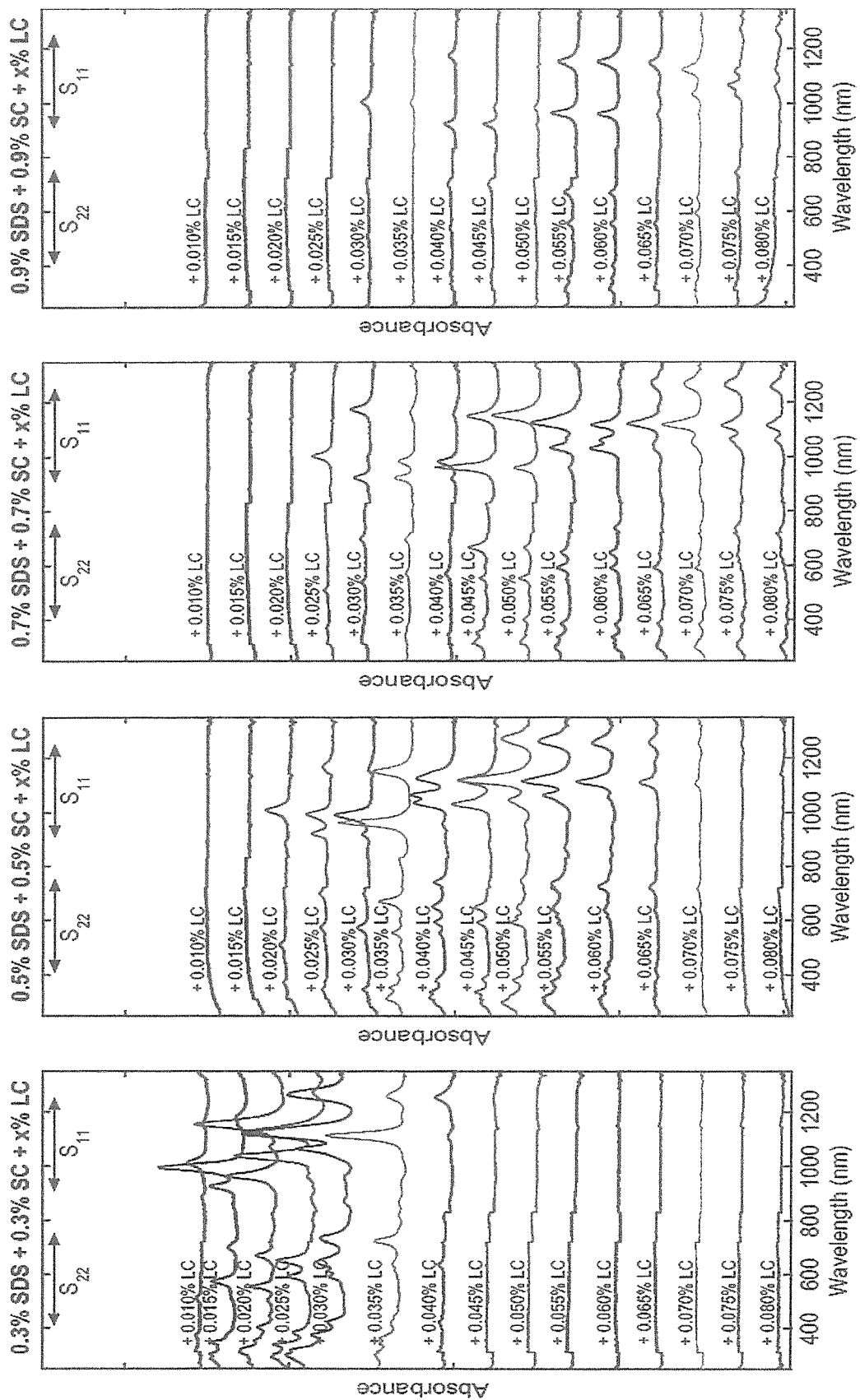

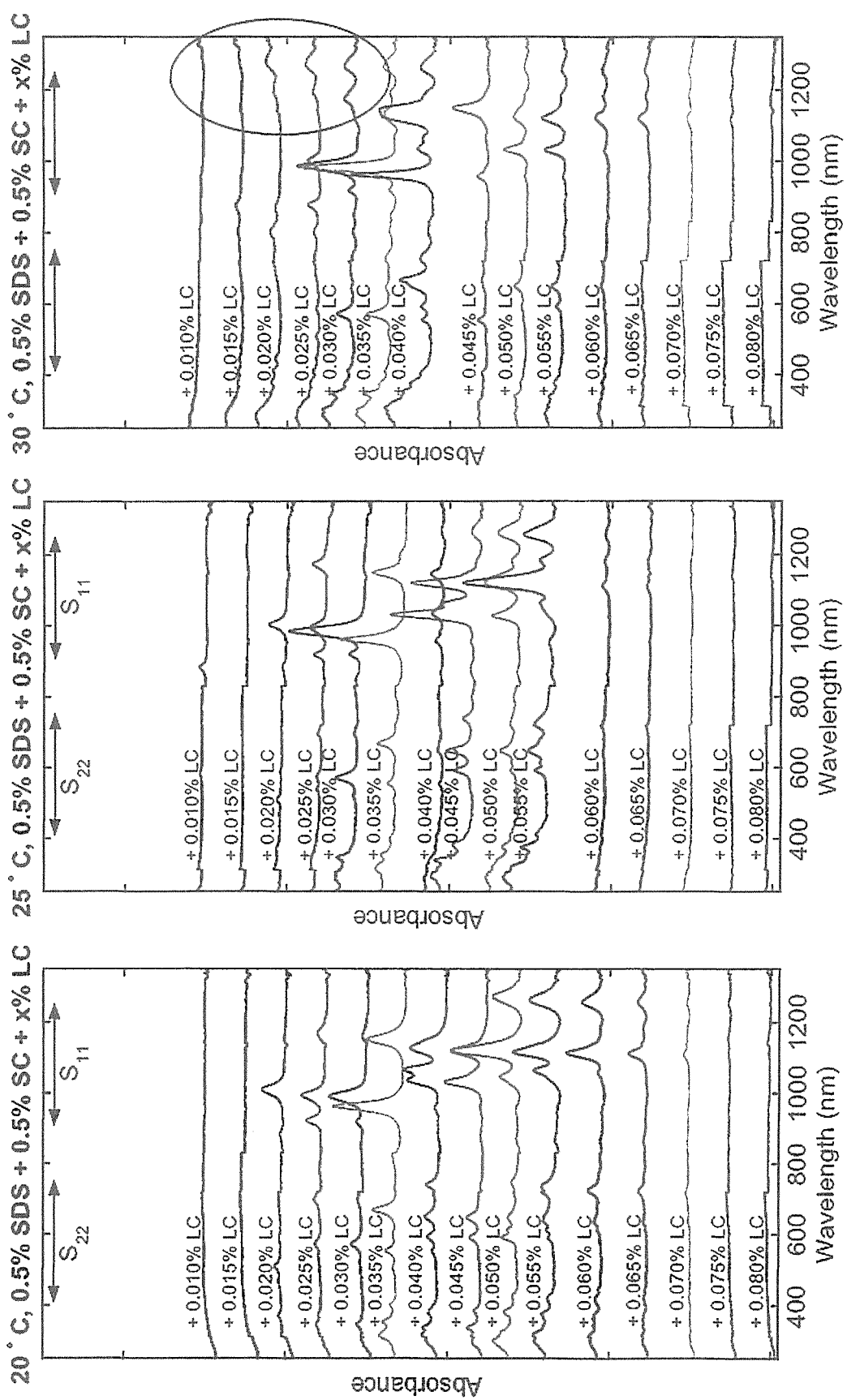

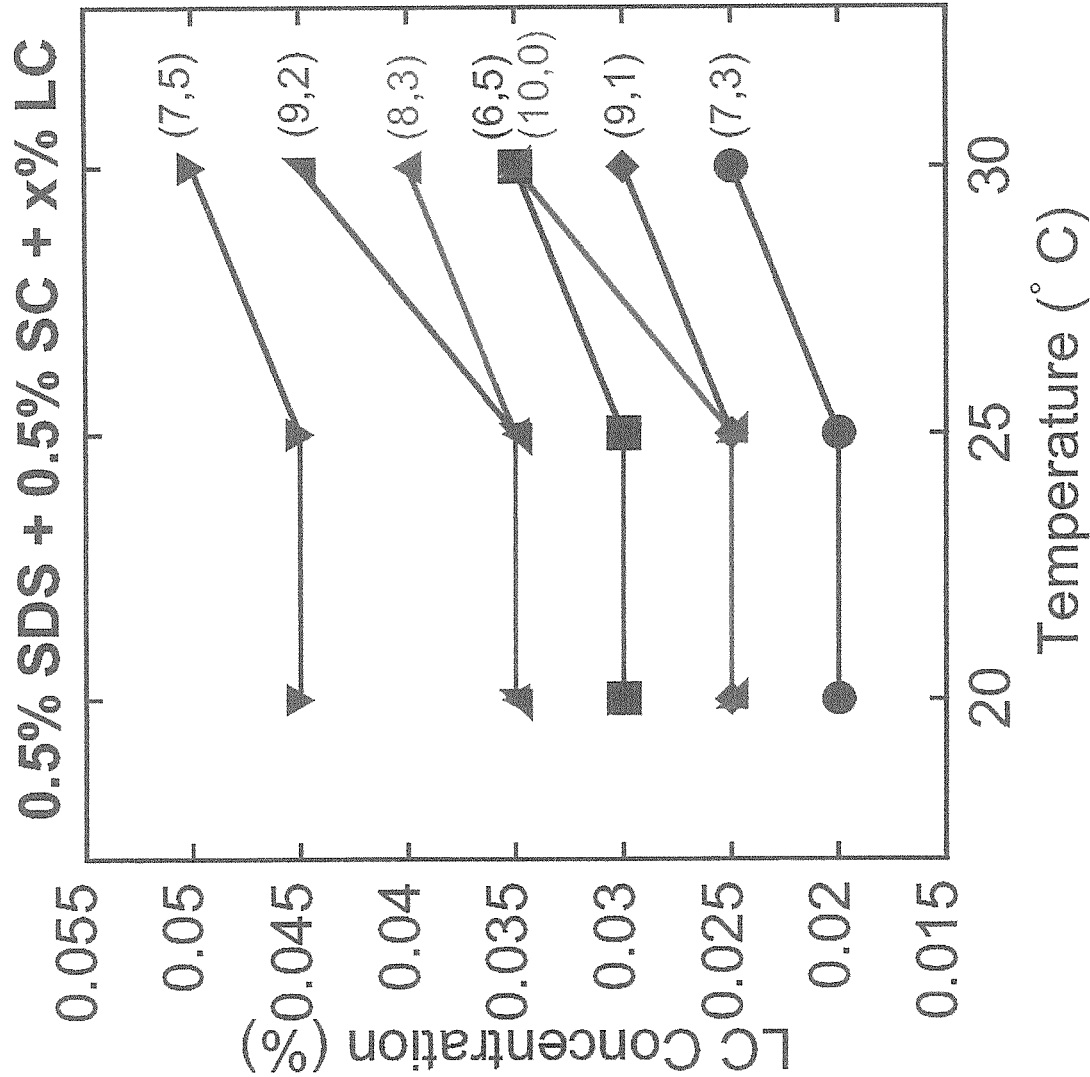

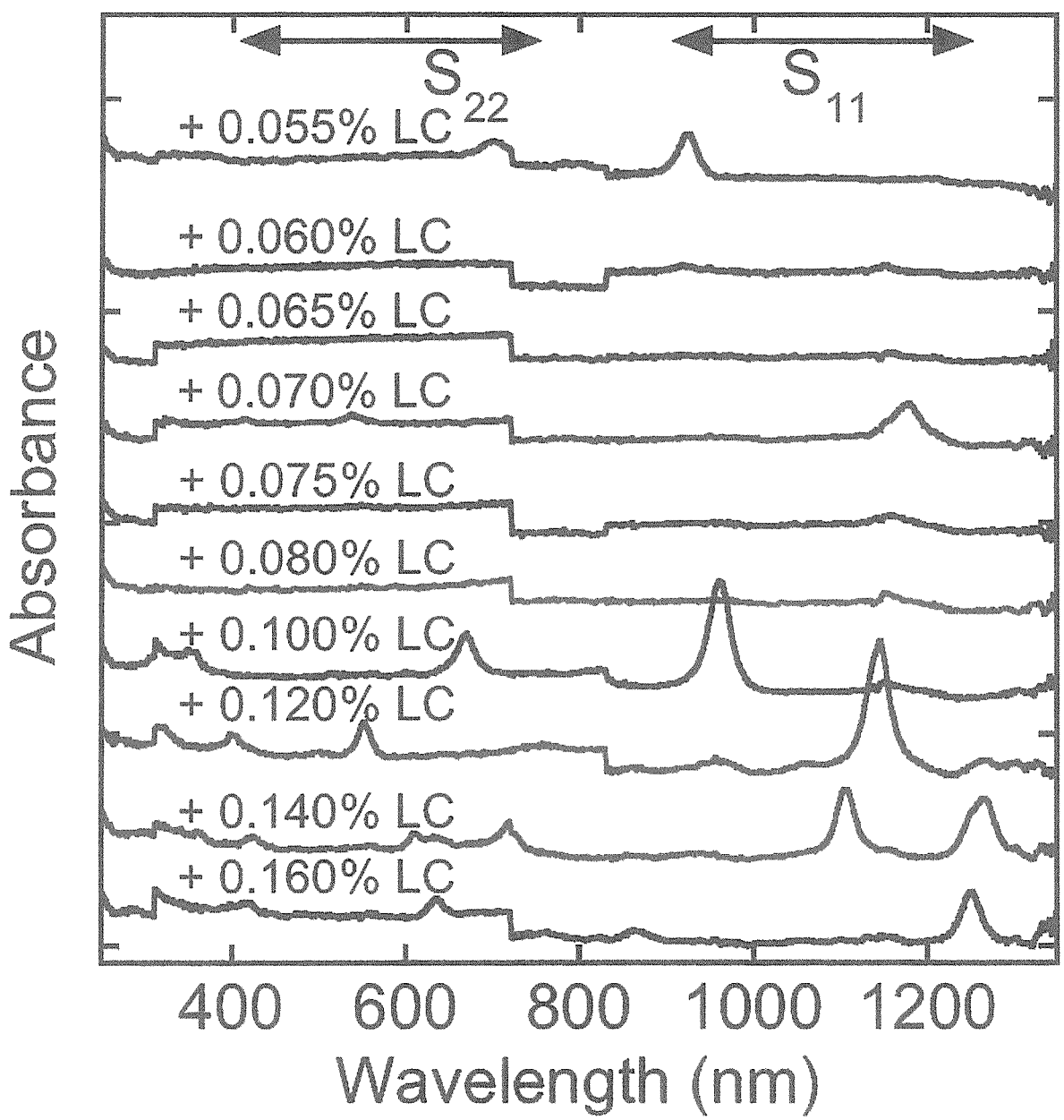

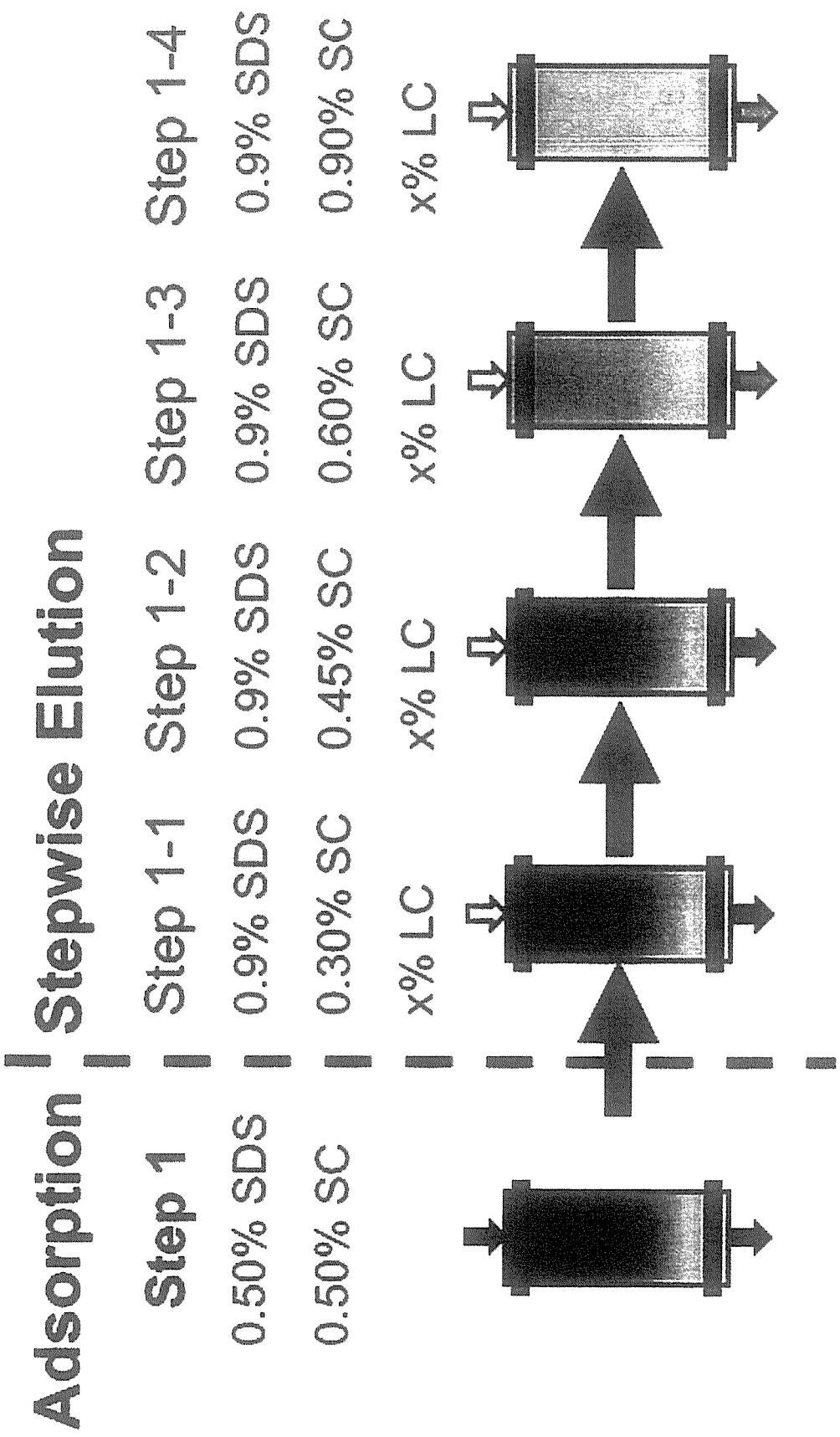

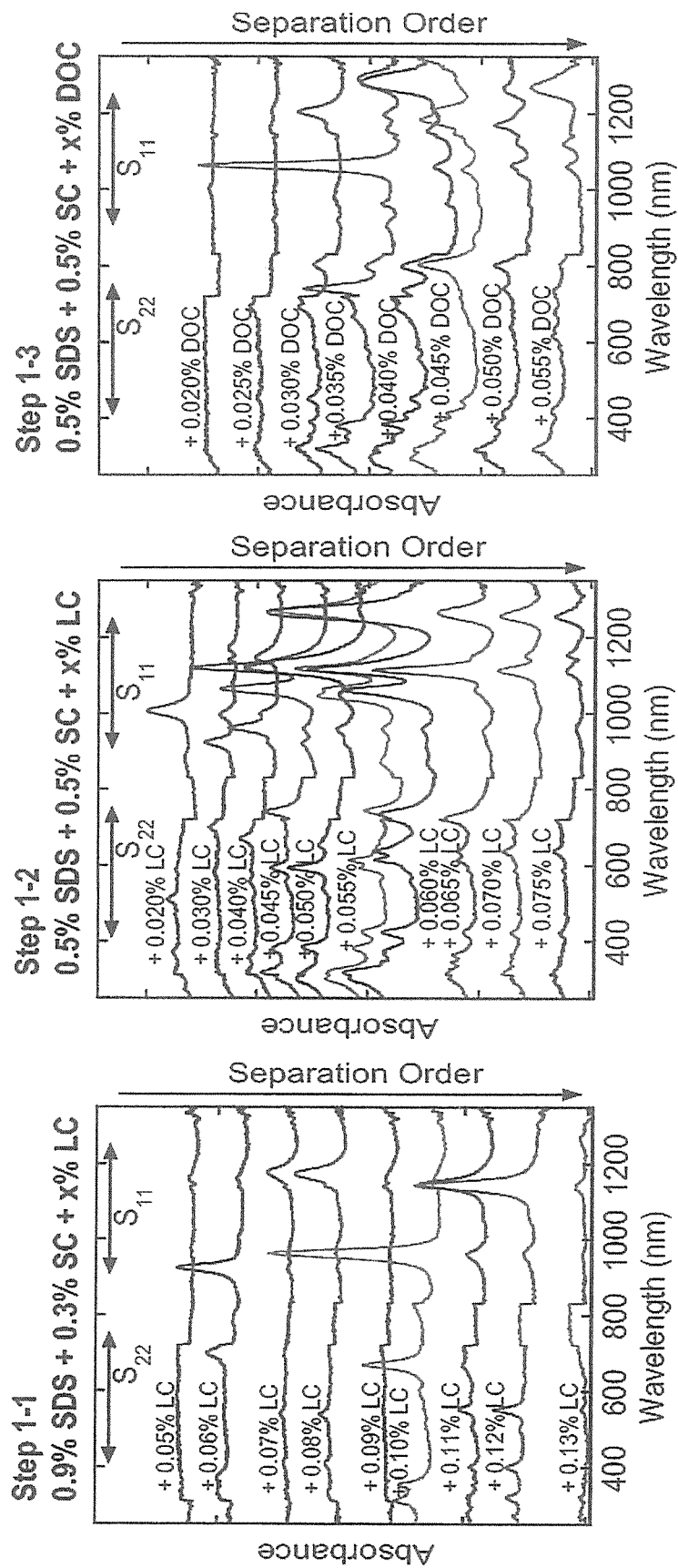

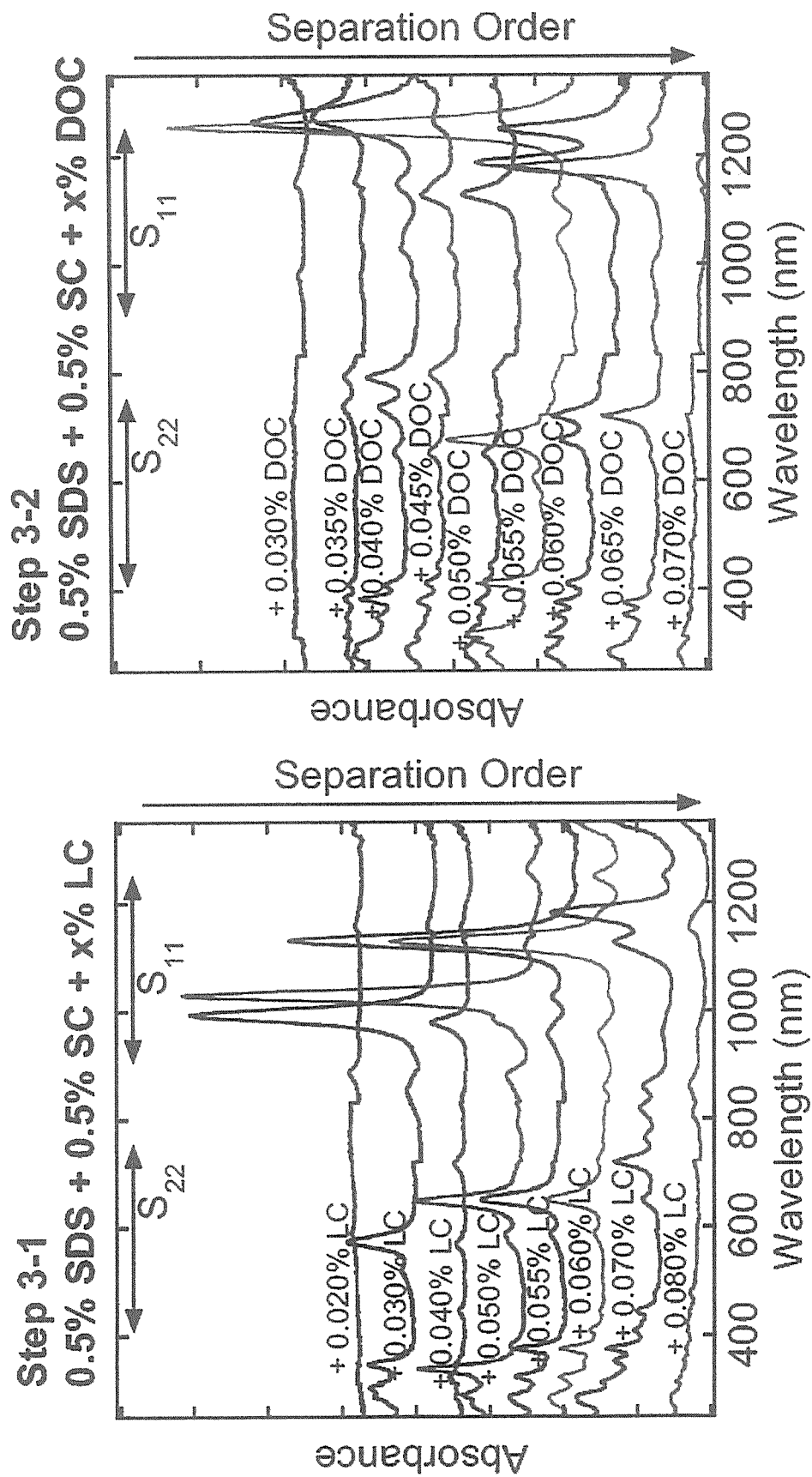

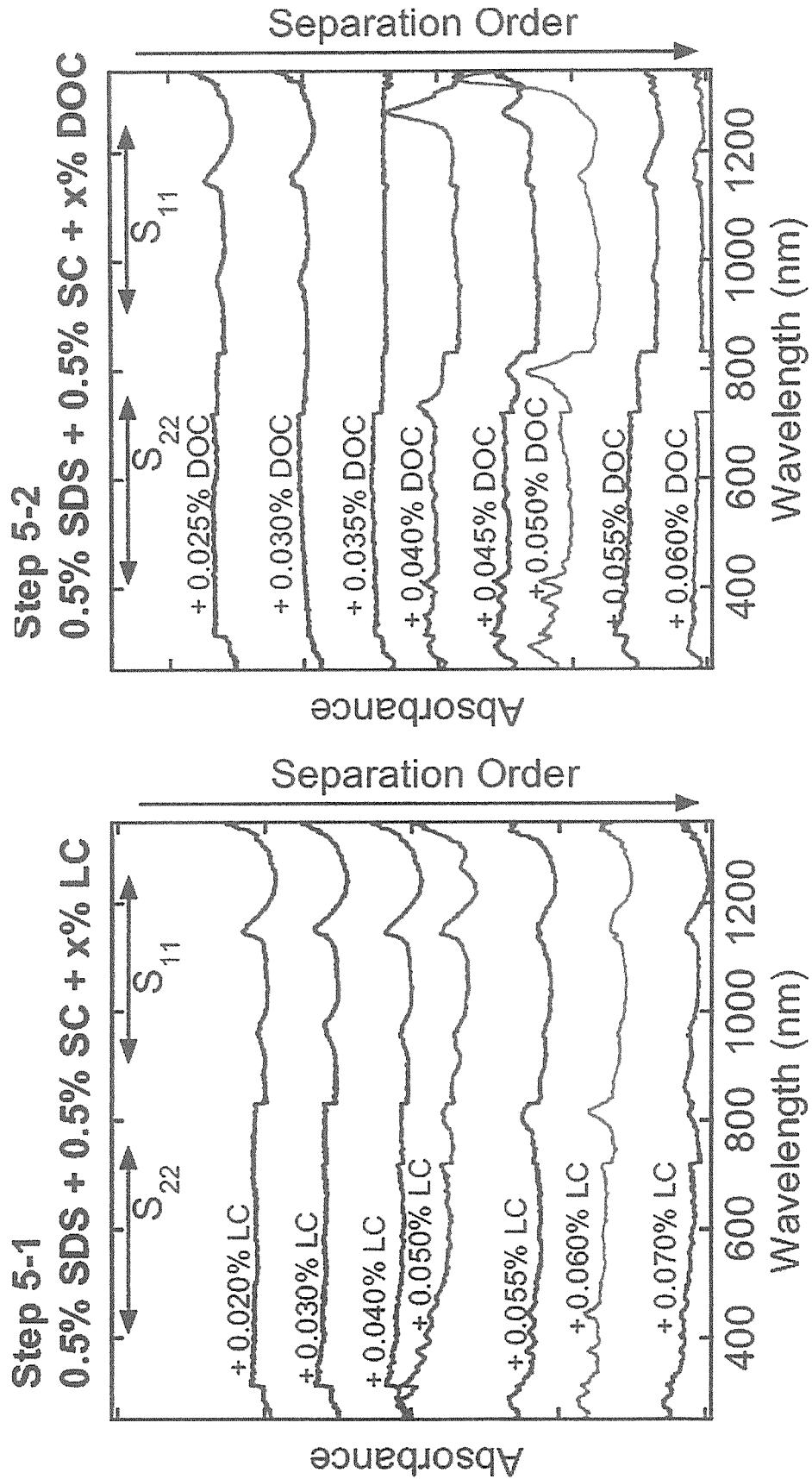

FIG.9h
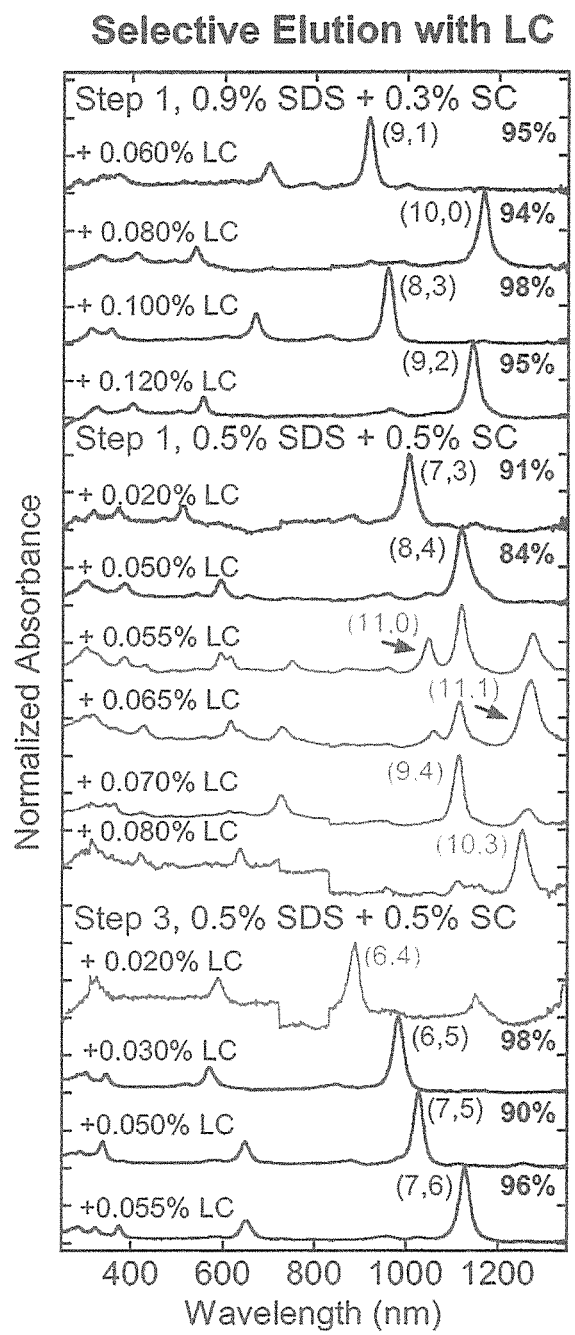
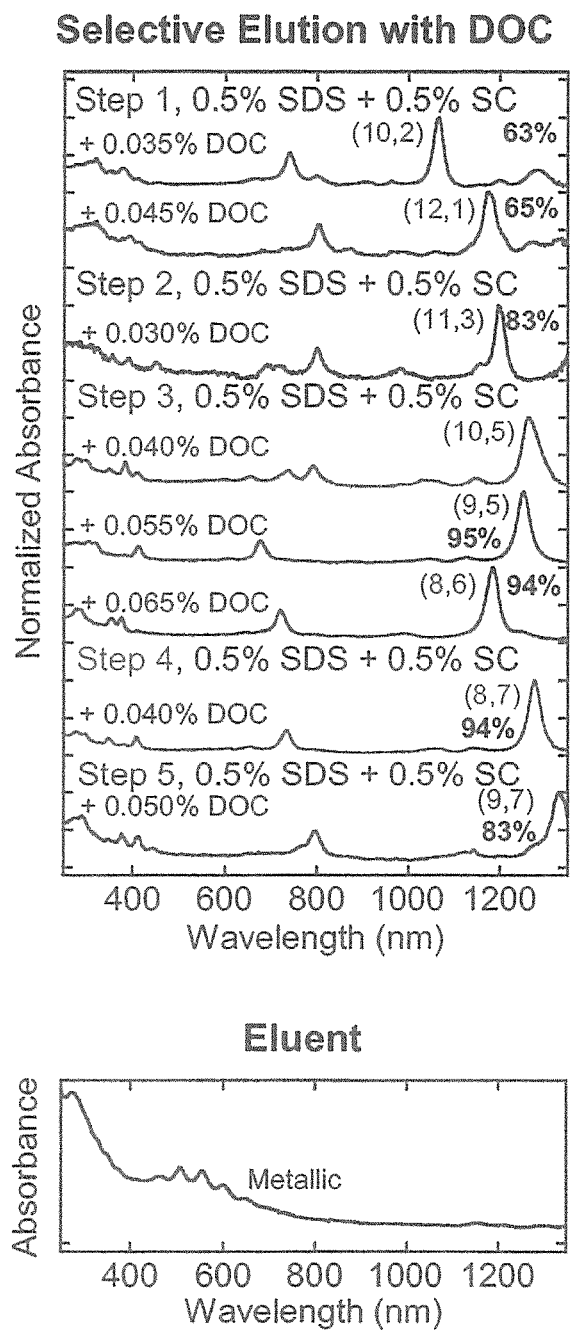

METHOD FOR SEPARATING AND RECOVERING CARBON NANOTUBES

RELATED APPLICATIONS

The present application is National Phase of International Application No. PCT/JP2019/029149 filed Jul. 25, 2019, and claims priorities from Japanese Application No. 2018-141827, filed Jul. 27, 2018, the disclosures of which are hereby incorporated by reference herein in its entirety.

TECHNICAL FIELD

The present invention relates to an aqueous solution for structural separation of carbon nanotubes, a method for separating and recovering carbon nanotubes by use of said aqueous solution, and carbon nanotubes obtained by said method.

BACKGROUND ART

Because of being enhanced in terms of optical features, conductive features, mechanical strength, etc., single-wall carbon nanotubes (CNTs) are now vigorously researched and developed to find out the ultimate new material. CNTs have a structure in which a graphene sheet having a hexagonal arrangement of carbon atoms is seamlessly rounded, and that structure is defined by its rounding direction (chiral angle) and thickness (diameter). CNTs are synthesized by various processes such as laser evaporation, arc discharge, and chemical vapor deposition (CVD). Use of any of such processes is now unable to synthesize only a completely identical structure, ending up with a mixture having numerous different structures. CNTs are capable of turning into metals or semiconductors because their electrical properties varies due to structural differences and even semiconducting CNTs differ in terms of band gap with structural differences. In order to apply CNTs to the electronics field, they are required to be uniform in terms of electrical quality; the separation between metallic and semiconducting CNTs or the separation of single-structure CNTs has actively been studied as an important challenge to the realization of the next-generation electronics.

The structure of a CNT is univocally defined by a chiral index comprising a set of two integers (n, m)(n≥m). CNTs may be broken down into a metallic one and a semiconducting one in terms of electrical quality; the metallic CNT is defined by a chiral index difference (n−m) that is a multiple of integer 3, and the semiconducting CNT is not (Non-Patent Publication 1). Parameters of the CNT structure may be found using the chiral index, and approximate values of typical parameters: diameter d and chiral angle θ may be found from $d=a\{(n^2+m^2+nm)^{1/2}\}/\pi$ and $\tan\theta=(3)^{1/2}m/(2n+m)$, respectively, where a is the lattice length of a graphene hexagonal lattice (0.249 nm; $\sqrt{3}$ times as long as the carbon interatom distance of CNT (0.144 nm) (Non-Patent Publication 1).

So far there have been some researches concerning the separation of single-structure CNTs; however, there is some limitation on how to separate a plurality of single-structure CNTs with high purity. A CNT is an expensive material that often contains a few tens species of different structures. Any method capable of separating single-structure CNTs contained in that material without waste yet with high purity would not only be important for industrial CNT production but also lead to a novel application quite different from conventional applications of an existing CNT comprising a mixture. However, there has been no satisfactory method in the prior art; hence, there is still great demand for a new method.

Any single-structure CNT separation methods reported heretofore in the art have problems with the industrial production of single-structure CNTs, as may be summarized just below: (1) a low recovery per material because there is limitation on the species of single structures to be separated with high purity, (2) expensive installation and chemicals are needed, (3) mass separation is unfeasible, (4) much time is needed, (5) separation is not automated due to complicated steps involved, and so on.

There is a method wherein DNAs bonded to a specific structure CNT are synthesized for extraction by ion exchange chromatography or aqueous two-phase separation (Non-Patent Publications 2, 3). For this method, however, there is the need for separate provision of costly synthetic DNAs having different base sequences for each CNT to be extracted, giving rise to a problem in terms of cost and mass separation. Another problem is that residues remaining after the extraction of one species of single-structure CNT cannot be used ever again, meaning that only one species of CNT may be extracted out of one raw material, resulting in a lower recovery.

There is a method wherein a polymer bonded to CNTs having a specific structure is synthesized and then used for CNT dispersion thereby extracting CNTs having a specific chiral angle (Non-Patent Publication 4). However, the synthesis of a special polymer is again needed for this method, giving rise to a problem in terms of cost and mass separation. Another problem is that the structure capable of separation is limited to CNTs having a large chiral angle, and has a low purity upon separation.

Referring here to a separation method making use of a special dispersant, there are still difficulties with cost and mass separation. In addition, there is a problem in that the operation for removal of the strongly bonded dispersant is required.

On the other hand, a separation method using the surfactant as a commercially available inexpensive dispersant has now attracted attention as a technology capable of providing a solution to the aforesaid problems, inclusive of, for instance, density gradient ultracentrifugation, aqueous two-phase separation, and gel chromatography. The dispersant used in these separation methods is a common one such as sodium dodecyl sulfate (SDS) having a linear structure, and sodium cholate (SC) or sodium deoxycholate (DOC) having a steroid skeleton (Non-Patent Publication 5). Throughout these methods, such surfactants play a common role; with SDS, separation takes place by way of a difference in the CNT's electric characteristics and band gaps, and as SC or DOC is mixed therewith, it causes separation to take place by way of a difference in the CNT's diameter and chiral angle (Non-Patent Publication 5). In recent years, there have been researches wherein different surfactants are mixed together and used in order to make use of different roles (hereafter called selectivity) of such surfactants, resulting in successful high-purity separation of single-structure CNTs without recourse to any special dispersant (Non-Patent Publications 6, 7 and 8). However, even these separation methods have some problems remaining unsolved, as set out below.

There is a method wherein CNTs coated with a surfactant are separated by use of density gradient ultracentrifugation for recovery of CNTs having a specific structure (Non-Patent Publications 6, 7). Problems with this method are that it requires much cost because expensive equipment such an ultracentrifuge is used for an extended period of time, there is no increased throughput owing to much time needed for each separation, mass separation becomes difficult because of some limitation on making the ultracentrifuge large, and there is some difficulty with automation per se.

There is a method wherein CNTs coated with a surfactant are separated by means of an aqueous two-phase separation process using a solution containing two different polymers for recovery of CNTs having a specific structure (Non-Patent Publication 8). In this method, there is limitation on the species of CNTs that can be separated with high purity, and the recovery quantity remains low as well. Another problem with this method is that although depending on raw materials, complicated steps are needed for separation of high-purity, single-structure CNTs, resulting in difficulties with automation.

The inventors have gotten down to the development of a novel method different from conventional ones for separation of CNTs having a specific structure, and invented gel chromatography adapted for separation of CNTs coated with a surfactant using a gel (Patent Publication 1). In that invention, an excess quantity of CNTs coated with SDS is allowed to act on the gel whereby only semiconducting CNTs having a specific single structure can be selectively adsorbed to the gel so that they can be separated and recovered. This method has an advantage of carrying out separation with inexpensive installation whereas it has a disadvantage in that the ratio between the quantity of pouring CNTs into the gel and the quantity of the gel must be kept constant for the purpose of achieving separation with high reproducibility.

Further, the present inventors have developed a novel gel chromatography capable of separating CNTs having a specific structure that cannot so far be separated with high purity by using, in place of an aqueous SDS solution used with the method set forth in Patent Publication 1, an aqueous solution of mixed surfactants comprising SDS mixed with SC and DOC (Non-Patent Publication 9). In this method, CNTs coated with a mixed SDS/SC surfactant prepared in a certain concentration and ratio are first allowed to act on the gel thereby selectively adsorbing a semiconducting CNT having a specific chiral angle to the gel. Then, the aqueous solution of a mixed SDS/SC/DOC surfactant is allowed to act on the gel while the concentration and ratio of SDS/SC are still maintained for elution, separation and recovery of a single-structure CNT having a specific diameter. This method ensures that a chiral angle-separating adsorption step and a diameter-selecting elution step can be carried out in a single separating operation so that the CNT structure determined by two parameters: diameter and chiral angle can be separated with high accuracy. Practically, single-structure CNTs (9,4) and (10,3) that cannot be separated by every process so far in the art are successfully separated. In addition, this method can provide high-reproducibility separation without recourse to such a constant CNT to gel ratio as set forth in Patent Publication 1, and can also be automated for high-purity, short-time mass production in inexpensive installation, having a great advantage of producing single-structure CNTs on an industrial scale.

For the (9,4) and (10,3) species, however, although the process for providing high-purity separation of single-structure CNTs may have been established, it is understood that separation of any other single-structure CNTs could not be achieved. One possible reason for this may be incomplete diameter selectivity of an aqueous solution of mixed SDS/SC/DOC surfactants used in the elution step.

To be more specific, as the concentration of DOC in the aqueous solution of mixed SDS/SC/DOC surfactants grows high, CNTs having a diameter of smaller than 1 nm and CNTs having a diameter of larger than 1 nm are eluted in the same concentration, ending up with a decrease in the respective purities. The diameters of (9,4) and (10,3) are about 1 nm, just halfway between them. For this reason, CNTs having a diameter of smaller than 1 nm and CNTs having a diameter of larger than 1 nm were eluted out of a column, after which they could be separated in the form of CNTs remaining in the column. For the purpose of high-purity separation of single-structure CNTs whose diameter is smaller or larger than those of (9,4) and (10,3), however, preference is given to a surfactant capable of eluting either one rather than both for separation.

Therefore, the present inventors have searched for such surfactants. Referring to the separating method set forth in the aforesaid Non-Patent Publication 9, DOC added in the elution step would appear to contribute to the elution of CNTs because the concentrations of SDS and SC are invariable between the adsorption and elution steps. To search for a surfactant used in place of this DOC, the inventors carried out control experimentation where DOC was replaced by SC having hydrophobicity lower than that of DOC, discovering that the hydrophobicity of a steroid-skeleton surfactant added in the elution step plays an important role in the elution of CNTs (Non-Patent Publication 10).

That is to say, whether the surfactant is SC or DOC, the elution of CNTs having a diameter of smaller than 1 nm and the elution of CNTs having a diameter of larger than 1 nm have been observed, but the accuracy of diameter separation has varied largely with SC having lower hydrophobicity and DOC having higher hydrophobicity; higher hydrophobic DOC have resulted in higher-purity CNTs with less peak species. In addition, easier-to-elute CNTs varied with SC and DOC different in terms of hydrophobicity; CNTs having a diameter of larger than 1 nm were likelier to undergo elution with SC having lower hydrophobicity, whereas CNTs having a diameter of smaller than 1 nm were likelier to undergo elution with DOC having higher hydrophobicity.

PRIOR ARTS

Patent Publications

Patent Publication 1: International Publication WO/2011/108666 Pamphlet

Non-Patent Publications

Non-Patent Publication 1: "Foundation and Application of Carbon Nanotubes", Baifukan, p 8-22
Non-Patent Publication 2: Nature 460, (2009) 250-253
Non-Patent Publication 3: Journal of American Chemistry Society 136, (2014) 10383-10392
Non-Patent Publication 4: Polymer Chemistry 3, (2012) 1966-1970
Non-Patent Publication 5: Topics in Current Chemistry 375, (2017) 1-36
Non-Patent Publication 6: Journal of American Chemistry Society 131, (2009) 1144-1153
Non-Patent Publication 7: Nature Nanotechnology 1, (2006) 60-65
Non-Patent Publication 8: Advanced Materials 26, (2014) 2800-2804
Non-Patent Publication 9: Nature Communications 7, (2016) 12056

Non-Patent Publication 10: The 48th Fullerenes Nanotube Graphene Symposium, (2015) 1-4, p 14
Non-Patent Publication 11: Journal of Lipid Research, 25, (1984) 1447-1489
Non-Patent Publication 12: Advanced Materials, 14, (2004) 1105-1112

SUMMARY OF THE INVENTION

Objects of the Invention

The results of control experimentation of DOC and SC set forth in the aforesaid Non-Patent Publication 10 would teach that a surfactant having hydrophobicity higher than that of DOC makes more accurate separation possible, and is more dedicated to selection of CNTs having a small diameter as well.

Such a surfactant having hydrophobicity higher than that of DOC is thus of great interest in view of separation accuracy and selectivity. However, it has been difficult to search for a steroid-skeleton surfactant having hydrophobicity higher than that DOC, because it is heretofore not used for separation and dispersion of CNTs thanks to its very low solubility in water.

With such situations in mind, the present invention has for its objects to provide an aqueous solution for structural separation of carbon nanotubes, wherein a steroid-skeleton surfactant having hydrophobicity higher than that of DOC is used for accurate separation of carbon nanotubes having a specific structure and a separation/recovery method for carbon nanotubes using the same as well as a carbon nanotube obtained by the same.

Embodiments of the Invention

By study after study for the purpose of providing a solution to the aforesaid problems, the present inventors have discovered that lithocholic acid that has not been used because its hydrophobicity is high and it is by itself insoluble in water becomes soluble in water under properly chosen conditions, providing an aqueous solution for structural separation capable of accurately separating CNTs having a specific structure, and further found out that the following novel functions can be achieved by use of an aqueous solution for structural separation containing this solubilized lithocholic acid.

Function (1): only CNTs having a diameter of smaller than 1 nm are eluted for separation and recovery in descending order of diameter.

Function (2): only CNTs having a specific structure inclusive of (9,1), (10,0), (8,3) and (9,2) are eluted under a specific surfactant condition for separation and recovery in descending order of diameter.

Function (3): any CNTs having a diameter of larger than 1 nm are not eluted so that only CNTs remaining in the column with a diameter of larger than 1 nm are eluted by an aqueous solution of the mixed SDS/SC/DOC surfactants for separation and recovery of single-structure CNTs.

The present invention is based on such novel findings.
In other words, this application provides such inventions as defined below.

[1] An aqueous solution for structural separation of carbon nanotubes, which contains at least one selected from the group consisting of solubilized lithocholic acid and a solubilized lithocholic acid isomer.

[2] The aqueous solution for structural separation of carbon nanotubes according to [1], wherein said lithocholic acid, and said lithocholic acid isomer is solubilized by another surfactant.

[3] The aqueous solution for structural separation of carbon nanotubes according to [2], wherein said another surfactant is sodium dodecyl sulfate and/or sodium cholate.

[4] A method for separation and recovery of carbon nanotubes, characterized by use of the aqueous solution for separation of carbon nanotubes according to any one of [1] to [3].

[5] The method for separation and recovery of carbon nanotubes according to [4], characterized in that the aqueous solution for separation of carbon nanotubes according to any one of [1] to [3] is used for selective separation of carbon nanotubes having a diameter of smaller than 1 nm from a gel to which carbon nanotubes are adsorbed.

[6] The method for separation and recovery of carbon nanotubes according to [5], characterized in that after selective separation of said carbon nanotubes having a diameter of smaller than 1 nm, carbon nanotubes remaining in the gel with a diameter of larger than 1 nm are separated.

[7] The method for separation and recovery of carbon nanotubes according to [4], characterized in that the aqueous solution for separation of carbon nanotubes according to any one of [1] to [3] is used for selective separation of carbon nanotubes having varying chiral indices from the gel to which carbon nanotubes are adsorbed.

[8] A carbon nanotube, separated from a gel, to which carbon nanotubes are adsorbed, by use of the aqueous solution for separation of carbon nanotubes according to any one of [1] to [3], characterized in that a chiral index thereof is only one selected from the group consisting of (9,1), (10,0), (8,3) and (9,2).

Advantages of the Invention

According to the inventive aqueous solution for structural separation of CNTs, it is possible to separate and recover numerous species of single-structure semiconducting and metallic CNTs from the starting CNTs with high accuracy yet without waste. The inventive aqueous solution for structural separation of CNTs may also be applied to the separation of CNTs using gels, inclusive of a continuous-flow separation process using column chromatography and a so-called "batch" separation process wherein a gel is placed in a vessel and allowed to act on a CNTs dispersion liquid. Further, the inventive aqueous solution for structural separation of CNTs may be applied to other separation processes inclusive of separation using gels as well as density gradient ultracentrifugation, and liquid/liquid two-phase separation.

Although the method for separation of single-structure CNTs using synthesized DNAs must make preparations for synthesized DNA having a different base sequence for each structure as described above, it is understood that when semiconducting CNTs having any structure are separated according to the inventive method for separation and recovery of CNTs, all that is needed may be to vary the concentration of the same reagent, accurate separation may be carried out by inexpensive installation, the column may be repeatedly operated, and separation operation may be automated as well. These advantages could lead to large cost reductions.

BRIEF EXPLANATION OF THE DRAWINGS

FIG. 1a is indicative of the light absorption spectra of samples separated and obtained by SDS/SC/LC elution in 0.5% SDS/0.5% SC. The following LC stands for solubilized lithocholic acid (3α-hydroxy-5β-cholanoic acid) inclusive of a lithocholate.

FIG. 1b is indicative of the light absorption spectra of samples separated and obtained by SDS/SC/DOC elution in 0.5% SDS/0.5% SC.

FIG. 1f is indicative of the DOC concentration vs. CNT diameter relations needed for SDS/SC/DOC elution in 0.5% SDS/0.5% SC.

FIG. 2a is indicative of the light absorption spectra of samples separated and obtained by SDS/SC/LC elution in 0.5% SDS/0.5% SC.

FIG. 2b is indicative of the light absorption spectra of samples separated and obtained by SDS/SC/DOC elution in 0.5% SDS/0.5% SC after the addition of SDS/SC/LC.

FIG. 3a is indicative of the light absorption spectra of samples separated and obtained by SDS/SC/LC elution in varying SDS concentrations.

FIG. 3b is indicative of the LC concentration vs. SDS concentration relations needed for SDS/SC/LC elution.

FIG. 4a is indicative of the light absorption spectra of samples separated and obtained by SDS/SC/LC elution in varying SC concentrations.

FIG. 4b is indicative of the LC concentration vs. SC concentration relations needed for SDS/SC/LC elution.

FIG. 5a is indicative of the light absorption spectra of samples separated and obtained by SDS/SC/LC elution in varying SDS and SC concentrations.

FIG. 6a is indicative of the light absorption spectra of samples separated and obtained by SDS/SC/LC elution at varying temperatures.

FIG. 6b is indicative of the LC concentration vs. temperature relations needed for SDS/SC/LC elution.

FIG. 7a is indicative of the light absorption spectra of samples separated and obtained by SDS/SC/LC elution in 0.9% SDS/0.3% SC.

FIG. 8a is illustrative of the method for separation and recovery of single-structure CNTs using a single column.

FIG. 9b is indicative of the light absorption spectra of samples obtained in the $1^{st}$ step of separation using a plurality of columns.

FIG. 9d is indicative of the light absorption spectra of samples obtained in the $3^{rd}$ step of separation using a plurality of columns.

FIG. 9f is indicative of the light absorption spectra of samples obtained in the $5^{th}$ step of separation using a plurality of columns.

FIG. 9h is indicative of the light absorption spectra of single-structure CNTs obtained by separation using a plurality of columns and the purity of a single chirality calculated out of the light absorption spectra.

MODES FOR CARRYING OUT THE INVENTION

Figure 1C:
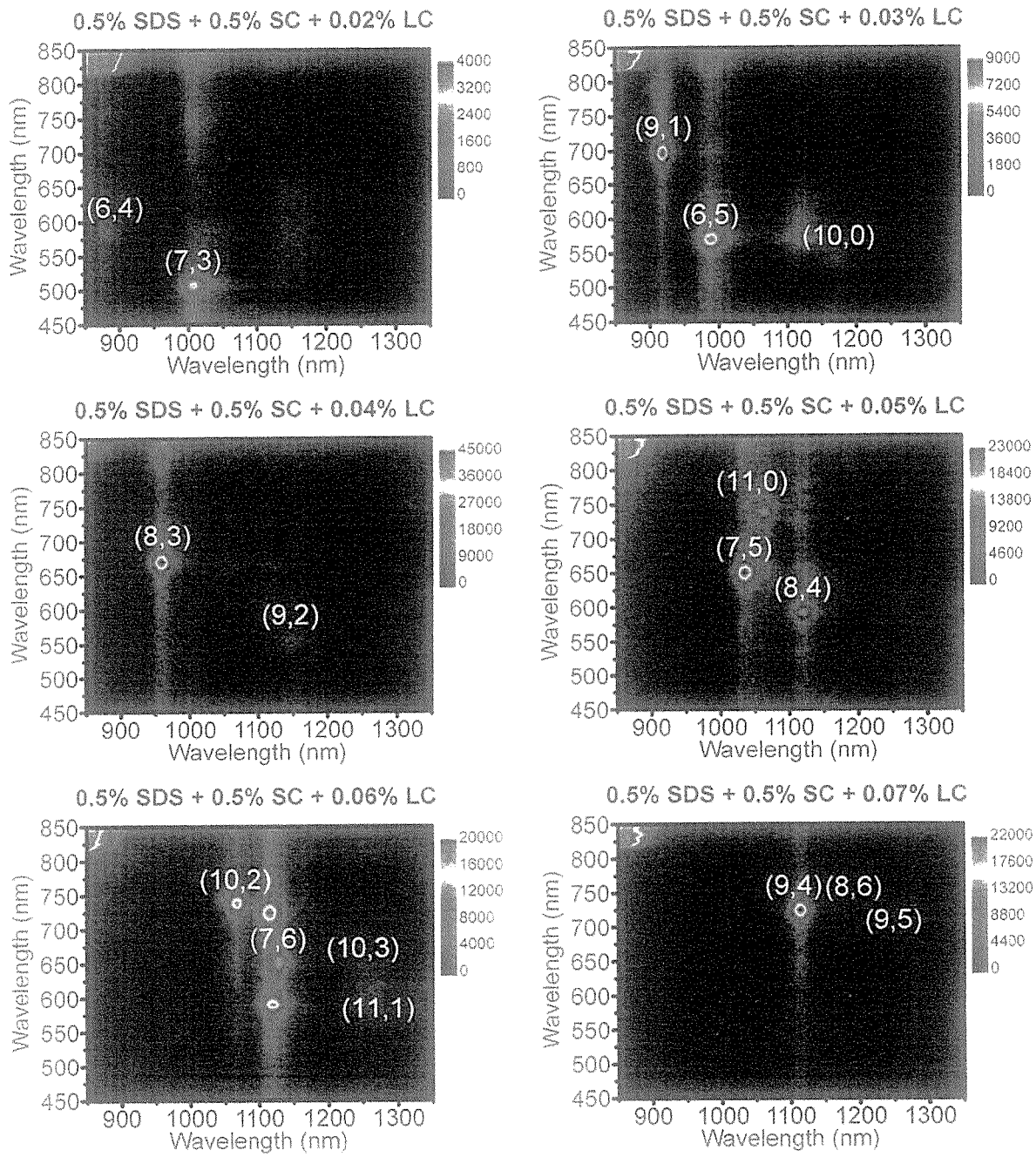
FIG. 1c is indicative of the fluorescence spectra of samples separated and obtained by SDS/SC/LC elution in 0.5% SDS/0.5% SC.

The present invention will now be explained below.

Lithocholic acid is of high hydrophobicity and substantially insoluble in water because of having hydrophilic hydroxyl groups less than those of cholic acid or deoxycholic acid having a similar steroid skeleton. The solubility of lithocholic acid in water is 0.000002%, and isomers having a hydroxyl group at 3β rather than 3α position, or 7α or 7β position have a low solubility value as well (Non-Patent Publication 11).

While some surfactants in a monomolecular form are insoluble in water, they may be soluble in water because of forming a micelle having a plurality of associated molecules. However, lithocholic acid has a micelle formation temperature of higher than 65° C., meaning that it cannot form any micelle at room temperature. A lithocholate that is a salt of lithocolic acid is also not used for CNT dispersion due to its slight solubility in water (Non-Patent Publication 2). Thus, lithocholic acid has also not been used as any surfactant for separation.

On the other hand, cholic acid, deoxycholic acid, taurocholic acid, and taurodeoxycholic acid having a similar steroid skeleton form a micelle at room temperature, and become soluble in water by itself, and salts thereof are soluble in water as well so that they are widely used as surfactants for dispersion and separation of CNTs.

According to the invention, lithocolic acid and its isomers that have hardly be used so far because of high hydrophobicity and insolubility in water in a single form are made soluble in water under proper conditions, providing an aqueous solution for structural separation capable of accurately separating CNTs having a specific structure.

In place of the aqueous solution of mixed SDS/SC/DOC surfactants set forth in Non-Patent Publication 9, an aqueous solution containing lithocolic acid or a lithocholic acid isomer solubilized according to the invention was used in the elution step of CNTs adsorbed to a gel. As a result, the aqueous solution has been found to have the following functions.

Function (1): only CNTs having a diameter of smaller than 1 nm are eluted for separation and recovery in descending order of diameter.

Function (2): only CNTs having a specific structure inclusive of (9,1), (10,0), (8,3) and (9,2) are eluted under a specific surfactant condition for separation and recovery in descending order of diameter.

Function (3): any CNTs having a diameter of larger than 1 nm are not eluted so that only CNTs remaining in the column with a diameter of larger than 1 nm are eluted by an aqueous solution of mixed SDS/SC/DOC surfactants for separation and recovery of single-structure CNTs.

Three such novel functions make it possible to separate single-structure CNTs that could not be isolated by use of an aqueous solution of conventional surfactants, resulting successfully in exhaustive separation from the raw material of 22 species of semiconducting CNTs having a diameter in the vicinity of 1 nm, inclusive of 16 species of high-purity, single-structure CNTs. Metallic CNTs can also be recovered after the separation of semiconducting CNTs.

Three such functions as provided by an aqueous solution for structural separation containing lithocholic acid solubilized according to the invention are quite different from those provided by a conventional aqueous solution for structural separation containing SC or DOC, as described below.

In other words, a prior art aqueous solution for structural separation containing SC or DOC has acted on both CNTs having a diameter of smaller than 1 nm and CNTs having a diameter of larger than 1 nm, preventing an enhancement in the accuracy of separation thanks to such incomplete diameter selectivity. On the contrary, an aqueous solution for structural separation containing lithocholic acid or lithocholic acid isomer solubilized according to the invention is of complete diameter selectivity in the sense of acting on only CNTs having a diameter of smaller than 1 nm, thereby making accurate separation possible. From the previous report (Non-Patent Publication 10), it has been expected that a surfactant whose hydrophobicity is higher than that of DOC would act mainly on the separation of CNTs having a diameter of smaller than 1 nm; however, the complete diameter selectivity of acting on only CNTs having a diameter of smaller than 1 nm is a function that cannot be predicted from the previous report whatsoever. Lithocholic acid and its isomers are of extremely high hydrophobicity and hardly soluble in water; there is none of the cases where lithocholic acid and its isomers are used for an aqueous solution for CNT separation or an aqueous solution for CNT dispersion. For this reason, the method of the invention, wherein lithocholic acid or its isomer is solubilized to provide unprecedented functions, is quite unique, and the method for separation and recovery of CNTs using an aqueous solution for separation containing lithocholic acid solubilized according to the invention ensures that the species of single structures to be separated reach a maximum in number among all existing separation/recovery methods.

Lithocholic acid used herein, the surfactants needed for solubilization and bases are inexpensive, commercially available chemicals. They are combined with separation methods using gels (Non-Patent Publication 9 or the like) so that a large amount of CNTs can automatically be separated in inexpensive installation for a short period of time with high purity, which is extremely useful for mass production of single-structure CNTs on an industrial scale. As described above, it is known that methods for separation of CNTs using gels are carried out according to similar principles using a common surfactant: they may be applied not only to separation by gels but also to separations such as density gradient ultracentrifugation separation, and liquid/liquid two-phase separation.

The present invention will now be explained in further details.

Lithocholic Acid and Lithocholic Acid Isomers

Among cholic acids having a steroid skeleton, lithocholic acid used herein has only one hydroxyl group, as represented by $3\alpha$-hydroxy-$5\beta$-cholic acid and its enantiomer.

Lithocholic acid may include an isomer having only one hydroxyl group. Typically, the isomer comprises diastereomer wherein the hydroxyl group is located in $3\beta$ position rather than $3\alpha$ position and its enantiomer, diastereomer wherein the hydroxyl group is located in $7\alpha$ position rather than $3\alpha$ position and its enantiomer, or diastereomer wherein hydrogen is located in $5\alpha$ position rather than $5\beta$ position and its enantiomer (see Non-Patent Publication 11).

Having very similar physicochemical qualities such as solubility in water, these isomers are all capable of solubilization, but commercially available $3\alpha$-hydroxy-$5\beta$-cholic acid is preferred in view of cost.

Lithocholic acid turns into a lithocholic acid salt by way of neutralization reaction with a base. For instance, when it undergoes neutralization reaction with sodium hydroxide, there is sodium lithocholate salt obtained. When there is lithocholic acid or the lithocholate salt in water, the proportion of lithocholic acid grows high under acidic conditions whereas the proportion of lithocholate salt grows high under alkaline conditions. This is also true of lithocholic acid isomers.

Therefore, the lithocholic acid and lithocholic acid isomer solubilized according to the invention include their salts.

Any base may be used for neutralization of lithocholic acid and a lithocholic acid isomer, in which any lithocholate salt and any lithocholic acid isomer may be used. However, it is understood that the lithocholate salt and lithocholic acid isomer salt are preferably of the same type as the surfactant to be mixed with the inventive aqueous solution for structural separation. For instance, sodium salts such as sodium dodecyl sulfate and sodium cholate are primarily used for the dispersion and separation of CNTs. It is then preferable to use a sodium salt obtained by using sodium hydroxide as the base to be added to lithocholic acid.

Solubilization

In one embodiment of solubilizing lithocholic acid and lithocholic acid isomer according the invention, they are solubilized by way of neutralization reaction in an aqueous solution of other surfactant, and the resulting aqueous solution for separation containing lithocholic acid and lithocholate salt is used.

Specifically, lithocholic acid and its isomer that are each insoluble in water by itself are first mixed with an aqueous solution of other surfactant, and then solubilized under pH control.

For the other surfactant used for solubilization of lithocholic acid and its isomer, any of anionic surfactants, cationic surfactants, amphoteric surfactants, and nonionic surfactants may be used with the proviso that they can solubilize lithocholic acid and its isomer. These surfactants may be used alone or in admixtures. Note here that the surfactant needed for structural separation of CNTs contains an alkyl sulfate having 10 to 14 carbon atoms, dodecane sulfonic acid, dodecanoylsarcosine, dodecanoic acid, cholic acid, n-dodecylphosphocholine and so on, among which sodium dodecyl sulfate (SDS) and sodium cholate (SC) are most preferable in view of versatility because they are used with a variety of CNT separation processes inclusive of separation using gels, density gradient ultracentrifuge separation, and liquid/liquid two-phase separation.

These surfactants used for solubilization of lithocholic acid and its isomer may be used in combination with other materials such as high-molecular polymers, DNAs, proteins, alcohols and organic solvents.

In the invention, while the concentrations of the surfactants used for solubilization vary with the types and concentrations of the CNTs used, the types of the surfactants used, the separation methods used, and so on, it is understood that they may be used in 0.01% to 25% as an example.

Referring to the solubilization of lithocholic acid and its isomer, pH control is needed for the solubilization of lithocholic acid and its isomer that are each insoluble in water by itself; it is carried out by the addition of a base. The base may be added before or after the mixing of lithocholic acid and its isomer with an aqueous solution of other surfactants. While any base may be used as that base, it is understood that a base that forms a sodium salt to be used for structural separation of CNTs is preferred in view of versatility.

Aqueous Solution for Structural Separation

Any concentration may be used as the concentrations of lithocholic acid and lithocholic acid isomer solubilized in the inventive aqueous solution for structural separation; a preferable concentration varies with the species and concentrations of the CNTs used, the types of the surfactants used, the separation processes used, and so on. For instance, when so-called HiPco CNT species are separated in an aqueous solution of mixed SC/SDS, practically all CNTs may be separated in a range of 0.005% to 0.4%.

Separation of CNTs Using the Inventive Aqueous Solution for Structural Separation In the present invention, there is no limitation imposed on the processes and means using the inventive aqueous solution for structural separation. For instance, CNTs and a density gradient agent may be added to the inventive aqueous solution for structural separation of CNTs due to density differences. Alternatively, the inventive aqueous solution for structural separation may be allowed to act on two types of liquids to undergo phase separation thereby causing separation of CNTs contained in the aqueous solution for structural separation or separation of CNTs dispersed in the two liquids. Yet alternatively, the inventive aqueous solution for structural separation may be allowed to act on a gel for separation of CNTs contained in the aqueous solution for structural separation or separation of CNTs adsorbed to the gel.

While the separation temperature varies with the type of surfactant used, the separation process used and so on, it is understood that any temperature may be used. Note here that at a temperature of higher than 30° C., the solubilized lithocholic acid would also act on CNTs having a diameter of larger than 1 nm, ending up with a loss of the complete diameter selectivity: a temperature of less than 30° C. is preferred.

In the invention, it does not matter whether or not the inventive aqueous solution for structural separation contains CNTs. Thus, it may also be used as a CNT-containing dispersion aqueous solution or a CNT-free aqueous solution dedicated to separation alone. With a mixed SDS/SC/DOC surfactant having the same surfactant concentration, similar effects have actually been obtained at the time when a CNT-containing aqueous solution is allowed to act on a column and at the time when a CNT-free aqueous solution is allowed to act on a column to which CNTs are adsorbed (Non-Patent Publication 9).

When the inventive aqueous solution for structural separation is used for separation using gels, it may be employed in both an adsorption step to a gel and an elution step from the gel. In the adsorption step, the inventive aqueous solution for structural separation having CNTs dispersed in it is added to a column for selective adsorption of CNTs having a specific structure. Because, in this case, the separation by the inventive aqueous solution for structural separation takes place in the adsorption step, what will happen in the subsequent elution step does not matter. When the inventive aqueous solution for structural separation is used in the elution step, it is added to a column to which CNTs are adsorbed for selective elution of CNTs having a specific structure. Because, in this case, the separation by the inventive aqueous solution for structural separation takes place in the elution step, what happened in the previous adsorption step does not matter. Note here that in the adsorption and elution steps, there is preferably no variation of other components than the lithocholic acid and lithocholic acid isomer solubilized according to the inventive aqueous solution for structural separation. This helps prevent elution of CNTs due to a change in other components to make use of only an effect arising from a change in the solubilized lithocholic acid or lithocholic acid isomer. A merit of using the inventive aqueous solution for structural separation in the elution step is that after its addition, an aqueous solution for structural separation having an increased surfactant concentration is added so that CNTs incapable of elution under the previous conditions can be eluted, making it possible to use a single column for separation under a plurality of conditions. If changes in the concentration of the surfactant added to the aqueous solution for structural separation are kept small, even CNTs hard to separate under similar conditions can then be accurately separated.

Gel Used Herein

The gels used herein may be well-known glucide or saccharide-based gels such as dextran-based gels (Sephacryl: a homopolymer of allyl dextran and N,N'-methylenebisacrylamide made by GE Healthcare), agarose gels, starch gels, acrylamide gels, and so on. The gel used herein may comprise a mixture of such gels, or a mixture or compound of gel constituents with other substances.

The gel concentration may be set such that the final concentration will be 0.01% to 25%.

When the inventive method for separation and recovery of CNTs is in the form of a gel separation process, it may be applied not only to a column process but also to a batch process. For the separation using a column, a liquid may be fed to the column while a solvent falls down due to gravity in an open column or, alternatively, a solution may be fed by a pump to a closed column. In the separation process using a pump, a flow rate may be increased for mass processing. Automatic separation may also be carried out using chromatography equipment.

In the method for separation and recovery of CNTs according to the invention, the conditions under which the functions work (conditions for preparation of a solubilized lithocholic-acid-containing aqueous solution for structural separation, and concentrations and temperatures of surfactants) are set in the examples described below. Note here that such conditions are provided for predetermined environments concerning the species of CNTs used, the species of gels used or the like, but they may otherwise be varied depending on the environments.

It is here noted that CNTs "having a specific structure" to be separated and recovered according to the invention include those having a specific structure defined by diameter, chirality, local radius of curvature, and a combination thereof, and have characteristic features based on that structure, which features may be clearly distinguished from those of CNTs before the separation operation by measurements of ultraviolet/visible/near-infrared light absorption spectra, fluorescence spectra, Raman spectra, etc. Therefore, such CNTs obtained after separation and recovery with a specific structure may comprise a mixture having two or more species extracted as the specific structure, to say nothing of CNTs composed substantially of a single-structure. Within a range where the fact that such CNTs having a specific structure are selectively separated and recovered can be confirmed based on such measurements as mentioned above, the CNTs may comprise a mixture including a slight amount of other arbitrary structures.

The present invention is applied to a mixture containing metallic CNTs and semiconducting CNTs (hereafter simply called the CNTs) or a mixture of semiconducting CNTs having varying structures, and relates to a method for separating the mixture into metallic and semiconducting CNTs, and separating semiconducting CNTs having varying structures, or a method for separating CNTs having varying structures.

In the method for separating CNTs having varying structures according to the invention, the aqueous solution for structural separation containing a solubilized lithocholic acid or a solubilized lithocholic acid isomer is added to a column having CNTs adsorbed to it for selective elution of CNTs having a specific diameter and chiral angle or, alternatively, the CNTs remaining in the column are then used.

Any CNTs may be used for the inventive separation without giving rise to problems in terms of production processes, shapes (such as diameter and length), structures (such as single and double layers), and so on.

Preparation of the CNT Dispersion Liquid

Synthesized CNTs are usually in the form of dozens to hundreds of bundles containing both metallic CNTs and semiconducting CNTs. Prior to separation of metallic CNTs and semiconducting CNTs or separation of CNTs due to structure, it is of importance that they are dispersed and solubilized into an isolated state for each bundle so that they can exist stably over an extended period of time.

More specifically, the mixture of CNTs is added to a solution to which surfactants are added as a dispersant, and then fully treated with ultrasonic waves to disperse and isolate the CNTs. The solution subjected to this dispersal treatment contains dispersed/isolated CNTs, CNTs that remain bundled because they are not dispersed and isolated, amorphous carbon that is a byproduct of synthesis, metal catalysts, and so on.

The dispersion liquid obtained after ultrasonic wave treatment is centrifuged by a centrifugal separator thereby causing precipitation of CNTs remaining bundled, amorphous carbon and metal catalysts, but isolated CNTs forming micelles with the surfactants can be recovered in a supernatant form. The thus obtained supernatant provides a sample used for separation of CNTs.

Water is most preferable as the solvent used for preparation of CNT dispersion liquids. With this in mind, water is used for preparation of CNT dispersion liquids.

Any of anionic surfactants, cationic surfactants, amphoteric surfactants, and nonionic surfactants may be used with the proviso that they are capable of structural separation of CNTs. These surfactants may be used alone or in admixtures.

Ultraviolet/visible/near-infrared light absorption spectra are measured so as to make an estimation of the ratio between metallic CNTs and semiconducting CNTs.

Here take the results of using CNTs synthesized by the HiPco process (HiPco-CNTs having a diameter of 1.0±0.3 nm) as an example. An absorption wavelength band called M11 (approximately 450 to 650 nm) comes from metallic CNTs. Three absorption wavelength bands: S11 (greater than approximately 900 nm), S22 (approximately 650 to 900 nm) and S33 (less than approximately 450 nm) come from semiconducting CNTs. There are changes of absorption wavelength bands (M11, S11, S22, S33) depending on the average diameter of CNTs measured. As the average diameter decreases, it causes the wavelength band to shift to a shorter wavelength side, and as the average diameter increases, it causes the wavelength band to shift to a longer wavelength side.

Referring here to the measurement of light absorption spectra, the absorptions of CNTs overlap each other with the result that it is impossible to determine whether a single peak comes from a single CNT or from the overlapping of a plurality of varying species of CNTs. Therefore, the measurement of fluorescence spectra capable of detection of semiconducting CNTs for each chiral was also used in combination. The results are depicted in the form of a contour map with excitation wavelength as ordinate, fluorescence wavelength as abscissa, and fluorescence intensity as color density. What spots and then appears is fluorescence coming from a semiconducting CNT having a single chirality. The associated chirality is shown near the spot.

EXAMPLES

By way of example but not by way of limitation, the present invention is now explained in greater details.

Note here that in the following examples, "LC" refers to solubilized 3α-hydroxy-5β-cholic acid, and includes 3α-hydroxy-5β-cholic acid and sodium 3α-hydroxy-5β-cholate.

In the following examples, bear in mind that the "aqueous solution of mixed SDS/SC/LC surfactants" and the "aqueous solution of mixed SDS/SC/DOC surfactants" will be respectively called "SDS/SC/LC" and "SDS/SC/DOC", and the "elution step using the aqueous solution of mixed SDS/SC/LC surfactants" and the "elution step using the aqueous solution of mixed SDS/SC/DOC surfactants" will be respectively called the "SDS/SC/LC elution" and the "SDS/SC/DOC elution".

Example 1

In this example, an LC-containing aqueous solution for structural separation was prepared using lithocholic acid insoluble in water.

Preparation of the LC-Containing Aqueous Solution for Structural Separation

An LC-containing aqueous solution for structural separation was prepared by solubilization of lithocholic acid.

In view of cost, 3α-hydroxy-5β-cholic acid, only one commercially available among lithocholic acid isomers was used as the lithocholic acid.

The surfactants and base to be mixed for solubilization of lithocholic acid were selected as follows: in the examples as described later, the aqueous solution for structural separation is used with gel chromatography (Non-Patent Publication 9) that makes it easy to change or vary the surfactant concentration and is dedicated to the search for separation conditions, where an aqueous solution of sodium dodecyl sulfate (SDS) and sodium cholate (SC) is used in the adsorption step of CNTs. It is thus desirable to use the same surfactant in the CNT elution step. For this reason, the mixed SDS/SC surfactants were used as the surfactants mixed herein, and sodium hydroxide was used as the base.

First of all, an aqueous solution of 0.5% SDS/0.5% SC was added to commercially available lithocholic acid (Tokyo Chemical Industry Co., Ltd.) in such a way as to provide a lithocholic acid concentration of 0.1%. Thereafter, an aqueous solution of sodium hydroxide was added such that the molar concentration of lithocholic acid was the same as that of sodium hydroxide, and then fully stirred. The surfactant composition at this time is assumed to be 0.5% SDS/0.5% SC/0.1% LC. Further, similar experiments were repeated in varying SDS concentrations, varying SC concentrations, and varying LC concentrations.

Identification of Solubility

First, an aqueous solution of 0.5% SDS/0.5% SC was added to lithocholic acid in an amount equivalent to 0.1% and fully stirred, yielding a cloudy liquid with lithocholic acid residues observed. An aqueous solution of sodium hydroxide was added to the liquid and fully stirred to form a transparent aqueous solution, identifying that an aqueous solution of 0.5% SDS/0.5% SC/0.1% LC was prepared. For comparisons, on the other hand, similar experimentation was carried out with the addition of deionized water in place of the aqueous solution of SDS/SC, failing to obtain any transparent aqueous solution. From this, it has been found that both the base such as sodium hydroxide and the surfactants such as SDS/SC are required for the preparation of an LC-containing aqueous solution. One possible reason for this is that lithocholic acid insoluble by itself in water turns into a lithocholate salt that is then taken in a micelle of SDS/SC or forms a micelle mixed with SDS/SC thereby rendering lithocholic acid soluble in water.

Then, similar experiments were repeated while the concentration of the SDS/SC solution mixed was varied. The SDS concentration was varied from 0.3% to 0.9%, and the SC concentration was varied from 0.3% to 0.9%. In any SDS concentration and any SC concentration, it has been found that a transparent aqueous solution can be prepared up to the LC concentration of 0.2%. The thus prepared aqueous solution is used as the LC-containing aqueous solution for structural separation.

Example 2

The LC-containing aqueous solution for structural separation obtained in Example 1 was used for separation of CNTs. In this example, gel column chromatography capable of controlling surfactant concentrations as desired was used to search for detailed separation conditions. To make the search for separation conditions efficient and enhance separation accuracy, the LC-containing aqueous solution for structural separation was used in the elution step of CNTs. The LC-containing aqueous solution for structural separation was added to a column to which CNTs were adsorbed, and while the LC concentrations were stepwise varied, CNTs having a specific structure were selectively eluted in the respective concentrations.

Preparation of the CNT Dispersion Liquid

An aqueous solution of 0.5% SC (30 ml) was added to 30 mg of Hipco-CNTs (CNI Co., Ltd.: CNTs synthesized by a chemical vapor deposition process with a diameter of 1.0±0.3 nm). Using a chip type ultrasonic crusher (Sonifier made by Branson Co., Ltd. with a tip diameter of 0.5 inch), this solution was ultrasonically processed for 6 hours at an output of 20 W/cm$^2$ while it was cooled in cold water. After a dispersion liquid obtained by ultrasonic processing was ultracentrifuged (for two hours at 210,000×g), 80% of the resultant supernatant were recovered. Thereafter, powders of SDS were added to the CNT dispersion liquid to prepare a CNT dispersion liquid of the SDS/SC surfactants. Using powders of SDS and de-ionized water, the concentration of the SDS/SC surfactants was adjusted. In Example 2, the concentrations of the surfactants in the CNT dispersion liquid to be added to the column were adjusted to 0.5% for SDS and 0.5% for SC. This surfactant concentration has been well used as the condition under which semiconducting CNTs contained in Hipco-CNT are adsorbed to the gel (Non-Patent Publication 9).

Preparation of the Column and Separation

Gel beads (Sephacryl S-200 made by GE Healthcare Co., Ltd.) were used for a column carrier. The gel beads were filled up in a plastic column (Terumo syringe made by Terumo) having a capacity of 5 mL in such a way as to provide a volume of about 3 mL. After deionized water passed through the column, it was equilibrated with an aqueous solution of 0.5% SDS/0.5% SC having the same concentration as those of the surfactants in the CNT dispersion liquid, and the CNT dispersion liquid was then added thereto in an amount of 20% based on the gel volume to carry out the CNT elution step. Thereafter, an aqueous solution of 0.5% SDS/0.5% SC was added and the column was washed until the eluted liquid became colorless and transparent. An LC-containing aqueous solution for structural separation was added thereto for carrying out the CNT elution step. In this example, the concentration of SDS and the concentration of SC were kept invariable in the adsorption and elution steps so that CNTs were prevented from further elution due to changes in the SDS and SC concentrations for the purpose of studying contributions only due to changes in the LC concentration. First, an aqueous solution of 0.5% SDS/0.5% SC/0.01% LC was added to recover CNTs eluted out of the column. Similar operations were carried out while the LC concentration was varied at an increment of 0.01% from 0.02% to 0.10% but the SDS concentration and the SC concentration were kept invariable. Such operations for recovering CNTs eluted in the respective surfactant concentrations while the surfactant concentration increased stepwise are herein called stepwise elution. The separation was carried out at 20° C.

Measurement of the Light Absorption Spectra

Given the semiconducting species, the light absorption spectra of CNTs having a single structure have absorption peaks called $S_{11}$ and $S_{22}$ observed from a long wavelength side. These absorption peaks vary in terms of wavelength depending on diameters, and shift to a long wavelength side in the case of CNTs having a large diameter and to a short wavelength side in the case of CNTs having a small diameter. Synthesized CNTs are in a mixture form having a variety of diameters and chiral angles, and the light absorption spectra are observed while the peaks of such mixtures overlap each other.

The light absorption spectra of an eluate obtained through the SDS/SC/LC elution are shown in FIG. 1a. Referring to the CNTs eluted out of the column, the peaks of the $S_{11}$ and $S_{22}$ areas vary with the LC concentration; as the LC concentration grows high, the absorption peaks shift from the short wavelength side to the long wavelength side, suggesting that the CNTs are eluted in descending order of diameter. As the LC concentration was higher than 0.070%, on the other hand, there was no or little elution of CNTs observed. After the addition of SDS/SC/LC, the column remained colored. From this, it has been understood that there are CNTs incapable of elution by the SDS/SC/LC elution.

For comparative purposes, FIG. 1b shows the light absorption spectra of eluates obtained in similar experimentation using DOC in place of LC. In the SDS/SC/DOC elution, it is clear from FIG. 1c that there are shifts from the short wavelength side to the long wavelength side observed as is the case with the results of SDS/SC/LC elution but absorption peaks are slightly different from the results of SDS/SC/LC elution. After the addition of SDS/SC/DOC, the column becomes substantially uncolored.

This suggests that the SDS/SC/LC elution is different from the SDS/SC/DOC elution in terms of the CNT species eluted and remaining in the column.

Measurement of the Fluorescence Spectra

With the light absorption spectra, it is unlikely to detect the desired peak due to the overlapping of another absorption peak thereon. Therefore, fluorescence spectra were measured so that discrete chiralities of semiconducting CNTs could be detected while making a distinction between them.

The fluorescence spectra of eluate (corresponding to the sample in FIG. 1a) obtained through the SDS/SC/LC elution are shown in FIG. 1c. The results are depicted in the form of a contour map with excitation wavelength as ordinate, fluorescence wavelength as abscissa, and fluorescence intensity as color density. What spots and then appears is fluorescence coming from single semiconducting CNTs. There are different spots observed in the spectra of samples having varying LC concentrations, indicating that CNTs having a chirality varying with LC concentrations are separated.

Figure 1D:
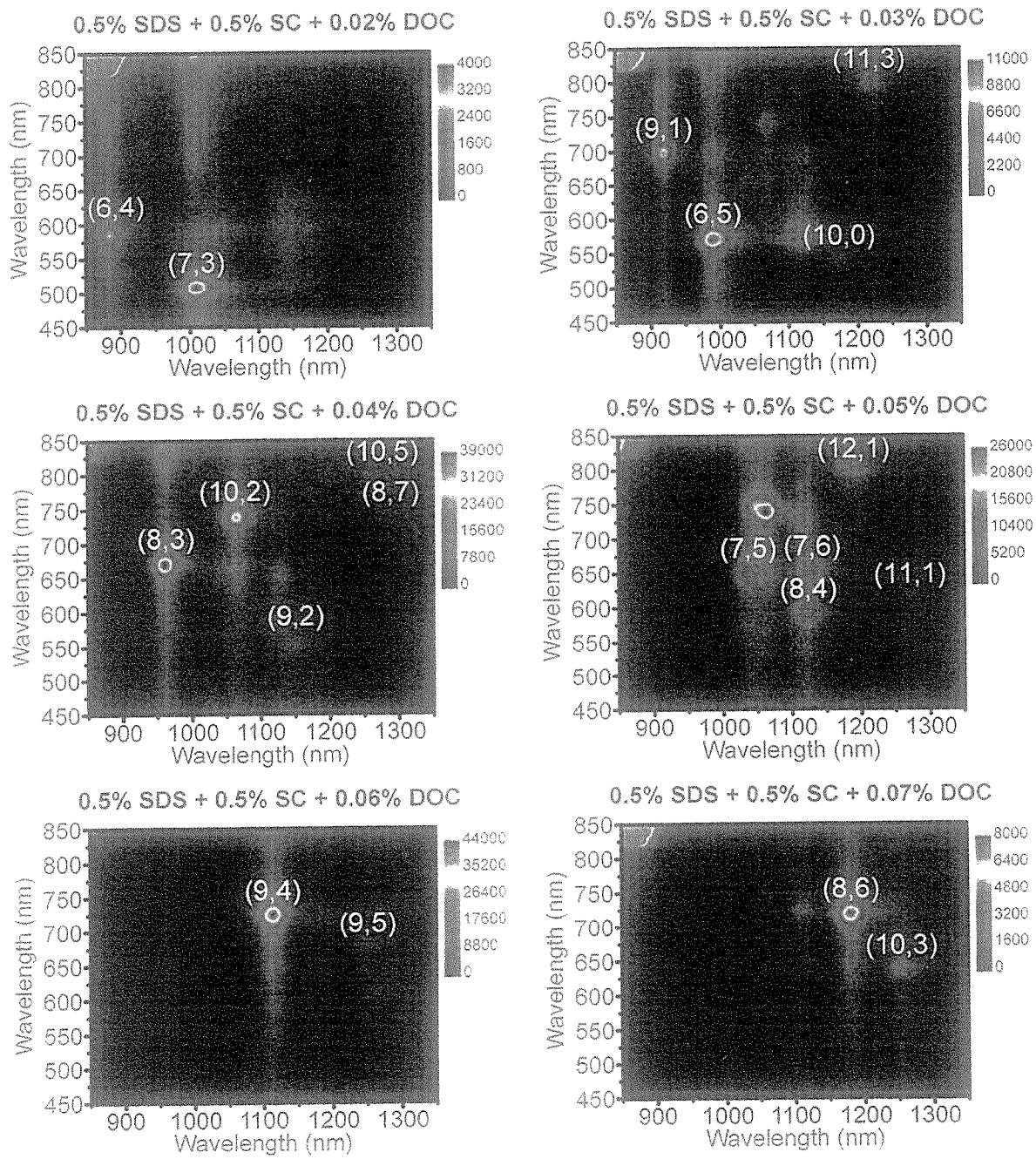
FIG. 1d is indicative of the fluorescence spectra of samples separated and obtained by SDS/SC/DOC elution in 0.5% SDS/0.5% SC.

For comparative purposes, FIG. 1d shows the fluorescent spectra of eluate (corresponding to the samples in FIG. 1b) obtained in similar experimentation using DOC in place of LC. In the samples obtained by the SDS/SC/DOC elution, there are spots such as (10,5) and (8,7) appearing, which spots do not appear in the samples obtained by the SDS/SC/LC elution. Elution of these CNTs would be caused by a difference in absorption spectra between FIG. 1a and FIG. 1b.

Chirality Distribution and Determination of Separation Order

Figure 1E:
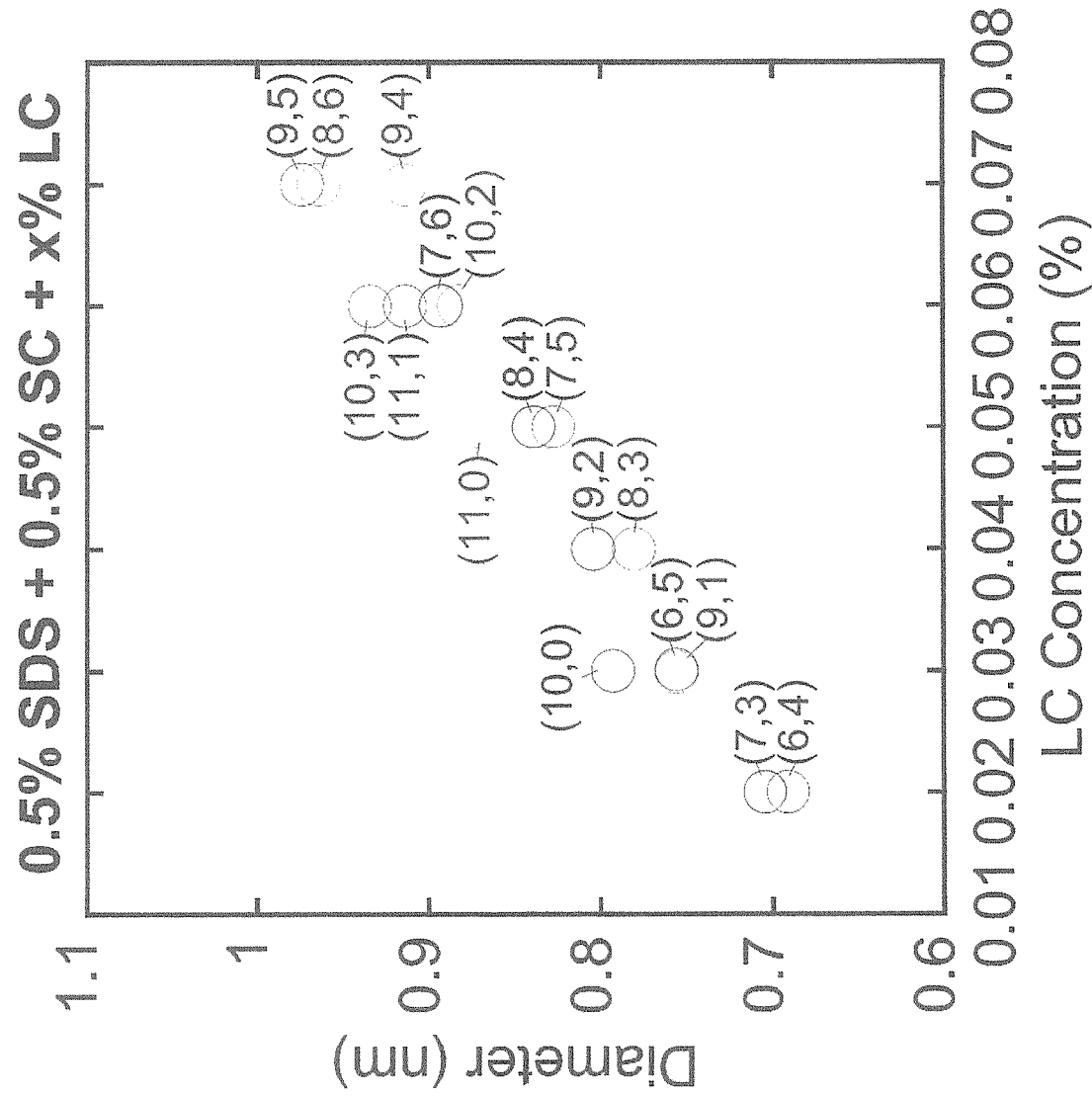
FIG. 1e is indicative of the LC concentration vs. CNT diameter relations needed for SDS/SC/LC elution in 0.5% SDS/0.5% SC.

Absorption peaks called $S_{11}$, $S_{22}$ and observed in the light absorption spectra may be used for determination of the respective chirality distributions. With use of light absorption spectra alone, chirality distributions were sometimes undeterminable due to the overlapping of absorption peaks of another CNTs or the like. In that case, the chirality distribution was determined using spots observed in fluorescence spectra. First, the absorbances or luminescence intensities of all chiralities included in the respective eluates were calculated. Then, an LC concentration—in which the absorbance or luminescence intensity of a specific chirality becomes highest—was found from all concentration ranges; it is defined as the LC concentration in which the elution of that chirality takes place. Similar operations were carried out for all chiralities to determine the order of separation of chiralities with respect to the LC concentration. FIG. 1e shows relations between the LC concentration allowing for elution of CNTs having a specific chirality and the diameter of that chirality (as calculated from FIG. 1c). There is correlation between the LC concentration and the chirality diameter, from which it is understood that chiralities are separated in descending order of diameter. It is also found that elution of CNTs having a diameter of larger than 1 nm does not take place upon the SDS/SC/LC elution.

For comparative purposes, FIG. 1f shows similar relations observed when DOC was used in place of LC (as calculated from FIG. 1d). As can be seen from FIG. 1f, the descending order of diameter is observed in the SDS/SC/DOC elution as is the case with the SDS/SC/LC elution, while in the SDS/SC/DOC elution, elution of CNTs having a diameter of larger than 1 nm—incapable of SDS/SC/LC elution—is observed. This would correspond to such CNTs having a long wavelength peak as mentioned above. In the SDS/SC/DOC elution, CNTs having a diameter of smaller than 1 nm and CNTs having a diameter of larger than 1 nm are eluted in the same concentration, resulting in a poor purity that is a problem with the prior art (Non-Patent Publication 9). In the SDS/SC/LC elution, on the other hand, only CNTs having a diameter of smaller than 1 nm can be recovered so that their purity can be more enhanced.

In Example 2, the column used for the SDS/SC/LC elution and the column used for the SDS/SC/DOC elution were operated under the same conditions for the mixed SDS/SC surfactants in the adsorption step; it is understood that the same CNT species are adsorbed to both the columns. In the SDS/SC/DOC elution, however, both CNTs having a diameter of smaller than 1 nm and CNTs having a diameter of larger than 1 nm are eluted whereas in the SDS/SC/LC elution, only CNTs having a diameter of smaller than 1 nm are eluted. From this, it is understood that CNTs having a diameter of larger than 1 nm remain without being eluted. In Example 3 given just below, therefore, separation and recovery of CNTs remaining in the column after the addition of SDS/SC/LC and having a diameter of larger than 1 nm were carried out. Used for separation and recovery was SDS/SC/DOC already found to be capable of elution of CNTs having a diameter of larger than 1 nm.

Example 3

As was the case with Example 2, the SDS/SC/LC elution was followed by the SDS/SC/DOC elution for selective elution of CNTs remaining in the column.

In order to vary concentration in a more accurate manner than in Example 2, high performance liquid chromatography equipment (HPLC) (JASCO Corporation) was used for separation. Gel beads were filled up in a column (Tricorn, GE Healthcare Co., Ltd.) of 5 cm in length and 1 cm in inner diameter in such a way as to provide a height of about 6 cmL followed by equilibration with an aqueous solution of 0.5% SDS/0.5% SC, and a CNT dispersion liquid was then added to the column in an amount of 20% based on the gel volume. After the column was washed with an aqueous solution of 0.5% SDS/0.5% SC, the LC concentration was varied in an increment of 0.005% from 0.005% to 0.100%, while keeping the SDS and SC concentrations invariable, for stepwise elution followed by recovery of CNTs eluted out of the column. Thereafter, the CNTs were again equilibrated with an aqueous solution of 0.5% SDS/0.5% SC, after which the DOC concentration was varied in an increment of 0.005% from 0.005% to 0.100%, while keeping the SDS and SC concentrations invariable, for stepwise elution followed by recovery of CNTs eluted out of the column. The operation was carried out at 20° C.

The light absorption spectra of eluate obtained in the SDS/SC/LC elution are shown in FIG. 2a, and those of eluate obtained in the SDS/SC/DOC after the addition of SDS/SC/LC are shown in FIG. 2b.

According to the results of the SDS/SC/LC elution, it is understood that as the LC concentration increases, the absorption peak shifts from a short wavelength side to a long wavelength side as is the case with Example 2, resulting in separation in descending order of diameter. According to the results of the SDS/SC/DOC elution after the addition of SDS/SC/LC, it is found that the short wavelength peak decreases and the long wavelength peak increases as compared with the results of the ordinary SDS/SC/DOC elution of Example 2.

Figure 2C:
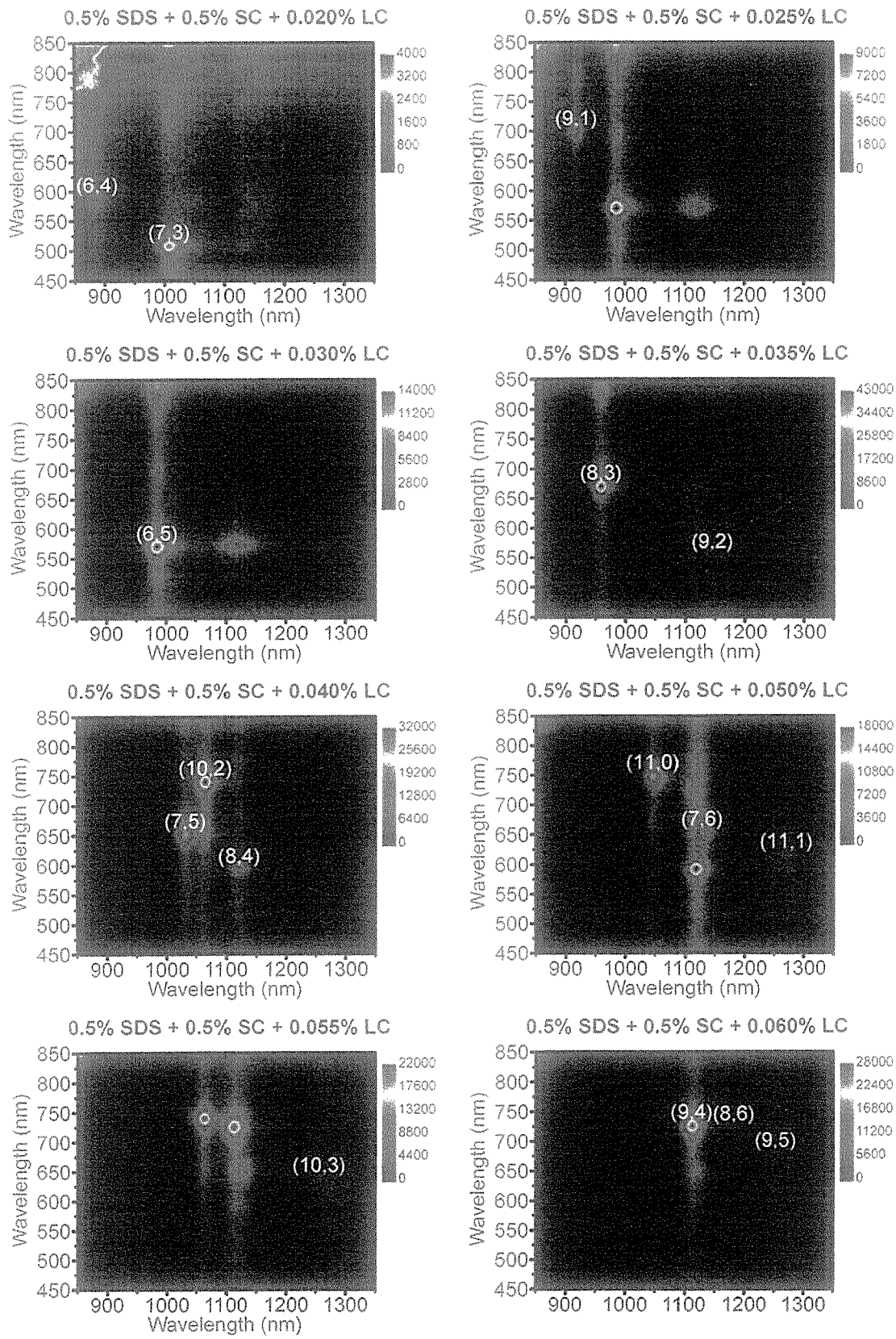
FIG. 2c is indicative of the fluorescence spectra of samples separated and obtained by SDS/SC/LC elution in 0.5% SDS/0.5% SC.
Figure 2D:
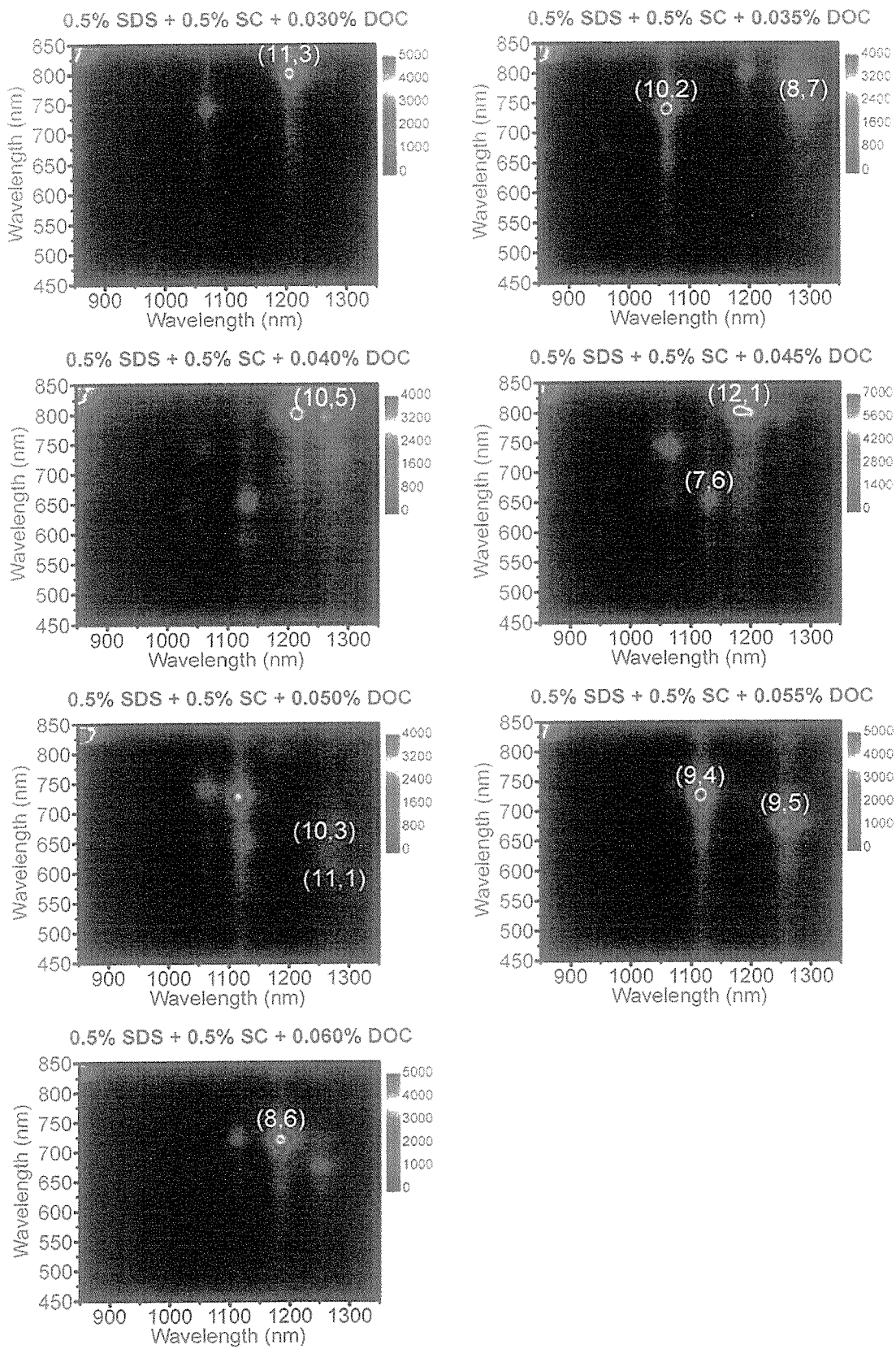
FIG. 2d is indicative of the fluorescence spectra of samples separated and obtained by SDS/SC/DOC elution in 0.5% SDS/0.5% SC after the addition of SDS/SC/LC.

Then, the fluorescence spectra of eluate obtained in the SDS/SC/LC elution are shown in FIG. 2c, and those of eluate obtained in the SDS/SC/DOC elution after the addition of SDS/SC/LC are shown in FIG. 2d. The spots appearing in FIGS. 2c and 2d are significantly different from one another.

Figure 2E:
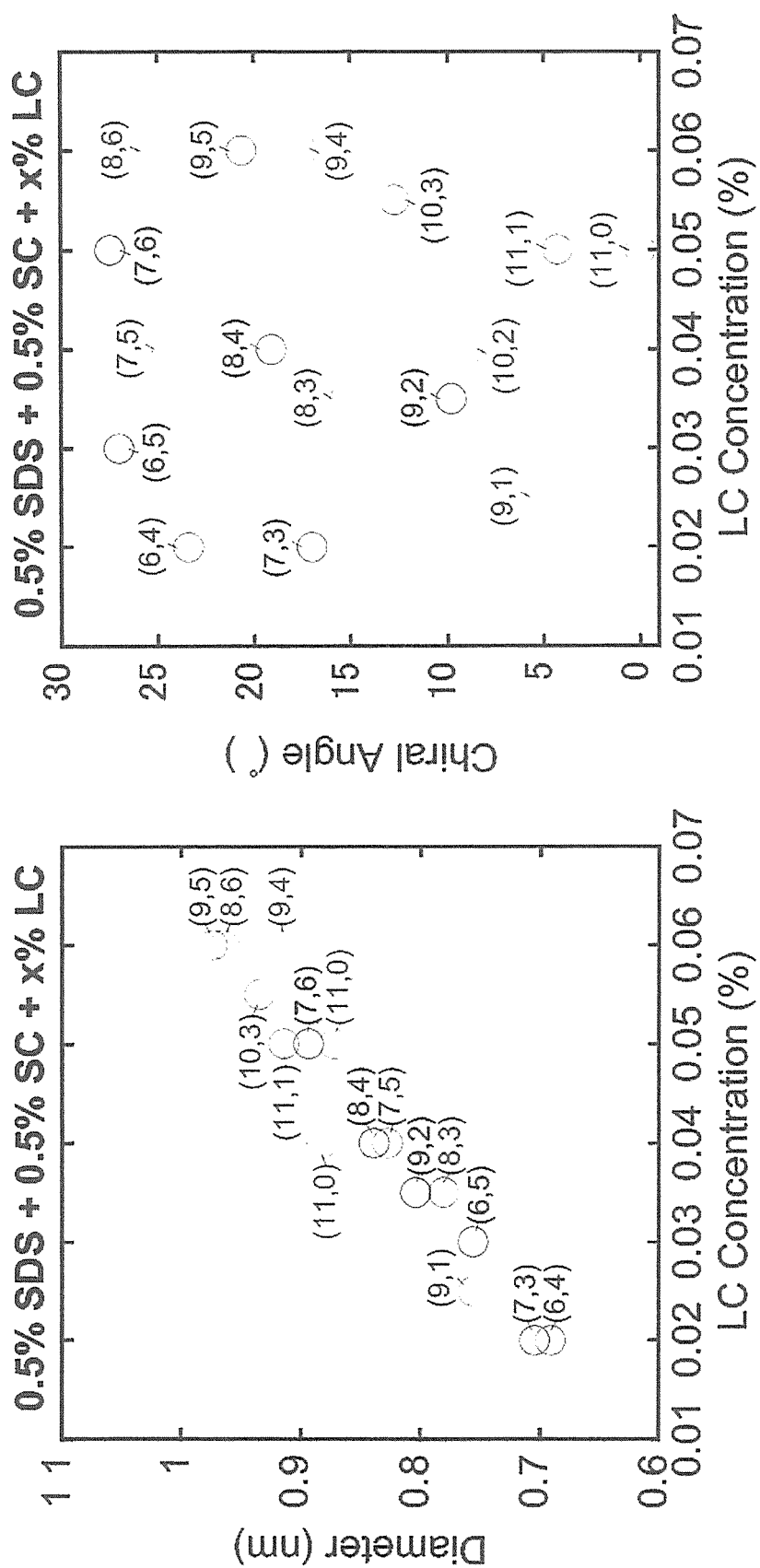
FIG. 2e is indicative of the relations between the LC concentration and the CNT diameter and chiral angle needed for SDS/SC/LC elution in 0.5% SDS/0.5% SC.
Figure 2F:
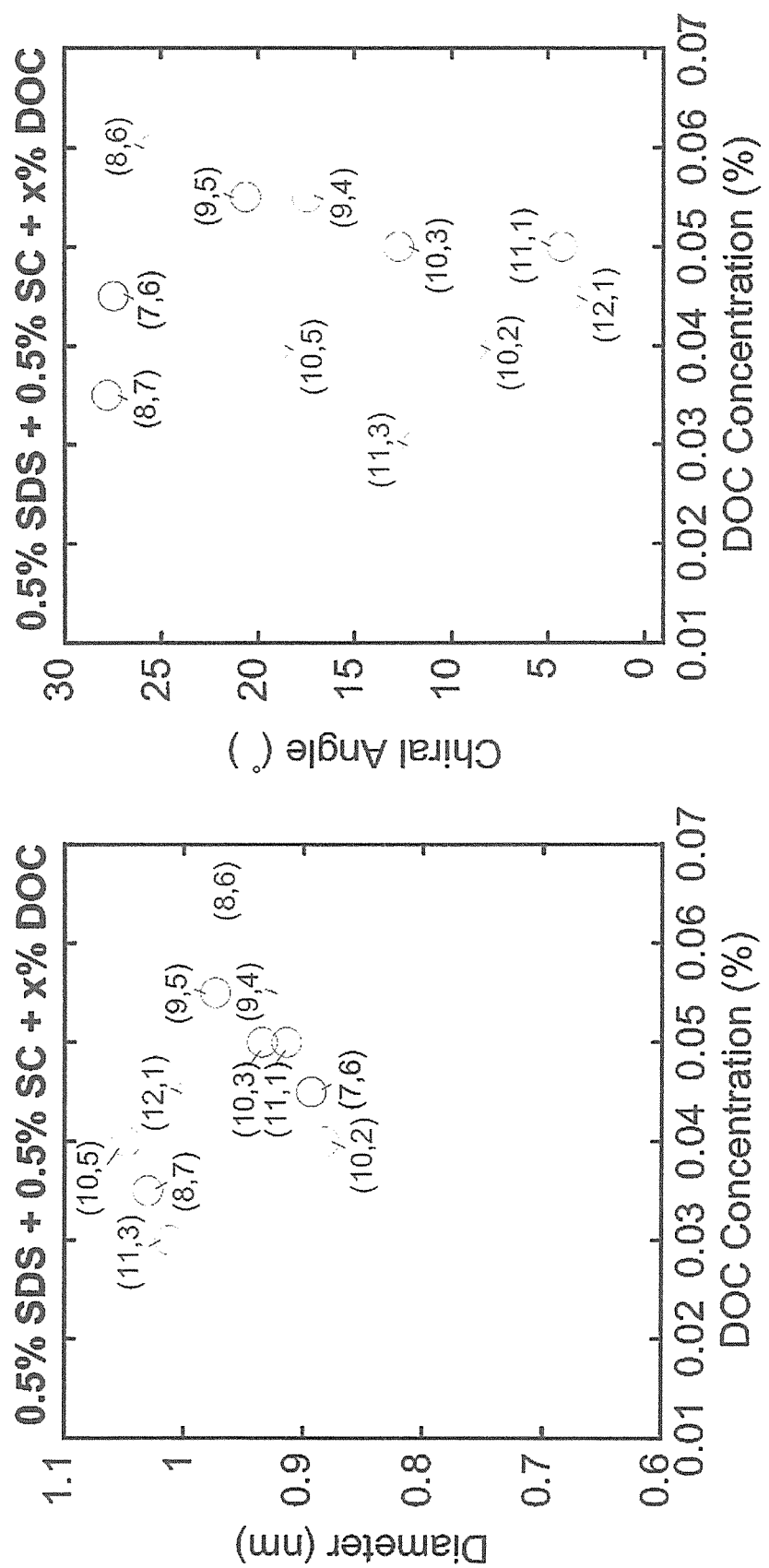
FIG. 2f is indicative of the relations between the DOC concentration and the CNT diameter and chiral angle needed for SDS/SC/DOC elution in 0.5% SDS/0.5% SC after the addition of SDS/SC/LC.

As is the case with Example 2, the order of separation of chiralities with respect to the LC or DOC concentration was determined from the light absorption spectra or fluorescence spectra. FIGS. 2e and 2f show relations between the LC and DOC concentrations, in which a CNT having a specific chirality is eluted, and the diameter and chiral angle of that chirality. In the SDS/SC/LC elution, it is found that CNTs are separated in descending order of diameter, as is the case with Example 2. In the SDS/SC/DOC elution after the addition of SDS/SC/LC, on the other hand, it is observed that CNTs having a diameter of larger than 1 nm are mainly eluted while no separation of CNTs in descending order of diameter is found. It is here understood that the order of separation of CNTs having a diameter of larger than 1 nm is equivalent to what is obtained by subtracting the order of separation in the SDS/SC/LC elution (FIG. 1e) from the ordinary SDS/SC/DOC elution of Example 2 (FIG. 1f); CNTs remaining in the column with a diameter of larger than 1 nm would have been eluted. Therefore, the SDS/SC/DOC elution, if combined with the SDS/SC/LC dedicated to elution of CNTs having a diameter of smaller than 1 nm, may be used as an aqueous solution for separation and recovery of CNTs remaining in the column with a diameter of larger than 1 nm.

From the examples described hitherto, it has been found that as the LC-containing aqueous solution for structural separation is added to the column to which CNTs are adsorbed, it causes selective elution of CNTs having a diameter of smaller than 1 nm. Such CNTs having a diameter of smaller than 1 nm would have been further coated with LC added in the elution step, rendering their adsorption to the gel impossible. When a surfactant other than LC is contained in that aqueous solution for separation, on the other hand, that surfactant could also exert some influence on the coating of CNTs. The inventive aqueous solution for separation contains SDS and SC in addition to LC. In the following Examples 4, 5 and 6, for the purpose of going into the influence of the surfactant mixed other than LC, the SDS concentrations and/or the SC concentrations were then systematically varied to make a study of how the SDS/SC/LC elution changes in varying SDS concentrations and/or varying SC concentrations. In order to prevent elution of CNTs due to changes in the SDS and SC concentrations, the SDS and SC concentrations in the adsorption step were identical with the SDS and SC concentrations in the elution step as described hitherto.

Example 4

Similar experimentation as in Example 3 was carried out in two different SDS concentrations: 0.3% and 0.7% while the SC concentration was fixed to 0.5%. The SDS and SC concentrations were varied not only in the elution step but also in the adsorption step (inclusive of dispersion liquid, equilibration, and washing). Note here that there is no experimentation carried out for the SDS/SC/DOC elution after the addition of SDS/SC/LC.

Along with the results of 0.5% SDS/0.5% SC in Example 3, FIG. 3a shows the light absorption spectra of eluates obtained in the SDS/SC/LC elution in 0.3% SDS/0.5% SC, and 0.7% SDS/0.5% SC. In any SDS concentration, it is found that the absorption peaks are moving to a long wavelength side with an increasing LC concentration; the separation of CNTs takes place in descending order of diameter unique to the SDS/SC/LC elution. It is further found that the LC concentration needed for elution increases as the SDS concentration increases. From this, it is presumed that SDS plays a role in preventing coating of CNTs with LC.

It is here noted that an LC concentration, in which the absorbances of 7 chiralities (7,3), (9,1), (10,0), (6,5), (8,3), (9,2) and (7,5) have the highest values, was found from all concentration ranges. FIG. 3b shows relations between the LC and SDS concentrations in which such CNTs are eluted. It is understood that as the SDS concentration increases, the LC concentration needed for elution of CNTs increases as well with the result that the LC concentration interval needed for elution of each chirality becomes wide, ending up with an enhancement of separation accuracy. Referring to 0.3% SDS/0.5% SC as an example, absorption peaks coming from a plurality of chiralities are observed in all LC concentrations, but an absorption peak coming from a single chirality is observed in the case of 0.7% SDS/0.5% SC, suggesting that the separation accuracy becomes high enough to separate single-structure CNTs.

Example 5

Similar experimentation as in Example 3 was carried out in two different SC concentrations: 0.7% and 0.9% while the SDS concentration was fixed to 0.5%. The SDS and SC concentrations were varied not only in the elution step but also in the adsorption step (inclusive of dispersion liquid, equilibration, and washing). Note here that there is no experimentation carried out for the SDS/SC/DOC elution after the addition of SDS/SC/LC.

Along with the results of 0.7% SDS/0.5% SC in Example 4, FIG. 4a shows the light absorption spectra of eluate obtained in the SDS/SC/LC elution in 0.3% SDS/0.5% SC, and 0.7% SDS/0.5% SC. In any SC concentration, it is found that the absorption peaks are moving to a long wavelength side with an increasing LC concentration; the separation of CNTs takes place in descending order of diameter unique to the SDS/SC/LC elution. It is further found that the LC concentration needed for elution decreases as the SC concentration increases. From this, it is presumed that SC plays a role in helping coat CNTs with LC.

Here, FIG. 4b shows relations between the LC and SC concentrations in which CNTs are eluted, as determined by substantially repeating the operation of Example 4. It is understood that as the SC concentration decreases, it causes the separation accuracy to be enhanced as in Example 4. For instance, in 0.7% SDS/0.5% SC, an absorption peak derived from a single chirality is also observed. From a comparison with the results of Example 4, it is found that the LC concentration necessary for elution of CNTs and the concentration of other surfactant show quite opposite correlation in view of SDS and SC.

Example 6

Similar experimentation as in Example 3 was carried out in two different concentrations: 0.3% and 0.9% while keeping the ratio between the SDS concentration and the SC concentration constant (1:1). The SDS and SC concentrations were varied not only in the elution step but also in the adsorption step (inclusive of dispersion liquid, equilibration, and washing). Note here that there is no experimentation carried out for the SDS/SC/DOC elution after the addition of SDS/SC/LC.

Figure 5B:
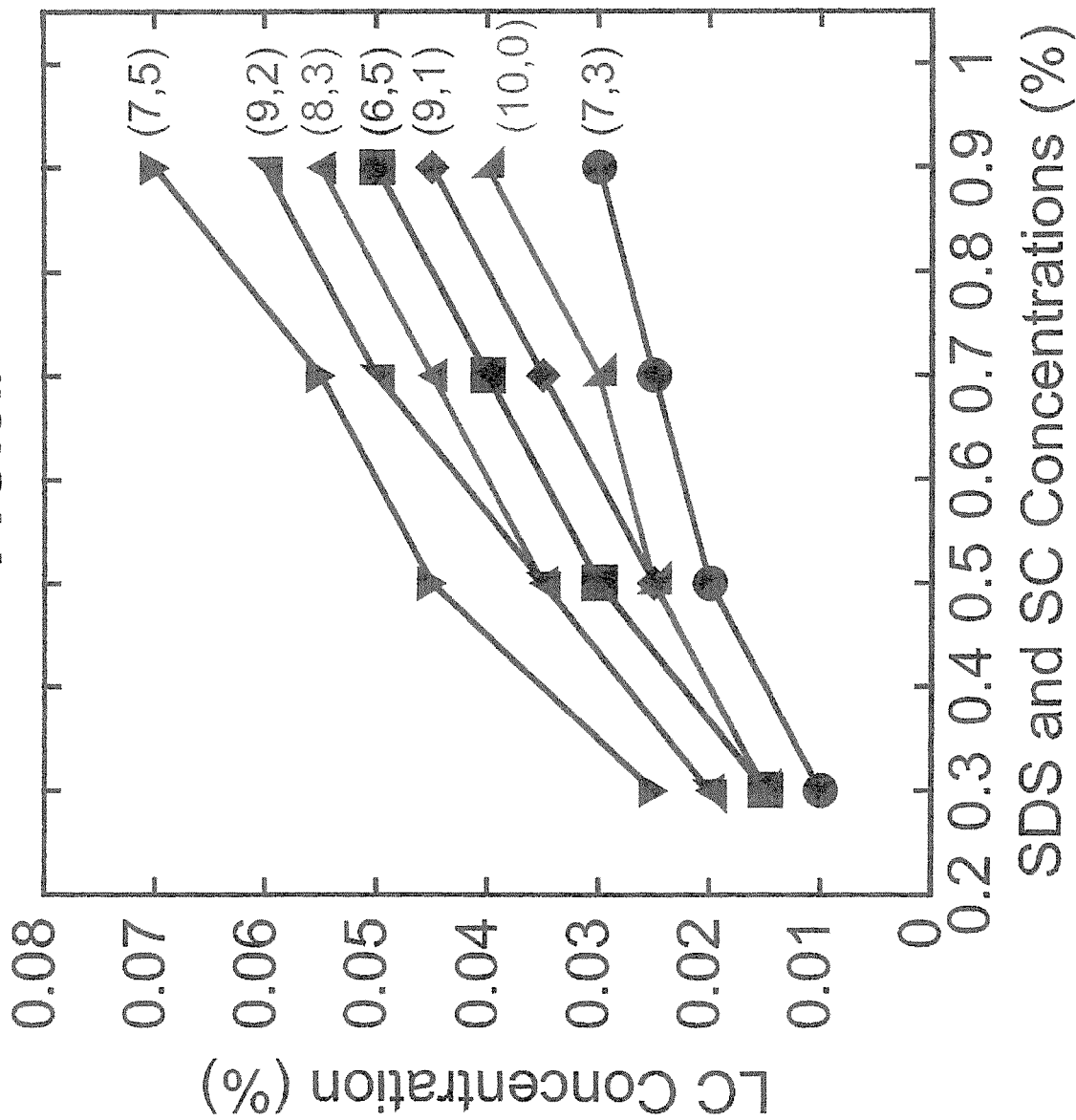
FIG. 5b is indicative of the relations between the LC, SDS and SC concentrations needed for SDS/SC/LC elution.

Along with the results of 0.5% SDS/0.5% SC in Example 3 and 0.7% SDS/0.7% SC in Example 5, FIG. 5a shows the light absorption spectra of eluate obtained in the SDS/SC/LC elution in 0.3% SDS/0.3% SC, and 0.9% SDS/0.9% SC. In any SDS concentration, it is found that the absorption peaks are moving to a long wavelength side with an increasing LC concentration; the separation of CNTs takes place in descending order of diameter unique to the SDS/SC/LC elution. It is further found that the LC concentration needed for elution increases as the SDS/SC concentration increases. Here, FIG. 5b shows relations between the LC and SDS/SC concentrations in which CNTs are eluted as determined by a similar operation as in Example 3. From this, it is found that as the SDS/SC concentration increases, there is an enhancement of separation accuracy as in Example 3. According to the results of Examples 4 and 5, it is found that the LC concentration required for elution of CNTs is quite opposite to the SDS concentration and the SC concentration in terms of correlation, but Example 6 in which there are simultaneous concentration increases has close relation to the SDS concentration of Example 4.

Example 7

In the separation method relying upon gels, the separation of CNTs changes with temperatures. Similar experimentation as in Example 3 was carried out while the temperature was changed from 20° C. to two temperatures: 25° C. and 30° C. The temperature is changed not only in the elution step but also in the adsorption step. Note here that there is no experimentation carried out for the SDS/SC/DOC elution after the addition of SDS/SC/LC.

Along with the results of 0.5% SDS/0.5% SC at 20° C. in Example 3, FIG. 6a shows the light absorption spectra of eluate obtained in the SDS/SC/LC elution at 25° C. and 30° C. At any temperature, it is found that the absorption peaks are moving to a long wavelength side; the separation of CNTs takes place in descending order of diameter unique to the SDS/SC/LC elution. It is also found that the temperature has no or little influence on the LC concentration required for elution as compared with the SC and/or SDS concentration changes in Examples 3 to 6. However, there is a slight change in the emerging pattern of absorption peaks at the respective temperatures; at 30° C. as an example, long-wavelength absorption peaks, which are not observed in the SDS/SC/LC elution at 20° C., emerge in low concentrations (0.015 to 0.025%) presumably due to elution of much more CNTs having a diameter of larger than 1 nm. This matches a phenomenon observed in the SDS/SC/DOC elution of Example 2, suggesting that there is deterioration, with increasing temperatures, of selectivity unique to the SDS/SC/LC elution capable of eluting only CNTs having a diameter of smaller than 1 nm. Here, relations between the LC concentration and temperature for elution of CNTs as determined by way of a similar operation as in Example 4 are shown in FIG. 6b that indicates that there is no or little change in the accuracy of separation due to temperatures. At 30° C., however, CNTs having a diameter of larger than 1 nm are eluted as described above, resulting in a lowering of the purity of CNTs having a diameter of smaller than 1 nm. For this reason, 25° C. was set as the upper limit to the subsequent high-purity separation of single-structure CNTs. Similar results were obtained even upon changing of the SC/SDS concentrations as described in Examples 4, 5 and 6.

Example 8

Based on the results of Examples 3, 4 and 5, similar experimentation as in Example 3 was carried out while the SDS and SC concentrations were changed to a high 0.9% SDS and a low 0.3% SC, respectively, expected to make the accuracy of separation higher. The SDS and SC concentrations are changed not only in the elution step but also in the adsorption step (inclusive of dispersion liquid, equilibration and washing). Note here that there is no experimentation carried out for the SDS/SC/DOC elution after the addition of SDS/SC/LC.

From the results of Examples 3, 4 and 5, the LC concentration needed for elution of CNTs is expected to exceed 0.100% in the high SDS concentration and low SC concentration. For this reason, stepwise elution was carried out while the LC concentration was changed in an increment of 0.005% from 0.005% to 0.080% and in an increment of 0.020% from 0.080% to 0.160%. During the stepwise elution, the SDS and SC concentrations remain unchanged.

FIG. 7a shows the light absorption spectra of eluate obtained by the SDS/SC/LC elution in 0.9% SDS/0.3% SC. From FIG. 7a, it is found that as compared with the results of 0.9% SDS/0.9% SC and 0.3% SDS/0.3% SC in Example 6 in which the SDS concentration or the SC concentration is the same, the species of absorption peaks observed are fewer in number, giving rise to a decrease in the species of eluted CNTs. The elution of CNTs was not observed even when the LC concentration was higher than 0.160%. After the addition of SDS/SC/LC, the column became deeper in color than the results of 0.9% SDS/0.9% SC and 0.3% SDS/0.3% SC in Example 6, suggesting that the changing of the SC concentration or the SDS concentration results in an increase in the species of CNTs that cannot be eluted by the SDS/SC/LC elution. Similar results are also obtained in experiments where 0.7% SDS/0.233% SC, and 0.5% SDS/0.167% SC were used while the ratio between the SDS concentration and the SC concentration was kept at 3:1 (hereafter called the 3:1 condition), implying that a large deviation from the ratio of 1:1 between the SDS concentration and the SC concentration (hereafter called the 1:1 condition) has some significant influence on the results.

Figure 7B:
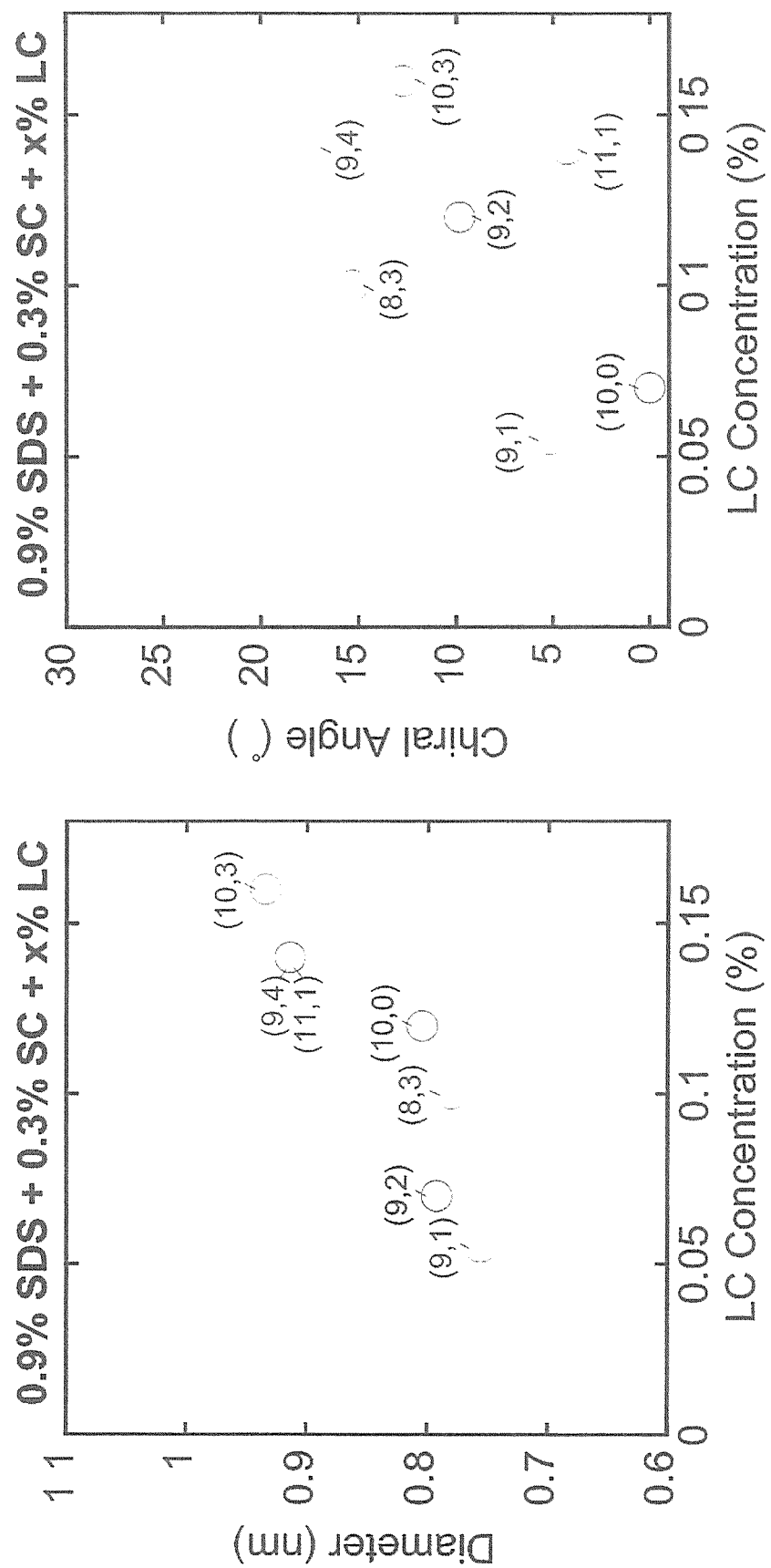
FIG. 7b is indicative of the relations between the LC concentration and the CNT diameter and chiral angle needed for SDS/SC/LC elution in 0.9% SDS/0.9% SC.

As is the case with Example 2, the order of separation of chirality with respect to the LC concentration was determined from light absorption spectra. FIG. 7b shows relations between the LC concentration capable of eluting CNTs having a specific chirality and the diameter and chiral angle of that chirality. As is the case with Example 2, while the separation of CNTs is found to take place in descending order of diameter, the elution of CNTs having a specific structure inclusive of (9,1), (10,0), (8,3) and (9,2) is mainly observed. The elution of only (11,1), (9,4) and (10,3) is slightly observed, but other CNTs are not eluted under the 3:1 condition. Further, under the 3:1 condition there is an enhancement of separation accuracy expected in the high SDS concentration and low SC concentration; such condition allows successfully for elution of (9,1), (10,0), (8,3) and (9,2) that cannot be separated into the single chirality. It is thus possible to improve on the accuracy of separation of CNTs having a specific structure under the condition 3:1. Although the separation of CNTs having that specific structure may be unsuccessful under the 1:1 condition, yet it is possible to separate CNTs incapable of elution under the 3:1 condition thereby improving on the recovery of those CNTs. If the 3:1 condition is combined with the condition 1:1, it would then be possible to obtain two such species of CNTs. Similar results were obtained even upon the changing of the temperature from 20° C. to 25° C. and 30° C.

Example 9

Based on Example 8, it has been found that under the 3:1 condition CNTs having a specific structure inclusive of (9,1), (10,0), (8,3) and (9,2) are eluted in descending order of diameter, and under the 1:1 condition more species of CNTs are eluted in descending order of diameter. This suggests that when the adsorption of CNTs is maintained under the 3:1 and 1:1 conditions, CNTs having a specific structure inclusive of (9,1), (10,0), (8,3) and (9,2) can first be separated and recovered under the 3:1 condition, and other CNTs can then be separated and recovered under the condition 1:1. Here, the separation of CNTs was carried out while the ratio between the SDS concentration and the SC concentration was changed from 3:1 to 1:1 in a stepwise manner. To be specific, similar experimentation was carried out, first by changing the SDS concentration to 0.9% and the SC concentration to 0.3%, and then by changing the SC concentration to 0.5%, 0.7% and 0.9% in a stepwise manner while fixing the SDS concentration to 0.9% and adjusting the ratio between the SDS concentration and the SC concentration for the SDS/SC/LC elution in the respective SC concentrations. Note here that no SDS/SC/DOC elution was carried out after the addition of SDS/SC/LC.

The concentrations of surfactants in the CNT dispersion liquid were adjusted to 0.9% SDS/0.3% SC. After the column was equilibrated with an aqueous solution of 0.9% SDS/0.3% SC, the dispersion liquid of CNTs was added to the column in an amount of 40% based on the gel volume (first step). After the column was washed with an aqueous solution of 0.9% SDS/0.3% SC, stepwise elution was carried out while changing the LC concentration in an increment of 0.005% from 0.010% to 0.080% and in an increment of 0.020% from 0.080% to 0.160% without varying the SDS and SC concentrations thereby recovering CNTs eluted out of the column (1-1 step). Thereafter, the column was equilibrated with an aqueous solution of 0.9% SDS/0.3% SC and, then, with an aqueous solution of 0.9% SDS/0.45% SC, after which the SDS/SC/LC elution in 0.9% SDS/0.45% was carried out as in the 1-1 step (1-2 step). The subsequent steps were similarly carried out: the SDS/SC/LC elution in 0.9% SDS/0.6% SC in the 1-3 step, and the SDS/SC/LC elution in 0.9% SDS/0.9% SC in the 1-4 step. Throughout the separation at 25° C. the operation was under automated control of HPLC. FIG. 8a is a schematic diagram of the separation process.

Figure 8B:
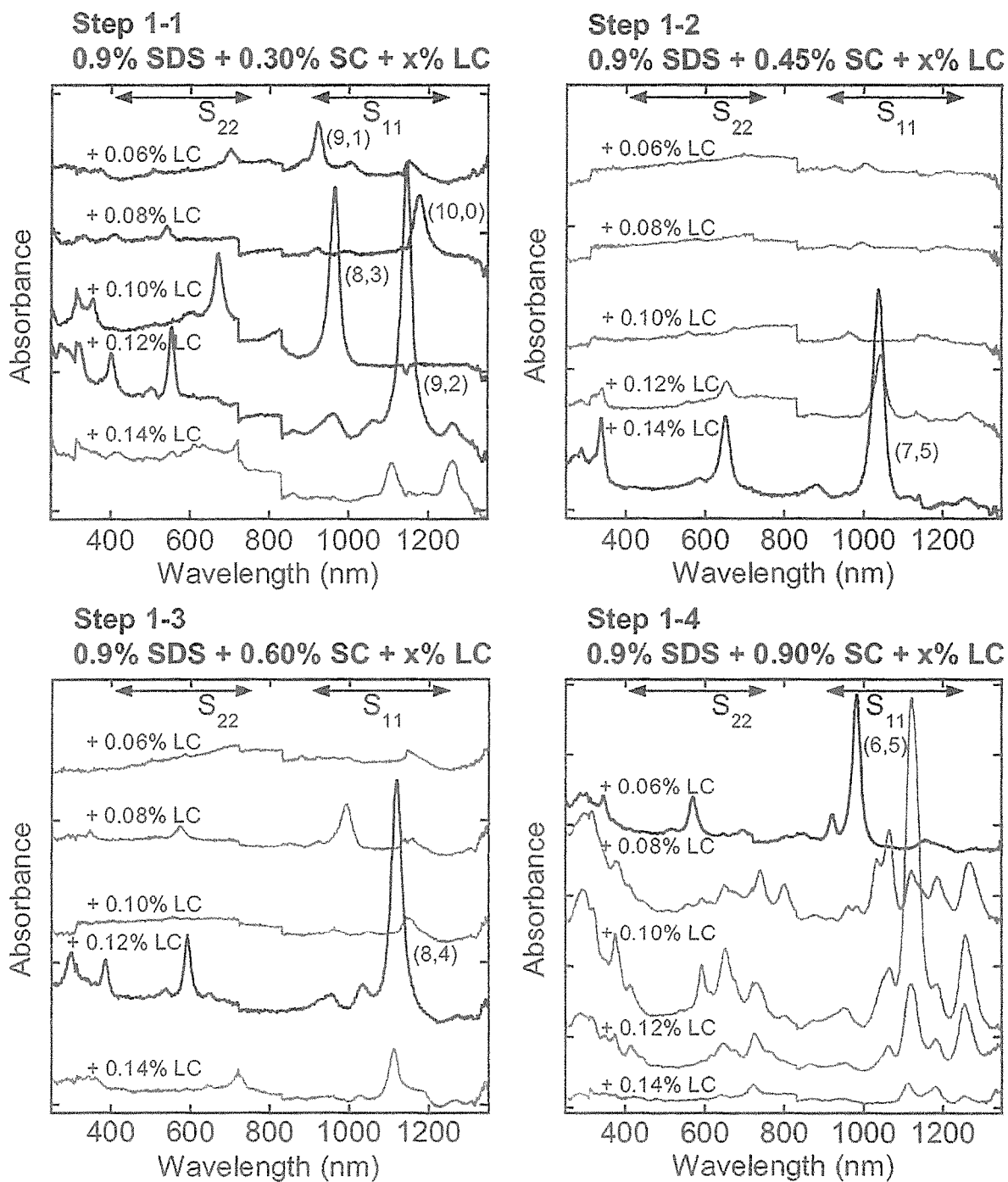
FIG. 8b is indicative of the light absorption spectra of samples separated and obtained in each step of separation using a single column.
Figure 8C:
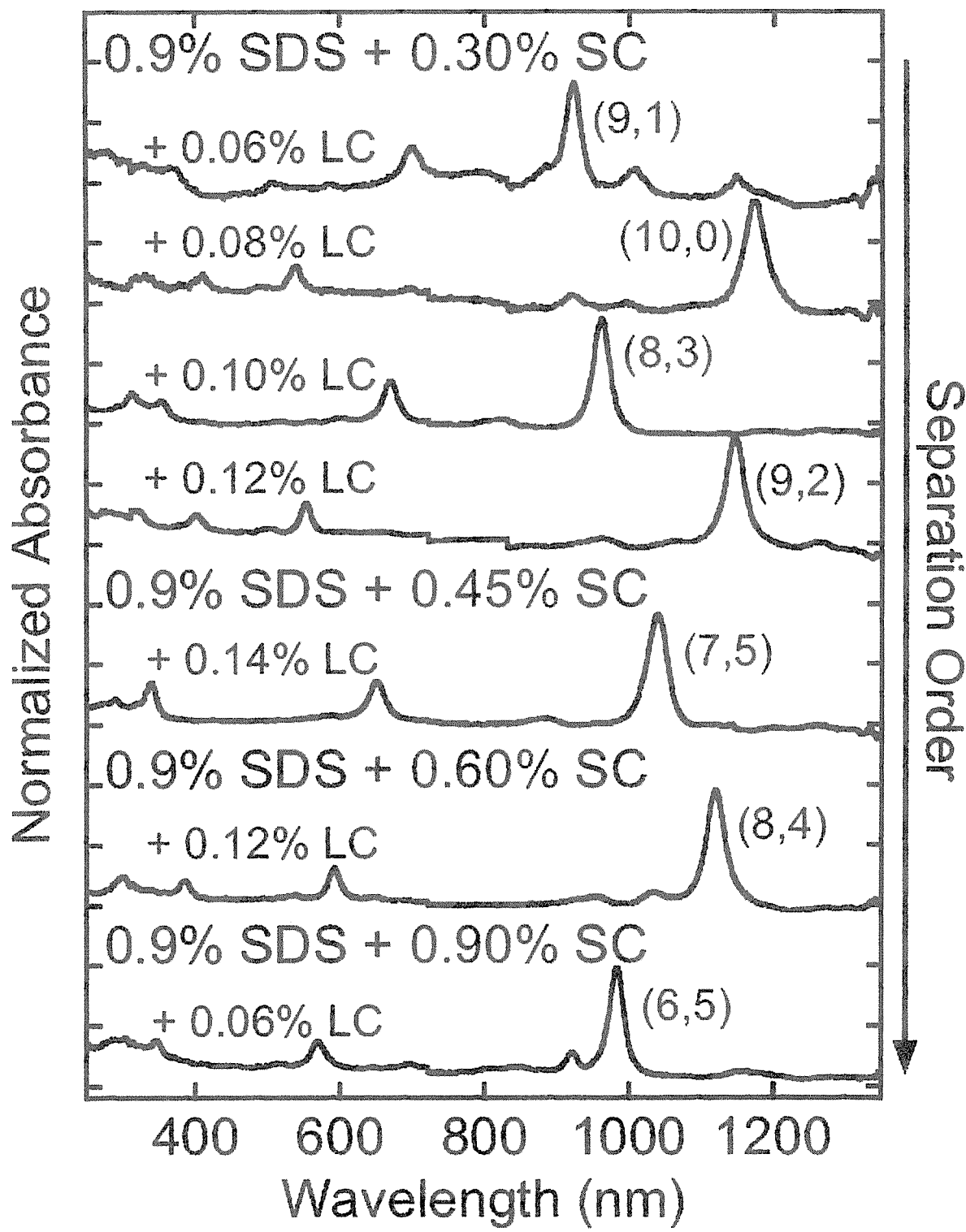
FIG. 8c is indicative of the light absorption spectra of single-structure CNTs obtained by separation using a single column.

FIG. 8b shows the light absorption spectra of eluate obtained in the respective SDS/SC/LC elution steps, whereas FIG. 8c shows the light absorption spectra of high-purity, single-structure CNTs among the obtained CNTs. From the 1-1 step carried out under the same condition as in Example 8, it is found that single-structure CNTs having a specific structure: (9,1), (10,0), (8,3) and (9,2) can be separated and recovered with high purity as in Example 8. In Example 8, other CNTs were hardly eluted, resulting in a lowering of recovery of CNTs; however, in the 1-2 step (0.9% SDS/0.45% SC), the 1-3 step (0.9% SDS/0.6% SC) and the 1-4 step (0.9% SDS/0.9% SC), each having a higher SC concentration, single-structure CNTs having (7,5), (8,4) and (6,5) can be separated and recovered with high purity. From this, it is found that even CNTs incapable of recovery in Example 8 can be recovered. Thus, a combination of the condition for high separation capability with the condition for high recovery succeeded in high-purity separation of 7 species of single-structure CNTs by means of a single column (FIG. 8c).

Example 10

From the results of the examples described hitherto, it is found that the LC-containing aqueous solution for structural separation has three functions as summarized below.
(1) Function capable of separating and recovering only CNTs having a small diameter, as shown in Examples 2 to 9.
(2) Function capable of separating and recovering, with high purity, only CNTs having a specific structure inclusive of (9,1), (10,0), (8,3) and (9,2) under the condition having an SDS to SC concentration ratio of 3:1 as shown in Examples 8 and 9.
(3) Function capable of high-purity separation and recovery by way of SDS/SC/DOC elution without giving rise to elution of large-diameter CNTs adsorbed to the gel as shown in Example 3.

In order to study the functions of the LC-containing aqueous solution for structural separation in the examples described hitherto, most semiconducting CNTs were adsorbed to a single column in the adsorption step, and they were then separated in the elution step by selective separation comprising the addition of an LC-containing aqueous solution. Referring here to the subsequent step, there is the mention of a process in which not only the selective elution but also such selective adsorption of CNTs as set forth in Non-Patent Publication 9 are simultaneously carried out as the means for improving on the accuracy of separation of single-structure CNTs. The SDS and SC concentrations were varied in Example 4 to 6 and Example 8 alike, but numerous species of CNTs were still adsorbed in place within such a range. Based on Non-Patent Publication 9, the SDS and SC were herein adjusted to such concentrations as to render adsorption of CNTs more selective, and selective adsorption was then carried out using a plurality of columns. As the SDS concentration increases with the SC concentration fixed to 0.5%, it gives rise to adsorption of only CNTs having a strong adsorption power to the gel (the column to which CNTs having a strong adsorption power are adsorbed is called the first column). As the SDS concentration decreases, it causes unabsorbed CNTs having a weak adsorption power to be again adsorbed to the gel. If the SDS concentration is low enough to again adsorb CNTs to a new column (here called the second column), it is then possible to classify CNTs adsorbed to the column in terms of a difference in the adsorption power to the gel. This difference in adsorption power to the gel is dependent on the chiral angle and diameter of CNTs, and CNTs having a small chiral angle or diameter have a strong adsorption to the gel. The operation for previously separating CNTs via such a difference in adsorption power was carried out up to the fifth column. Further, selective elution was applied to a plurality of columns subjected to selective separation as described just below. First, high-purity separation and recovery of CNTs having a diameter of smaller than 1 nm is carried out using the LC-containing aqueous solution for structural separation. Then, other aqueous solution for structural separation (here a DOC-containing aqueous solution for structural separation) is used for separation and recovery of CNTs remaining in the column with a diameter of larger than 1 nm. Then, because (9,1), (10,0), (8,3) and (9,2) having a small chiral angle have been adsorbed to the first column by way of selective adsorption, those CNTs are separated and recovered by the SDS/SC/LC elution in a high SDS concentration and a low SC concentration. Then, CNTs remaining in the column with a diameter of smaller than 1 nm are separated and recovered by the ordinary SDS/SC/LC elution. Finally, CNTs having a diameter of larger than 1 nm are separated and recovered by the SDS/SC/DOC elution. In this way, selective adsorption was combined with selective elution for high-purity separation of CNTs having multi-structures. Set out below is one specific process.

Figure 9A:
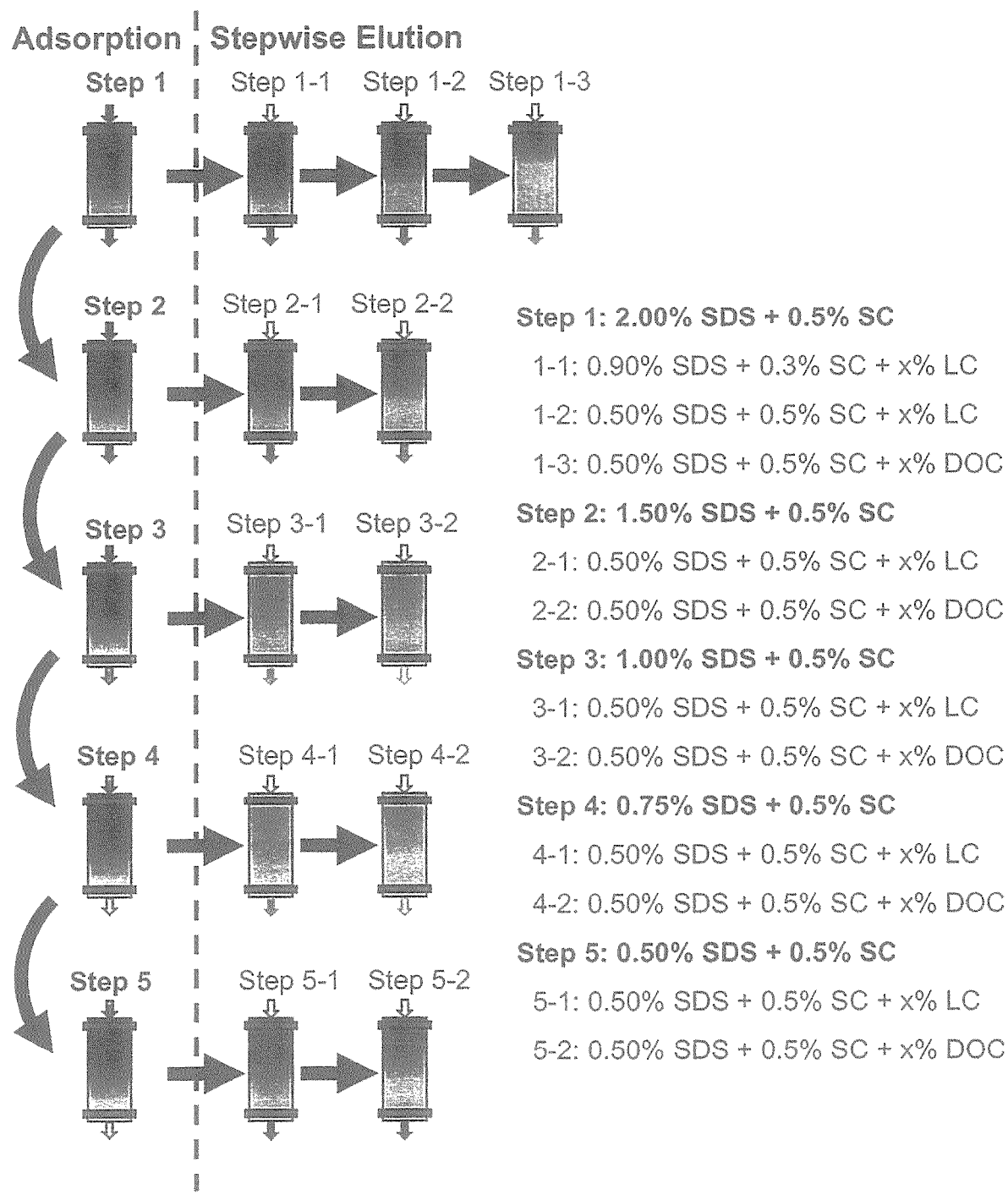
FIG. 9a is illustrative of how to separate and recover single-structure CNTs using a plurality of columns.
Figure 9C:
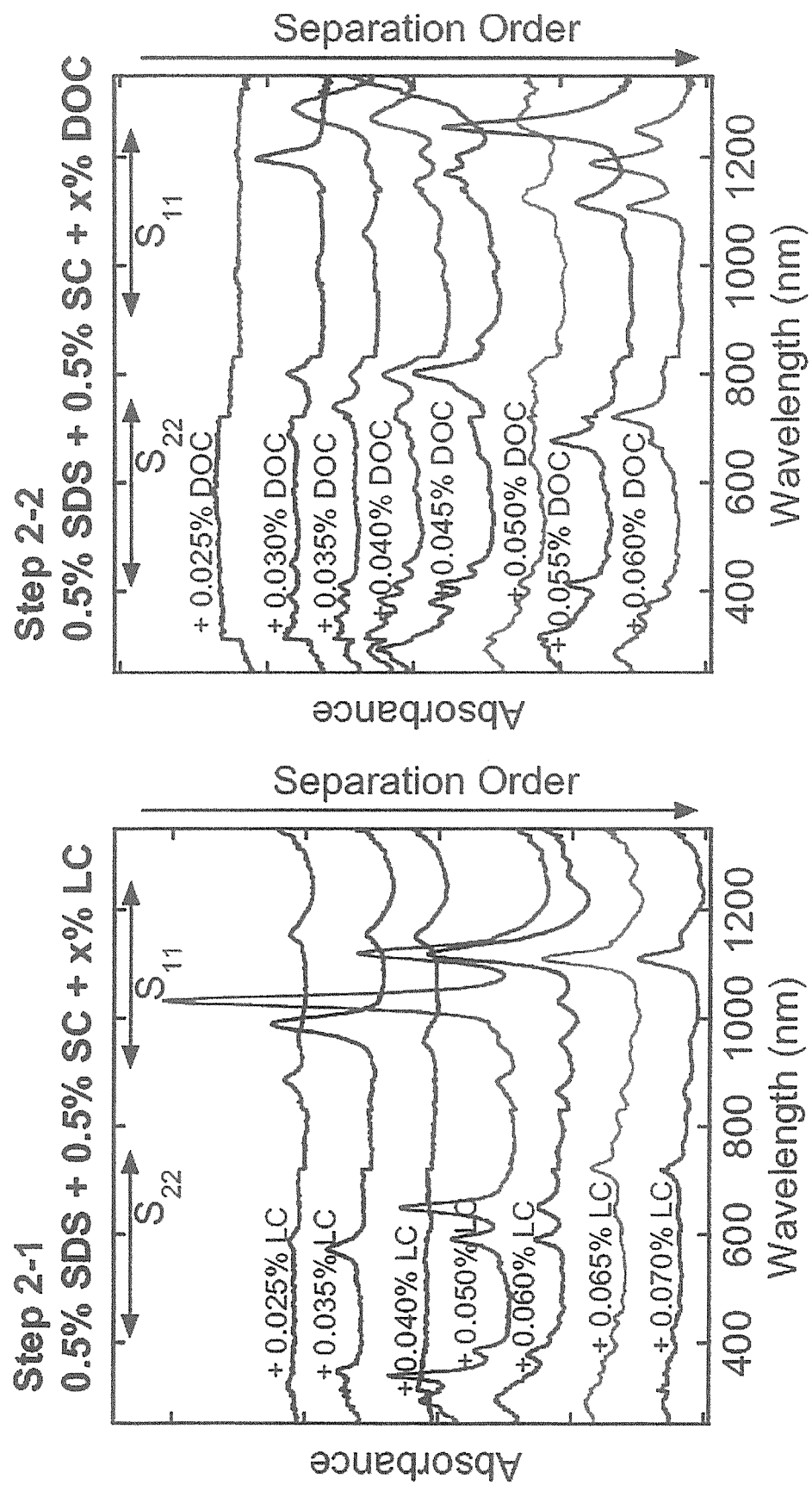
FIG. 9c is indicative of the light absorption spectra of samples obtained in the $2^{nd}$ step of separation using a plurality of columns.
Figure 9E:
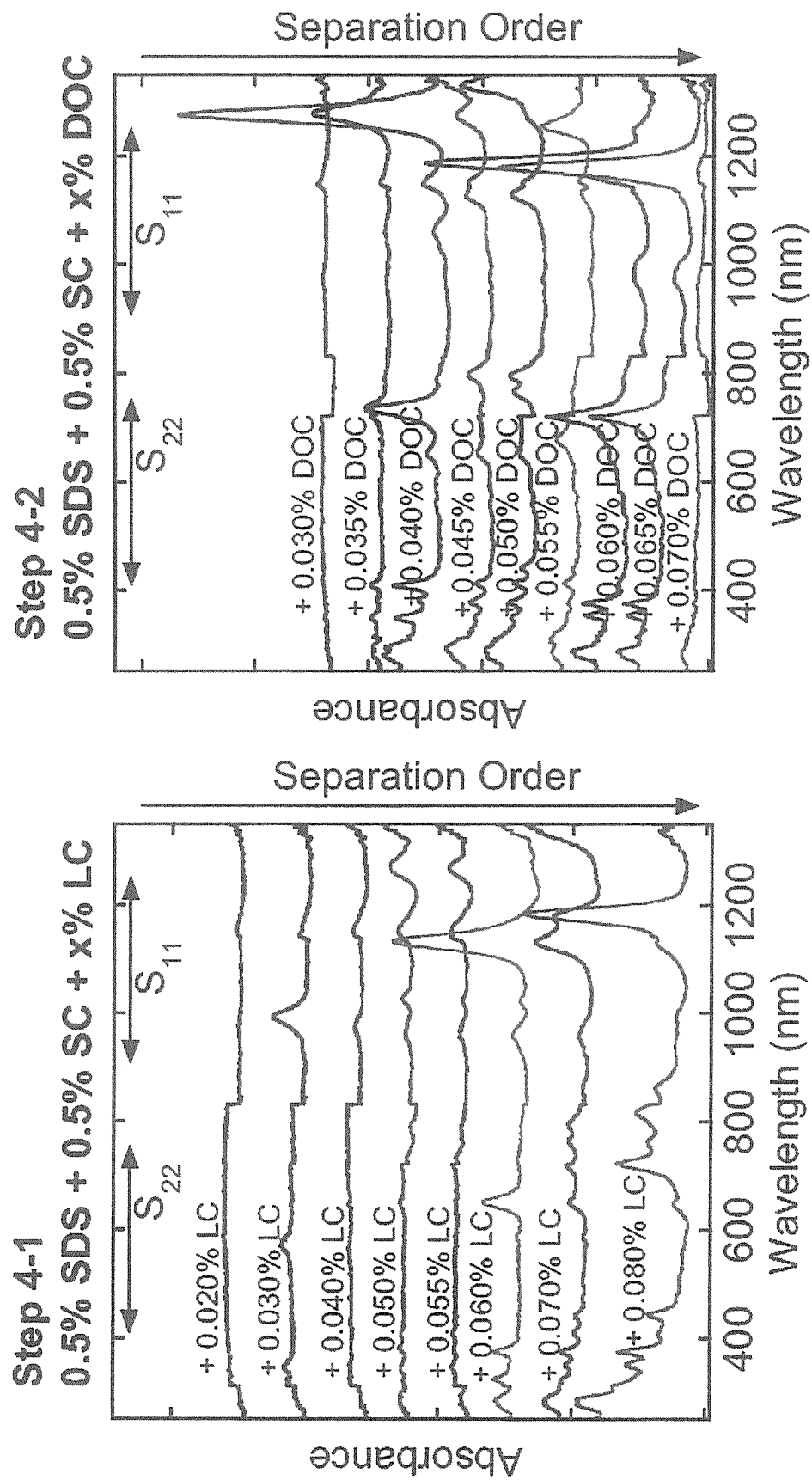
FIG. 9e is indicative of the light absorption spectra of samples obtained in the $4^{th}$ step of separation using a plurality of columns.

The surfactant concentration of the CNT dispersion liquid was adjusted to 2% SDS/0.5% SC. There are a plurality of columns provided, each having a length of 20 cm and an inner diameter of 2.6 cm (XK, GE Healthcare) and having gel beads filled up therein in such a way as to have a height of about 6 cm. The CNT dispersion liquid was added to the first column equilibrated with an aqueous solution of 2% SDS/0.5% SC in an amount of 40% based on the gel volume (the first step). Then, the first column was equilibrated with an aqueous solution of 0.9% SDS/0.3% SC for the SDS/SC/LC elution in 0.9% SDS/0.3% SC (the 1-1 step). Then, the first column was equilibrated with an aqueous solution of 0.9% SDS/0.3% SC, an aqueous solution of 0.7% SDS/0.4% SC and an aqueous solution of 0.5% SDS/0.5% SC in this order for the SDS/SC/LC elution in 0.5% SDS/0.5% SC (the 1-2 step). Then, the first column was equilibrated with an aqueous solution of 0.5% SDS/0.5% SC for the SDS/SC/DOC elution in 0.5% SDS/0.5% SC (the 1-3 step). Then, a liquid obtained by dilution of a filtrate (2% SDS/0.5% SC) from the first column with an aqueous solution of 0.5% SC was added to the second column equilibrated with an aqueous solution of 1.5% SDS/0.5% SC for a similar operation as in the first step (the second step). Then, as in the 1-2 step, the SDS/SC/LC elution in 0.5% SDS/0.5% SC was carried out (the 2-1 step) and, as in the 1-3 step, the SDS/SC/DOC elution in 0.5% SDS/0.5% SC was carried out (the 2-2 step). The subsequent columns were operated as in the second step: selective adsorption was carried out in 1% SDS/0.5% SC for the third column, 0.75% SDS/0.5% SC for the fourth column, and 0.5% SDS/0.5% SC for the fifth column, respectively. The respective columns were subjected to the SDS/SC/LC elution and SDS/SC/DOC elution as in the 2-1 step and 2-2 step. The separations were all carried out at 25° C. under the automatic control of HPLC. Shown in FIG. 9a is a schematic view of the separation process.

Figure 9G:
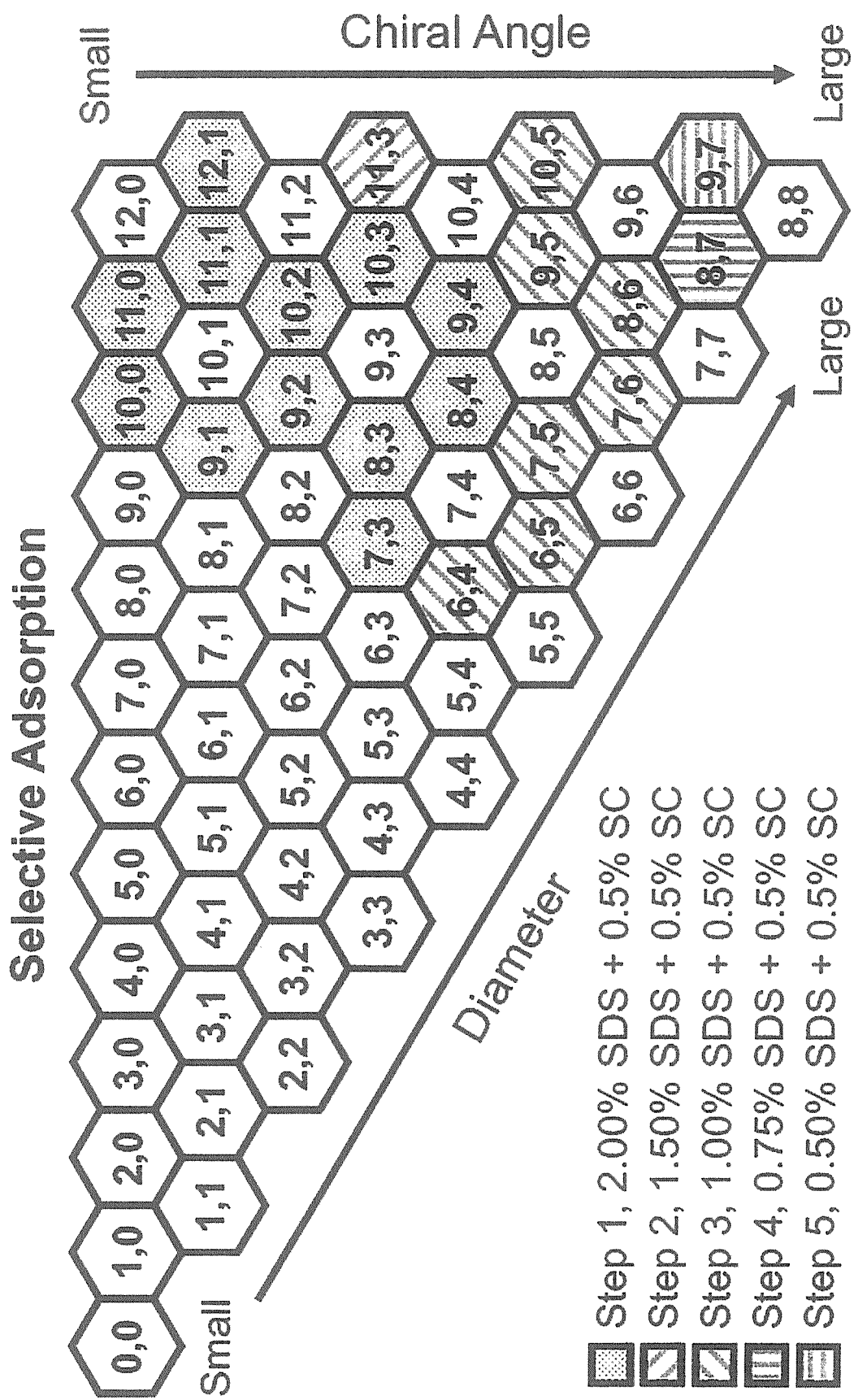
FIG. 9g is illustrative of the column to which the single-structure CNTs obtained by separation using a plurality of columns have been adsorbed.
Figure 9I:
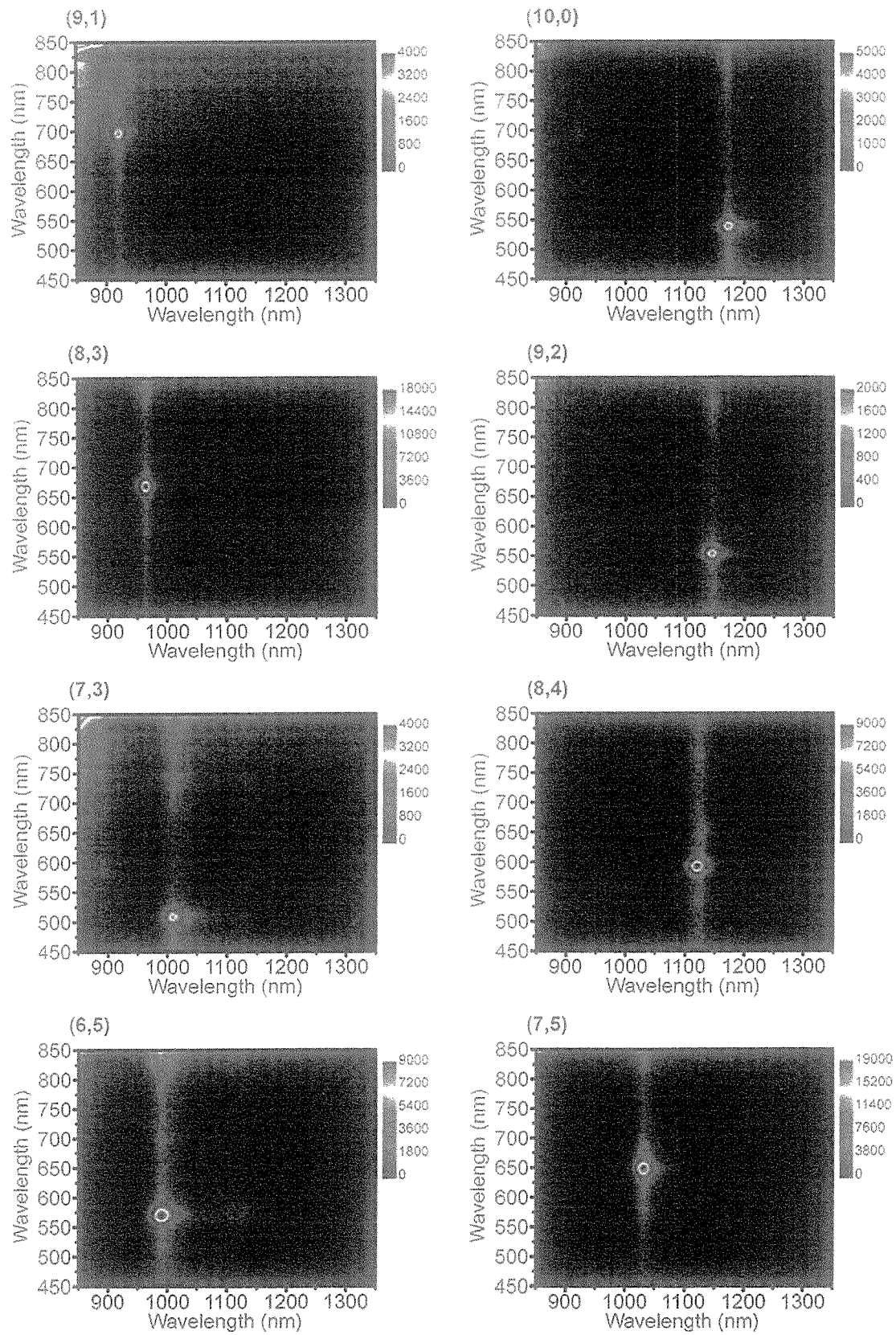
FIG. 9i is indicative of the fluorescence spectra of single-structure CNTs obtained by separation using a plurality of columns.
Figure 9J:
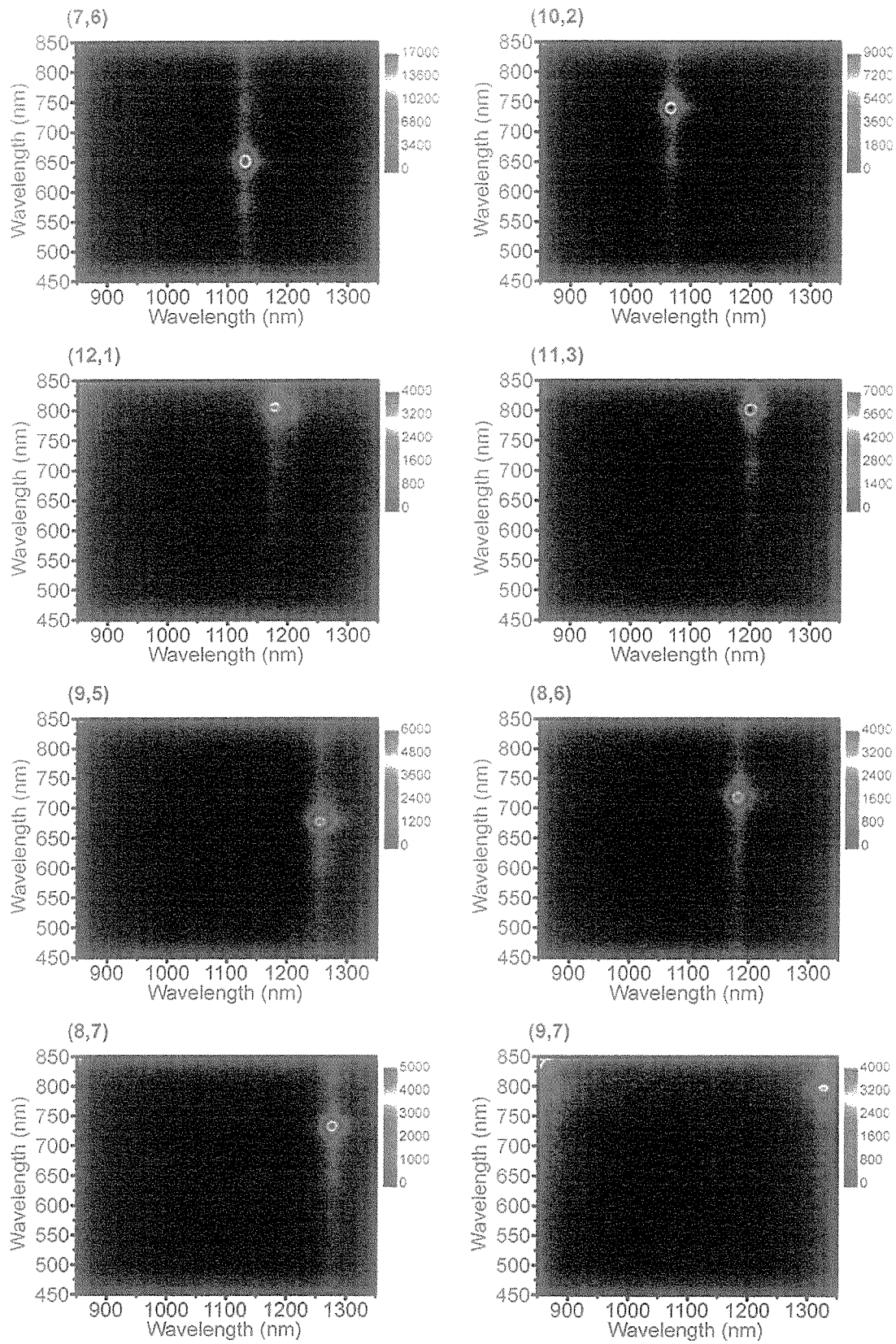
FIG. 9j is indicative of the fluorescence spectra of single-structure CNTs obtained by separation using a plurality of columns.

FIGS. 9a to 9f show the light absorption spectra of eluates obtained in the SDS/SC/LC elution and SDS/SC/DOC elution in the respective steps. FIG. 9g shows the conditions for selective adsorption of CNTs obtained by the method described herein, and FIG. 9h shows the light absorption spectra and purities of CNTs obtained by the method described herein. FIGS. 9i and 9j show the fluorescence spectra of single-structure CNTs obtained by the method described herein.

CNTs having a small chiral angle are adsorbed to the first column for selective adsorption in 2% SDS/0.5% SC (FIG. 9g). From there, the SDS/SC/LC elution of the 1-1 step in 0.9% SDS/0.3% SC allows for separation and recovery in varying LC concentrations of (9,1), (10,0), (8,3) and (9,2) as in Examples 8 and 9 (FIG. 9b left and FIG. 9h left). Further, the SDS/SC/LC elution of the 1-2 step in 0.5% SDS/0.5% SC allows for separation and recovery in varying concentrations of other (7,3), (8,4), (11,0), (11,1), (9,4) and (10,3) having a small chiral angle (FIG. 9b center and FIG. 9h left), and the SDS/SC/DOC elution of the 1-3 step in 0.5% SDS/0.5% SC allows for separation and recovery in varying DOC concentrations of (10,2) and (12,1) incapable of SDS/SC/LC elution and having a relatively large diameter (FIG. 9b right and FIG. 9h right-upper). Adsorbed to the second column for selective adsorption in 1.5% SDS/0.5% SC are CNTs that have not been obtained in the first column (FIG. 9g). From there, the SDS/SC/LC elution of the 3-1 step allows for separation and recovery of (6,4), (6,5), (7,5) and (7,6) having a large chiral angle and a small diameter (FIG. 9d left and FIG. 9h left). Furthermore, the SDS/SC/DOC elution of the 3-2 step allows for separation and recovery of (10,5), (9,5) and (8,6) having a large chiral angle and a large diameter (FIG. 9d right and FIG. 9h right-upper). Adsorbed to both the fourth column adapted for selective adsorption in 0.75% SDC/0.5% SC and the fifth column adapted for selective adsorption in 0.5% SDS/0.5% SC are CNTs having a large chiral angle and a large diameter (FIG. 9g). For this reason, those CNTs cannot be recovered without recourse to the SDS/SC/DOC elution. The SDS/SC/DOC elution of the 4-2 step allows for separation and recovery of (8,7) (FIG. 9e right and FIG. 9h right-upper), and the SDS/SC/DOC elution of the 5-2 step allows for separation and recovery of (9,7) having a large chiral angle and a small diameter (FIG. 9f right and FIG. 9h right-upper). It has also been found that metallic CNTs can be separated and recovered by fractions unabsorbed to the column in the fifth step (fractions unabsorbed to all the 1 to 5 columns) (FIG. 9h lower). Thus, it was possible to separate 22 species of semiconducting CNTs having a specific structure in the vicinity of a diameter of 1 nm and contained in the raw material HiPco. The present invention provides an epoch-making method capable of exclusively separating them. Among others, it is found that 16 species of CNTs: (9,1), (10,0), (8,3), (9,2), (7,3), (8,4), (6,5), (7,5), (7,6), (10,2), (12,1), (11,3), (9,5), (8,6), (8,7) and (9,7) are highly pure, single-structure CNTs having only a single spot observed in the fluorescence spectra (FIGS. 9i and 9j). All the existing processes have failed to separate as many as 16 species of high-purity, single-structure CNTs, and the high-purity separation of (9,7), (10,0), (11,3), (9,5) and (8,7) is achieved for the first time among processes using surfactants alone: the inventive separation method is absolutely innovative in the sense of having functions unachievable by the existing processes as yet.

What is claimed is:

1. A method for separating and recovering carbon nanotubes, comprising;
eluting carbon nanotubes having a diameter of 1 nm or less from a gel on which carbon nanotubes are adsorbed, by using an aqueous solution containing at least one selected from the group consisting of solubilized lithocholic acid and solubilized lithocholic acid isomer.

2. A method for separation and recovery of carbon nanotubes as recited in claim 1, wherein said lithocholic acid, and said lithocholic acid isomer are solubilized by another surfactant.

3. A method for separation and recovery of carbon nanotubes as recited in claim 2, wherein said another surfactant is sodium dodecyl sulfate and/or sodium cholate.

4. A method for separation and recovery of carbon nanotubes as recited in claim 1, further comprising, after eluting carbon nanotubes having a diameter of 1 nm or less, eluting carbon nanotubes remaining in the gel with a diameter of larger than 1 nm.

5. A method for separation and recovery of carbon nanotubes as recited in claim 1, wherein said lithocholic acid and said lithocholic acid isomer are solubilized by another surfactant.

6. A method for separation and recovery of carbon nanotubes as recited in claim 5, wherein said another surfactant is sodium dodecyl sulfate and/or sodium cholate.

7. A method for separating and recovering carbon nanotubes as recited in claim 1, wherein the carbon nanotubes with a different chiral index are selectively eluted from the gel on which the carbon nanotubes are adsorbed.

8. A method for separation and recovery of carbon nanotubes as recited in claim 7, wherein said lithocholic acid and said lithocholic acid isomer are solubilized by another surfactant.

9. A method for separation and recovery of carbon nanotubes as recited in claim 8, wherein said another surfactant is sodium dodecyl sulfate and/or sodium cholate.

10. A method for separation and recovery of carbon nanotubes as recited in claim 1, wherein the aqueous solution containing the at least one selected from the group consisting of solubilized lithocholic acid and solubilized lithocholic acid isomer is prepared to obtain an aqueous solution for separation; preparing the gel containing carbon nanotubes; mixing the gel and the aqueous solution for separation to elute the carbon nanotubes; and separating the carbon nanotubes.

* * * * *